US008041616B2

(12) United States Patent
Cullen, III et al.

(10) Patent No.: US 8,041,616 B2
(45) Date of Patent: Oct. 18, 2011

(54) OUTSOURCED SERVICE LEVEL AGREEMENT PROVISIONING MANAGEMENT SYSTEM AND METHOD

(75) Inventors: Andrew A. Cullen, III, Succasunna, NJ (US); Steven A. Shaw, New York, NY (US)

(73) Assignee: Volt Information Sciences, Inc., Orange, CA (US)

( * ) Notice: Subject to any disclaimer, the term of this patent is extended or adjusted under 35 U.S.C. 154(b) by 751 days.

(21) Appl. No.: 11/885,090

(22) PCT Filed: Jul. 31, 2006

(86) PCT No.: PCT/US2006/029945
§ 371 (c)(1),
(2), (4) Date: May 22, 2008

(87) PCT Pub. No.: WO2007/016567
PCT Pub. Date: Feb. 8, 2007

(65) Prior Publication Data
US 2008/0270313 A1    Oct. 30, 2008

Related U.S. Application Data

(60) Provisional application No. 60/704,352, filed on Aug. 1, 2005.

(51) Int. Cl.
*G06Q 40/00* (2006.01)
*G06Q 30/00* (2006.01)
(52) U.S. Cl. ............... 705/35; 705/39; 705/40; 705/44; 705/26.4; 705/26.41

(58) Field of Classification Search ............... 705/35, 705/26.4, 26.41, 39, 40, 44
See application file for complete search history.

(56) References Cited

U.S. PATENT DOCUMENTS

| | | | |
|---|---|---|---|
| 4,799,156 A | 1/1989 | Shavit et al. | |
| 4,937,743 A | 6/1990 | Rassman et al. | |
| 4,992,940 A | 2/1991 | Dworkin | |
| 5,117,353 A | 5/1992 | Stipanovich et al. | |
| 5,164,897 A * | 11/1992 | Clark et al. | 705/321 |
| 5,291,397 A | 3/1994 | Powell | |
| 5,381,332 A | 1/1995 | Wood | |
| 5,416,694 A | 5/1995 | Parrish et al. | |
| 5,493,490 A | 2/1996 | Johnson | |
| 5,592,375 A | 1/1997 | Salmon et al. | |

(Continued)

FOREIGN PATENT DOCUMENTS

EP    1195676 A2    4/2002

(Continued)

OTHER PUBLICATIONS

U.S. Appl. No. 12/692,937, Cullen.

(Continued)

*Primary Examiner* — James Trammell
*Assistant Examiner* — Daniel L Greene
(74) *Attorney, Agent, or Firm* — Winstead PC

(57) ABSTRACT

An outsourced service level agreement (SLA) deliverable management method includes configuring SLA client and secondary SLA provider master data, procuring a secondary SLA provider provision services network, administering a secondary SLA provider human resource network, processing an SLA client provisioning requirement, processing an SLA provisioning service voucher, and processing payment of an SLA provisioning work order.

73 Claims, 28 Drawing Sheets

U.S. PATENT DOCUMENTS

| | | | |
|---|---|---|---|
| 5,600,554 A | 2/1997 | Williams | |
| 5,664,115 A | 9/1997 | Fraser | |
| 5,715,402 A | 2/1998 | Popolo | |
| 5,740,421 A | 4/1998 | Palmon | |
| 5,758,328 A | 5/1998 | Giovannoli | |
| 5,794,212 A | 8/1998 | Mistr, Jr. | |
| 5,802,493 A | 9/1998 | Sheflott et al. | |
| 5,842,178 A | 11/1998 | Giovannoli | |
| 5,862,223 A | 1/1999 | Walker et al. | |
| 5,907,490 A | 5/1999 | Oliver | |
| 5,913,202 A | 6/1999 | Motoyama | |
| 5,915,086 A | 6/1999 | Buzsaki et al. | |
| 5,960,407 A | 9/1999 | Vivona | |
| 5,970,475 A | 10/1999 | Barnes et al. | |
| 5,978,768 A | 11/1999 | McGovern et al. | |
| 5,987,464 A | 11/1999 | Schneider | |
| 5,991,735 A | 11/1999 | Gerace | |
| 5,995,951 A | 11/1999 | Ferguson | |
| 6,014,644 A | 1/2000 | Erickson | |
| 6,038,547 A | 3/2000 | Casto | |
| 6,041,303 A | 3/2000 | Mathews | |
| 6,049,776 A | 4/2000 | Donnelly et al. | |
| 6,058,373 A | 5/2000 | Blinn et al. | |
| 6,058,379 A | 5/2000 | Odom et al. | |
| 6,070,143 A | 5/2000 | Barney et al. | |
| 6,088,678 A | 7/2000 | Shannon | |
| 6,092,050 A | 7/2000 | Lungren et al. | |
| 6,092,197 A | 7/2000 | Coueignoux | |
| 6,112,189 A | 8/2000 | Rickard et al. | |
| 6,115,642 A | 9/2000 | Brown et al. | |
| 6,131,087 A | 10/2000 | Luke et al. | |
| 6,141,653 A | 10/2000 | Conklin et al. | |
| 6,157,808 A | 12/2000 | Hollingsworth | |
| 6,158,044 A | 12/2000 | Tibbetts | |
| 6,161,099 A | 12/2000 | Harrington et al. | |
| 6,167,385 A | 12/2000 | Hartley-Urquhart | |
| 6,189,003 B1 | 2/2001 | Leal | |
| 6,199,050 B1 | 3/2001 | Alaia et al. | |
| 6,213,780 B1 | 4/2001 | Ho et al. | |
| 6,266,659 B1 | 7/2001 | Nadkarni | |
| 6,272,467 B1 | 8/2001 | Durand et al. | |
| 6,275,812 B1 | 8/2001 | Haq et al. | |
| 6,289,340 B1 | 9/2001 | Puram et al. | |
| 6,302,695 B1 | 10/2001 | Rtischev et al. | |
| 6,324,522 B2 | 11/2001 | Peterson et al. | |
| 6,349,238 B1 | 2/2002 | Gabbita et al. | |
| 6,356,909 B1 | 3/2002 | Spencer | |
| 6,370,510 B1 | 4/2002 | McGovern et al. | |
| 6,385,620 B1 | 5/2002 | Kurzius et al. | |
| 6,408,337 B1 | 6/2002 | Dietz et al. | |
| 6,442,528 B1 | 8/2002 | Notani et al. | |
| 6,480,857 B1 | 11/2002 | Chandler | |
| 6,529,909 B1 | 3/2003 | Bowman-Amuah | |
| 6,556,976 B1 | 4/2003 | Callen | |
| 6,647,300 B1 | 11/2003 | Balasubramanian et al. | |
| 6,658,400 B2 | 12/2003 | Perell et al. | |
| 6,662,194 B1 | 12/2003 | Joao | |
| 7,054,821 B1 | 5/2006 | Rosenthal et al. | |
| 7,089,203 B1* | 8/2006 | Crookshanks | 705/37 |
| 7,103,567 B2 | 9/2006 | Smukowski | |
| 7,107,268 B1 | 9/2006 | Zawadzki et al. | |
| 7,275,039 B2 | 9/2007 | Setteducati | |
| 7,305,392 B1 | 12/2007 | Abrams et al. | |
| 7,386,475 B2 | 6/2008 | Parasnis et al. | |
| 7,430,523 B1 | 9/2008 | Khalidi | |
| 7,437,304 B2 | 10/2008 | Barnard et al. | |
| 7,451,106 B1 | 11/2008 | Gindlesperger | |
| 7,457,764 B1 | 11/2008 | Bullock et al. | |
| 7,523,045 B1 | 4/2009 | Walker et al. | |
| 7,533,033 B1 | 5/2009 | Unite et al. | |
| 2001/0044768 A1 | 11/2001 | Wares | |
| 2001/0051913 A1 | 12/2001 | Vashistha et al. | |
| 2002/0002479 A1* | 1/2002 | Almog et al. | 705/8 |
| 2002/0046147 A1 | 4/2002 | Livesay et al. | |
| 2002/0072946 A1 | 6/2002 | Richardson | |
| 2002/0073082 A1 | 6/2002 | Duvillier et al. | |
| 2002/0087382 A1 | 7/2002 | Tiburcio | |
| 2002/0103687 A1 | 8/2002 | Kipling | |
| 2002/0152133 A1 | 10/2002 | King et al. | |
| 2002/0161619 A1 | 10/2002 | Ham et al. | |
| 2002/0198766 A1* | 12/2002 | Magrino et al. | 705/11 |
| 2002/0198818 A1* | 12/2002 | Scott et al. | 705/37 |
| 2003/0004850 A1 | 1/2003 | Li et al. | |
| 2003/0018481 A1 | 1/2003 | Zhou et al. | |
| 2003/0037032 A1 | 2/2003 | Neece et al. | |
| 2003/0055694 A1 | 3/2003 | Menninger | |
| 2003/0055754 A1 | 3/2003 | Sullivan | |
| 2003/0083910 A1 | 5/2003 | Sayal et al. | |
| 2003/0101114 A1 | 5/2003 | Delapass et al. | |
| 2003/0101127 A1 | 5/2003 | Cornelius | |
| 2003/0135401 A1 | 7/2003 | Parr | |
| 2003/0145006 A1 | 7/2003 | Dalfsen et al. | |
| 2003/0177051 A1 | 9/2003 | Driscoll et al. | |
| 2003/0200150 A1 | 10/2003 | Westcott et al. | |
| 2003/0200168 A1 | 10/2003 | Cullen, III et al. | |
| 2003/0204439 A1 | 10/2003 | Cullen, III | |
| 2003/0208434 A1 | 11/2003 | Posner | |
| 2003/0212604 A1 | 11/2003 | Cullen, III | |
| 2003/0216986 A1 | 11/2003 | Hassan | |
| 2004/0030566 A1 | 2/2004 | Brooks Rix | |
| 2004/0030590 A1 | 2/2004 | Swan et al. | |
| 2004/0039681 A1 | 2/2004 | Cullen, III et al. | |
| 2004/0068728 A1 | 4/2004 | Blevins | |
| 2004/0093583 A1 | 5/2004 | McAnaney et al. | |
| 2004/0107125 A1 | 6/2004 | Guheen et al. | |
| 2004/0107405 A1 | 6/2004 | Schein | |
| 2004/0158513 A1 | 8/2004 | Musacchio | |
| 2004/0186852 A1 | 9/2004 | Rosen | |
| 2004/0205519 A1 | 10/2004 | Chapel et al. | |
| 2004/0210490 A1* | 10/2004 | Almstead et al. | 705/26 |
| 2004/0210510 A1 | 10/2004 | Cullen, III et al. | |
| 2004/0215467 A1 | 10/2004 | Coffman et al. | |
| 2004/0236598 A1 | 11/2004 | Thomsen | |
| 2004/0260601 A1 | 12/2004 | Brief | |
| 2004/0267606 A1 | 12/2004 | Brishke et al. | |
| 2005/0114829 A1 | 5/2005 | Robin | |
| 2005/0120039 A1 | 6/2005 | Amys et al. | |
| 2005/0144129 A1 | 6/2005 | Coolman et al. | |
| 2005/0262008 A1 | 11/2005 | Cullen, III et al. | |
| 2005/0288993 A1 | 12/2005 | Weng et al. | |
| 2006/0173775 A1 | 8/2006 | Cullen, III et al. | |
| 2006/0190391 A1 | 8/2006 | Cullen et al. | |
| 2006/0259476 A1 | 11/2006 | Kadayam et al. | |
| 2007/0124196 A1 | 5/2007 | Brief et al. | |
| 2008/0004890 A1* | 1/2008 | Hargroder | 705/1 |

FOREIGN PATENT DOCUMENTS

| | | |
|---|---|---|
| RU | 2165679 C1 | 4/2001 |
| WO | WO-00/33187 A1 | 6/2000 |
| WO | WO-/00/50970 | 8/2000 |
| WO | WO-01/14962 A1 | 3/2001 |
| WO | WO-01/48656 | 7/2001 |
| WO | WO-02/08868 | 1/2002 |
| WO | WO-02/25544 | 3/2002 |
| WO | WO-02/41270 A1 | 5/2002 |

OTHER PUBLICATIONS

Consol (www, procurestaff.com via http://web.archive.org, copyright 2003) pp. 1-31.
U.S. Appl. No. 12/342,116, Cullen.
Bajari et al. (Bajari), "Incentives versus transaction cost: a theory of procurement contracts", RAND Journal of Economics, vol. 32, No. 3, Autumn 2001, pp. 387-407.
Cullen, Andrew A. III, "Declaration of Andrew A. Cullen III", 41 pages, Jun. 18, 2008.
U.S. Appl. No. 12/773,130, Cullen.
U.S. Appl. No. 12/492,438, Cullen.
Cullen, A., Suppliers of Technical Nonpayroll Workers, (2 pages), Dec. 31, 1997.
Cullen, A., Skills Questionnaire, (5 pages), May 21, 1998.
Cullen, A., Skills Environment, (1 page), Jul. 2, 1998.
Cullen, A., Jobs Listing, (31 pages), Feb. 24, 1999.
Brief, V., Overview of Volt's HRP Application, (3 pages), Feb. 1999.
Leipold et al., "The World Bank e-Procurement for the Selection of Consultants: Challenges and Lessons Learned" Journal of Public Procurement, vol. 4, Issue 3, pp. 319-339.

Dysart, J., "The Data Exchange," DG Review, vol. 11, No. 9, p. 37, Mar. 11, 1991.

Anon., "Primavera Systems; Primavera, PurchasePro.Com Create E-Commerce Marketplace for Construction Industry," M2 Presswire, Sep. 22, 1999.

Rawdon, S., "Online Bidding Options May Be Web's Best Secret," Business First-Columbus, vol. 18, No. 33, p. B11, Apr. 5, 2002.

U.S. Appl. No. 12/855,532, Wasicek.

U.S. Appl. No. 12/871,725, Shaw.

"nextSource Announces Launch of its Multiple Listing Staffing Association." Business Wire, p. 2196, Apr. 16, 2002.

Definition of prose from Dictionary.com, retrieved from [http://dictionary.reference.com/browse/prose] on Aug. 7, 2008 (5 pages).

Copenheaver, Blaine R., "International Search Report" for PCT/US2010/045349 as mailed Oct. 6, 2010 (4 pages).

Young, Lee W., "International Search Report" for PCT/US10/47176 as mailed Oct. 14, 2010, 3 pages.

Herman, Susan J. Hiring Right: A Practical Guide. SAGE. 1994. pp. 23-25.

www.marketing.ebreviate.com; "Overview"; Company Information of eBreviate; Feb. 11, 2002; pp. 1-16.

www.chimes.net; "Chimes Streamlines & Digitizes RFP Administration and Project Management with Launch of Chimes PM"; Press Release from Chimes, Inc.; Feb. 25, 2002; pp. 1-4.

www.chimes.net; "Chimes, Inc. Extends Human Capital Management Solution Beyond Contingent Workforce with Launch of Centralized Applicant Management -CAM- Program"; News Room from Chimes, Inc.; Jun. 28, 2001; pp. 1-2.

www.emptoris.com; "Overview"; Company Overview of Emptoris; Apr. 15, 2002; pp. 1-18.

Screenshots of Volt Information Sciences, www.volt.com, Feb. 21, 1999, pp. 1-24, retrieved from: Google.com and archive.org.

Torres, Giselle; "High-Voltage Staffing Service Arrives in Puerto Rico"; Caribbean Business; Oct. 23, 1997, p. 1 (retrieved from: Dialog, file 16).

"Volt Information Sciences-Facilities & Equipment", Annual Report, 1989, p. 1 (retrieved from : Dialog, file 160.

"Volt Information Sciences to Purchase Portions of Two Lucent Technologies Subsidiaries", PR Newswire, Nov. 17, 1999, pp. 1-3, (retrieved from: Dialog, file 16.

marketing.ebreviate.com; "Overview"; Company Information of eBreviate; Feb. 11, 2002; pp. 1-16.

International Search Report and Written Opinion of the International Searching Authority for PCT/US06/29945, Jul. 20, 2007.

Cullen, III, et al., U.S. Appl. No. 13/017,760, filed Jan. 31, 2011.

* cited by examiner

Primary SLA Provider Home

310:
- Internal Company Data
- SLA Service Provision Skill Profiles
- SLA Service Provision Materials
- SLA Client Data
- Secondary SLA Provider Data
- RFx Bid Processing
- Purchase Order Processing
- SLA Service Provisioning
- Quality Assurance & Service Tracking
- Financial Processing
- Information Management

320:
- New SLA Clients
- New Bid Responses
- New Resource Submittals
- New Client Provision Requests
- New Service Dispatch Responses
- New Service Provision Vouchers
- Pending SLA Provision Detail Records
- Pending SLA Contract Provision Records
- Pending RFx Bid Awards

*FIG. 3*

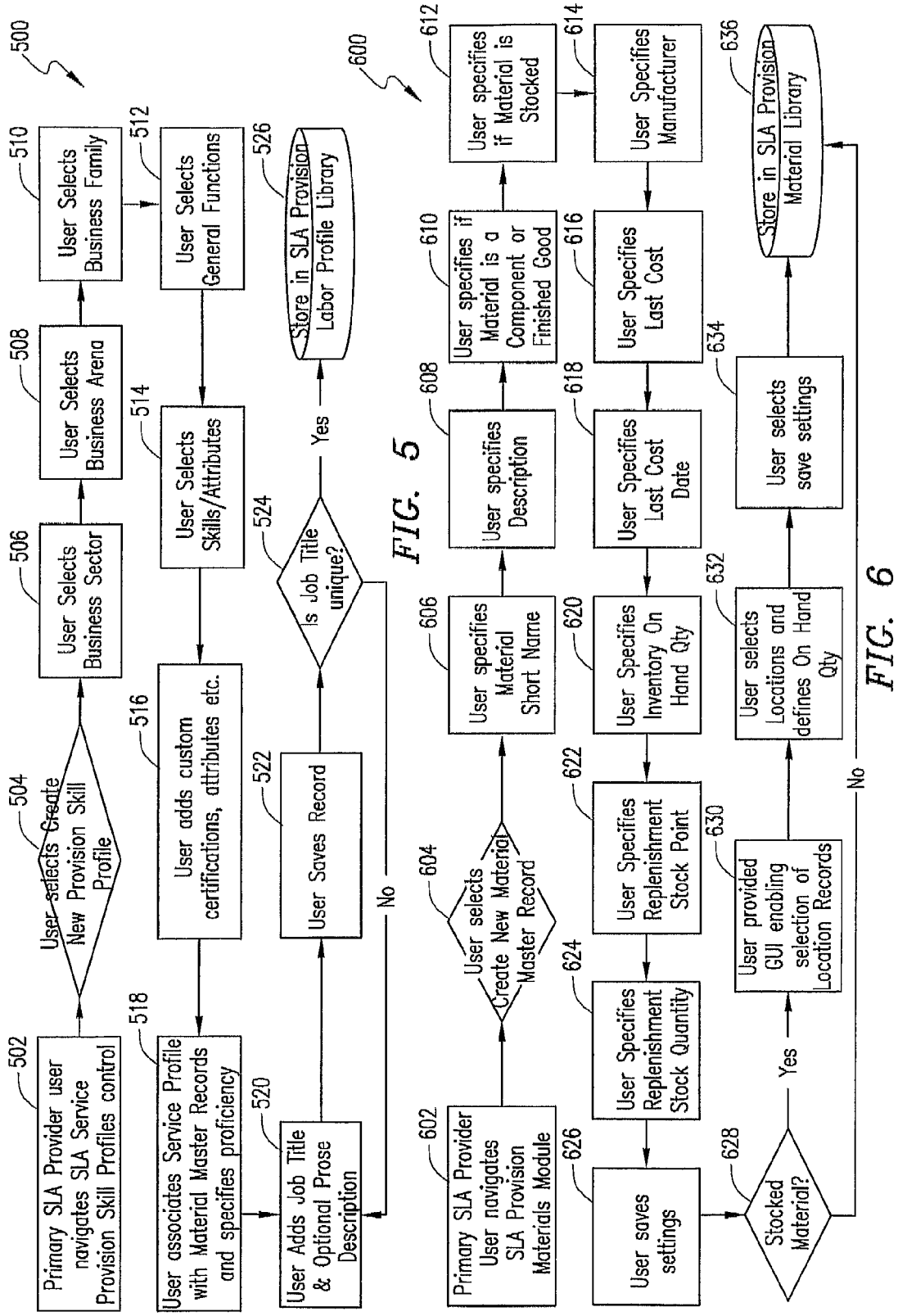

Service Provision Request Summary — 1708-A

| 1708-A1 Select For Provision Service Request | 1708-A2 SLA Client Location | 1708-A3 SLA Client Purchase Order | 1708-A4 SLA Contract Reference | 1708-A5 SLA Provision Record Detail | 1708-A6 SLA Client Contact | 1708-A7 Previous Provision History | 1708-A8 Request Handling Constraint |
|---|---|---|---|---|---|---|---|
| ☐ | Location A | #P01 | Contract Ref | Provision Name | 1 | Y | Y |
| ☐ | Location A | #P01 | Contract Ref | Provision Name | 2 | Y | Y |
| ☐ | Location B | #P02 | Contract Ref | Provision Name | 4 | N | N |
| ☐ | Location C | #P03 | Contract Ref | Provision Name | 4 | Y | Y |

Create SLA Provision Service Request — 1708-A9

*FIG. 17B*

Authorized SLA Service Provision Coverage Summary — 1728-A

| 1728-A1 Select For Provision Dispatch Request | Secondary SLA Provider | 1728-A2 Purchase Order Identifier | 1728-A3 PO Line Details | 1728-A4 Previous Company SLA Provision History | Count of Assigned Resources | 1728-A5 Count of Available Resources | 1728-A6 Previous Resource SLA Provision History |
|---|---|---|---|---|---|---|---|
| ☐ | Company A | #SLA051003 | Link To Details | Link To Details | 3 | 2 | Y |
| ☐ | Company B | #SLA051047 | Link To Details | Link To Details | 2 | 2 | Y |
| ☐ | Company C | #SLA051013 | Link To Details | Link To Details | 4 | 1 | N |
| ☐ | Company D | #SLA051007 | Link To Details | Link To Details | 4 | 0 | Y |

Send Provision Dispatch Request — 1728-A7

*FIG. 17C*

OUTSOURCED SERVICE LEVEL AGREEMENT PROVISIONING MANAGEMENT SYSTEM AND METHOD

CROSS-REFERENCE TO RELATED APPLICATIONS

This patent application claims priority from and incorporates by reference U.S. Provisional Patent Application No. 60/704,352, filed on Aug. 1, 2005. This patent application incorporates by reference the following patent applications: U.S. patent application Ser. No. 10/262,487, filed Sep. 30, 2002 (67737-532USPT); U.S. patent application Ser. No. 10/412,096, filed Apr. 10, 2003 (67737-532USP1); U.S. patent application Ser. No. 10/797,556, filed Mar. 10, 2004 (67737-532USP2); U.S. patent application Ser. No. 10/141,801, filed May 9, 2002 (67737-542USPT); U.S. patent application Ser. No. 10/128,751, filed Apr. 24, 2002 (67737-543USPT); and U.S. patent application Ser. No. 11/071,831, filed Mar. 2, 2005 (67737-1002USPT).

BACKGROUND

1. Technical Field

The present invention relates to a system and method for facilitating procurement, logistical planning, human-capital deployment, service-provision requisitioning, service-provision deliverable tracking, financial-transaction data processing, and decision-support analytics pertinent to outsourcing of service-level-agreement (SLA) deliverables or other third-party customer services/equipment requirements.

2. History of Related Art

Many business entities engage in business endeavors that center upon provision of services or goods to a downstream client base. The business entities that provide the services or goods to a downstream client are referred to as primary SLA providers, while the downstream clients to which the goods or services is provided is referred to as SLA clients. In some instances, the services/goods provision is logistically administered through a general maintenance or warranty agreement. In other instances, the nature of infrastructure supported by the primary SLA provider is of a critical nature and cannot be supported by general maintenance or warranty agreements because extended downtimes would be too costly for the SLA client, for example, such as, could be the case with a failed computer system, telecommunications network, or manufacturing production line. For these critical support needs, it is commonplace for the primary SLA provider and the SLA client to govern the terms of services support through a service level agreement (SLA).

In the past, SLA provisioning has typically been performed in-house by the primary SLA provider providing the services or goods, which model enabled the primary SLA provider to control all SLA business functionality. The SLA business functions may include, for example, logistics, contract management, procurement, human-resource deployment, deliverable management, and financial data processing. The modern business environment has experienced a dramatic shift to outsourcing many of the SLA business functions to suppliers that purport to provide provisioning services as a core competency. The suppliers are typically referred to as secondary SLA providers. Although this business model has enabled some business entities to increase service bandwidth, revenues, and profits, introduction of additional provisioning layers has oftentimes resulted in a loss of control, and more often than not profits, for the primary SLA provider.

Although existing efforts have addressed, in minimal fashion, some of the SLA business functions, most approaches have been from an internally-managed vantage point. Therefore, prior solution development has not addressed significant transactional, logistical, data processing, and administrative challenges encountered when outsourcing of the SLA provisioning is considered. There is therefore a need for a system and method by which a primary SLA provider can exercise greater control over SLA business functions while utilizing qualified secondary SLA providers to deliver SLA provisioning services to the SLA clients.

SUMMARY OF THE INVENTION

An outsourced service-level-agreement (SLA) deliverable management method includes configuring SLA client and secondary SLA provider master data, procuring a secondary SLA provider provision services network, administering a secondary SLA provider human resource network, processing an SLA client provisioning requirement, processing an SLA provisioning service voucher, and processing payment of an SLA provisioning work order.

A method of configuring service level agreement (SLA) client and secondary SLA provider master data includes configuring an SLA provision logistics control library, configuring SLA client master data records, configuring SLA client purchase order records, and onboarding a secondary SLA provider network.

A method of procuring a secondary service-level-agreement (SLA) provider provision services network includes generating an RFx bid from at least one SLA client provisioning detail record, posting the RFx bid to a pre-established list of secondary SLA providers, enabling secondary SLA providers to generate an RFx bid response responsive to receiving the RFx bid, processing at least one secondary SLA providers RFx bid response, processing at least one secondary SLA provider purchase requisition responsive to RFx bid response acceptance, and processing at least one secondary SLA provider purchase order responsive to receiving a completed purchase requisition.

A method of administering a secondary service-level-agreement (SLA) provider human resource network includes selecting at least one human resource submittal affiliated with a secondary SLA provider purchase order, onboarding the at least one human resource provisioning personnel, processing default work availability calendar information settings for the at least one human resource provisioning personnel, enabling non-default human resource provisioning availability calendar administration, and processing non-default work availability calendar information settings.

A method of processing a service-level-agreement (SLA) client provisioning requirement includes processing an SLA client service provision request, processing a service provision dispatch request, processing a provisioning human resource dispatch notification record, and processing the received provisioning human resource dispatch notification record.

A method of processing a service-level agreement (SLA) provisioning work voucher includes creating and storing an SLA provisioning service voucher responsive to input by a provisioning human resource, processing the stored SLA provisioning service voucher by an applicable secondary SLA provider user, processing the approved secondary SLA provider provisioning service voucher responsive to input by an applicable primary SLA provider user, and processing the approved primary SLA provider provisioning service voucher responsive to input by an applicable SLA client user.

A method of processing payment of a service-level agreement (SLA) provisioning work order includes extracting SLA client approved provisioning work vouchers, generating billing invoice files, processing SLA client billing invoice files, processing payment from a SLA client, and issuing payment to a secondary SLA provider. The above summary of the invention is not intended to represent each embodiment or every aspect of the present invention.

BRIEF DESCRIPTION OF THE DRAWINGS AND TABLES

A more complete understanding of the method and apparatus of the present invention may be obtained by reference to the following Detailed Description when taken in conjunction with the accompanying Drawings and Tables, wherein:

FIG. 1 is a high-level view of a physical communications/data network;

FIGS. 2A-B represent a high-level view of a system and method for managing outsourced service level agreement (SLA) and non-SLA deliverables;

FIG. 3 is an illustrative web home page for a primary SLA provider user;

FIG. 5 is a flow diagram that illustrates a process for creation and library storage of an SLA provision labor profile;

FIG. 6 is a flow diagram that illustrates a process for creation and library storage of SLA provision material;

Figure 12A:
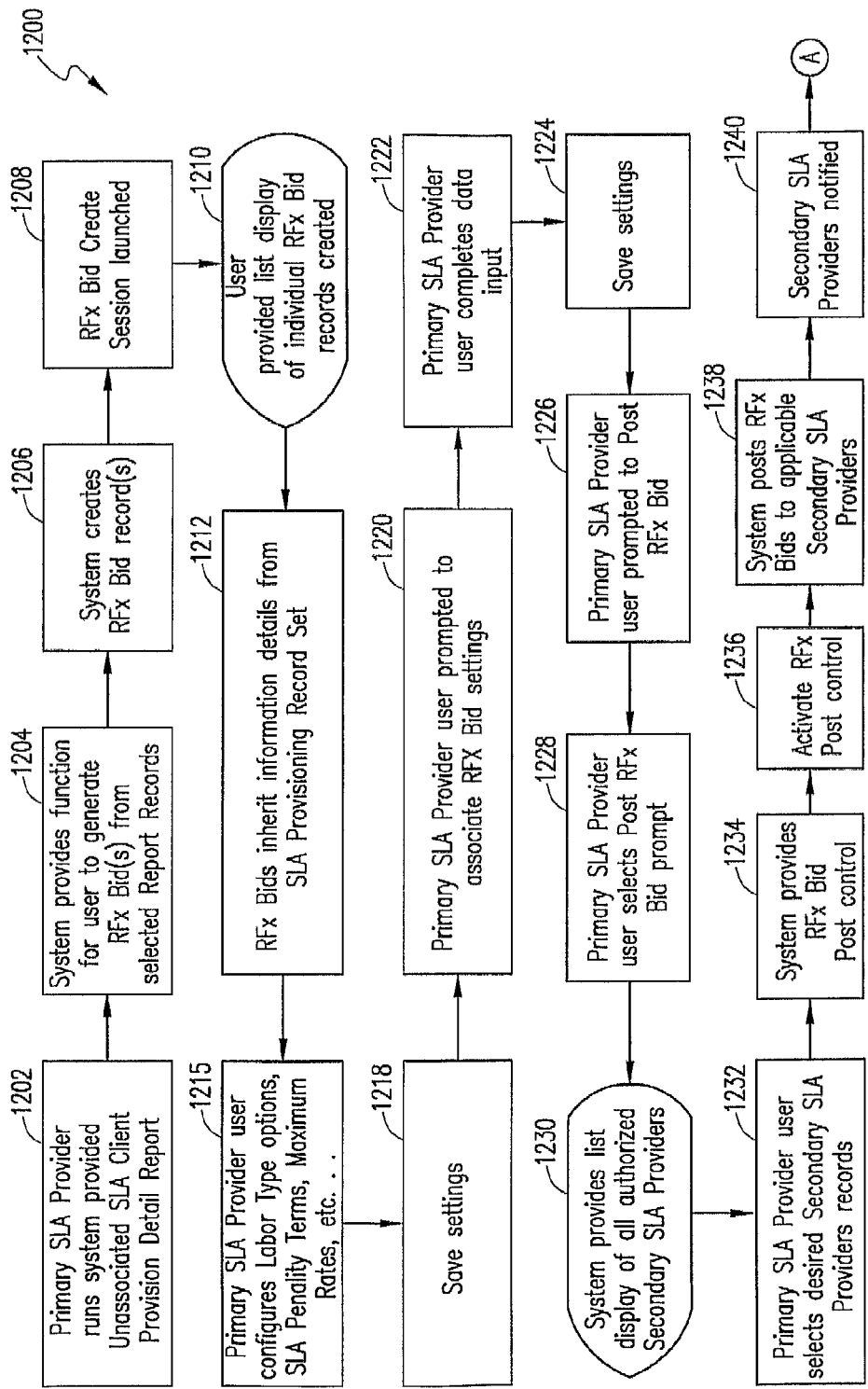
Figure 12B:
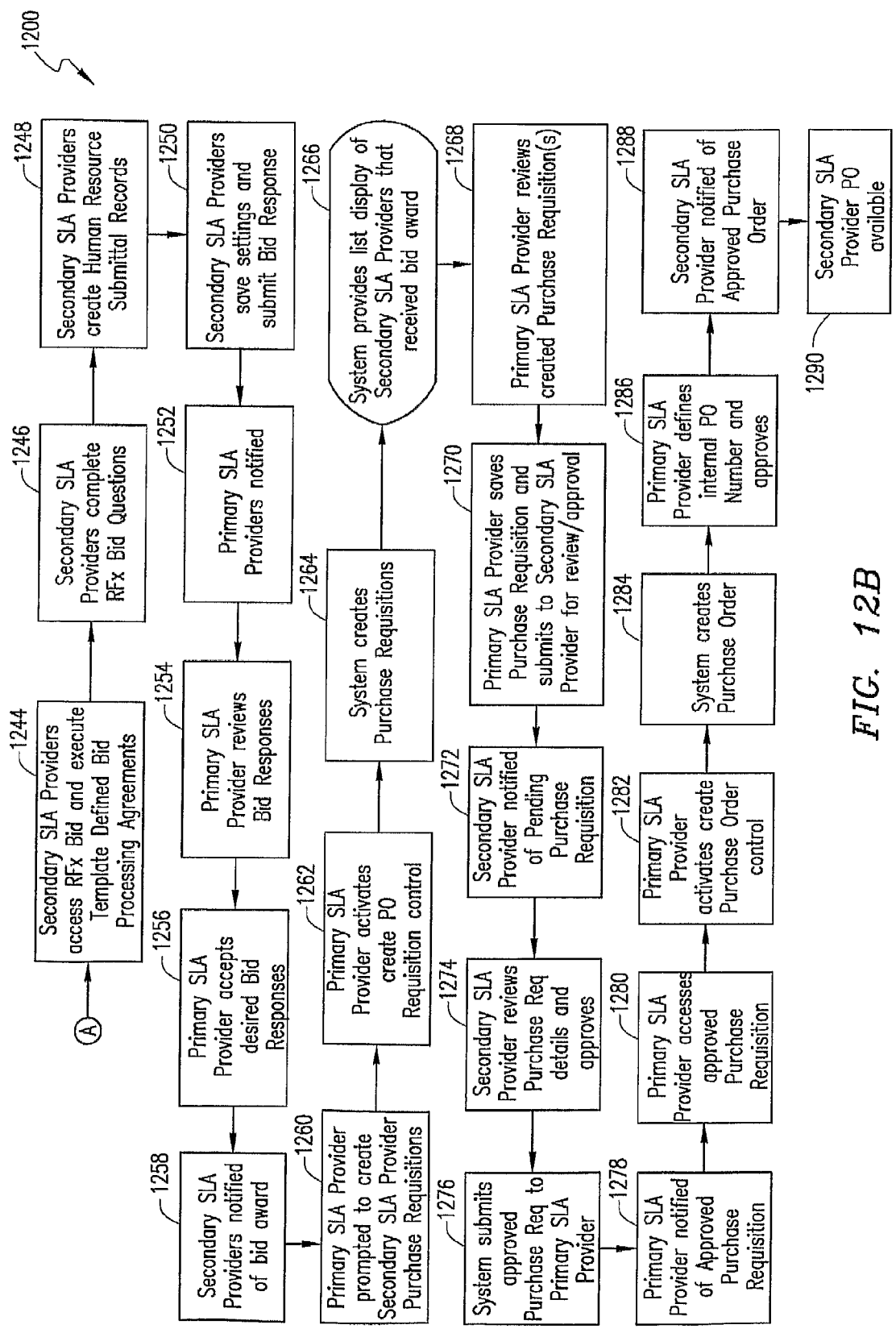
Figure 13:
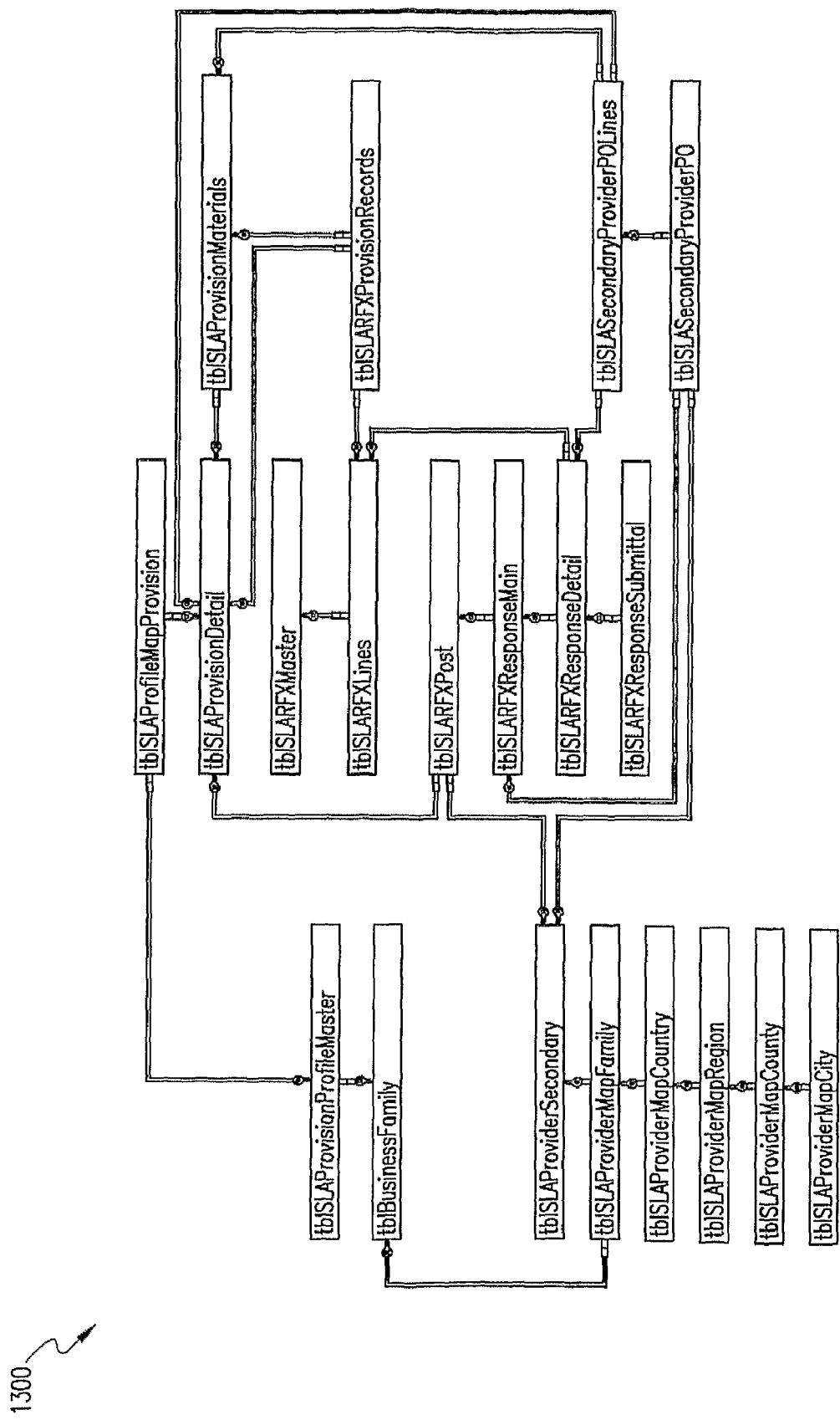
Figure 14A:
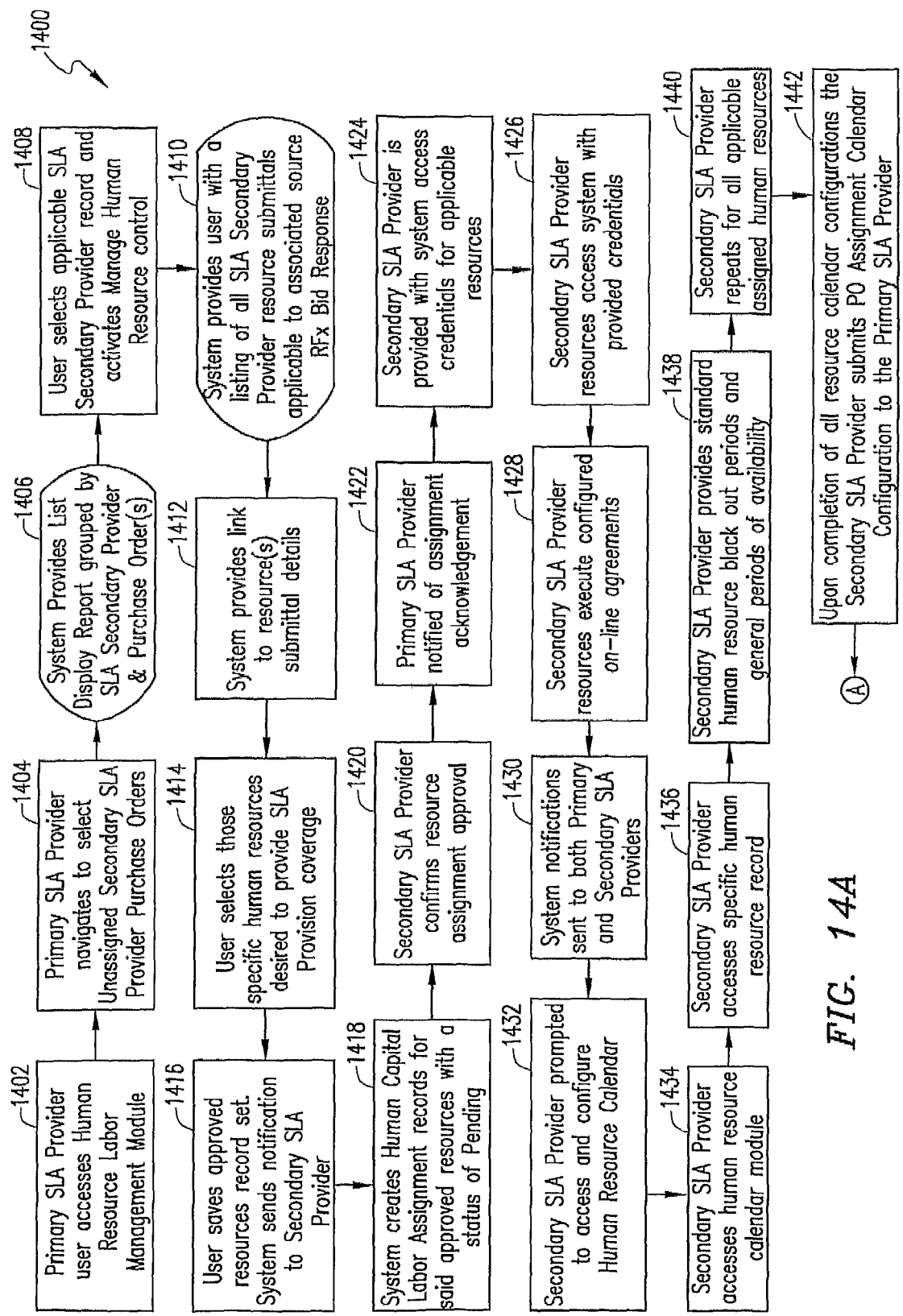
Figure 14B:
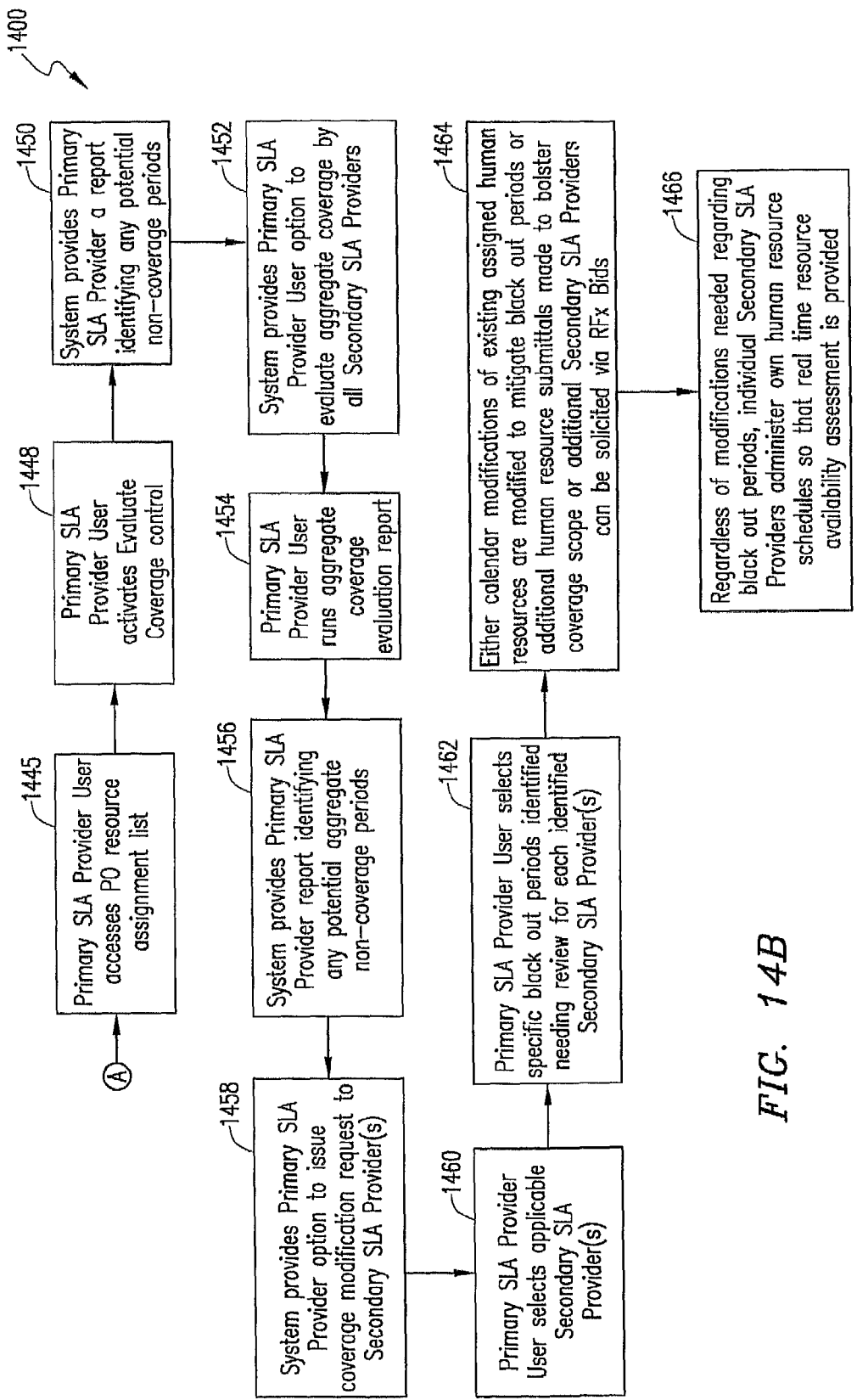
Figure 15:
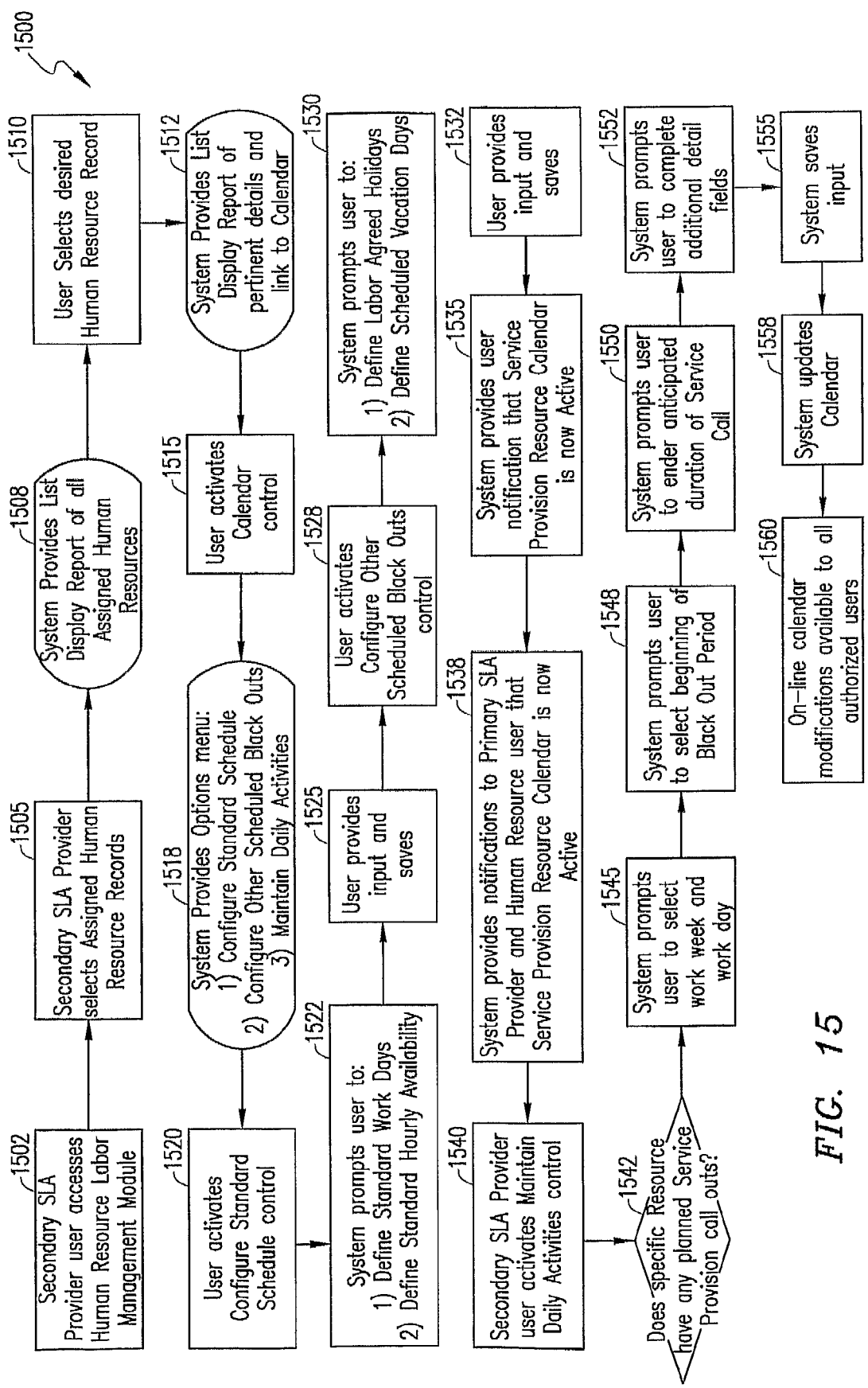
Figure 16:
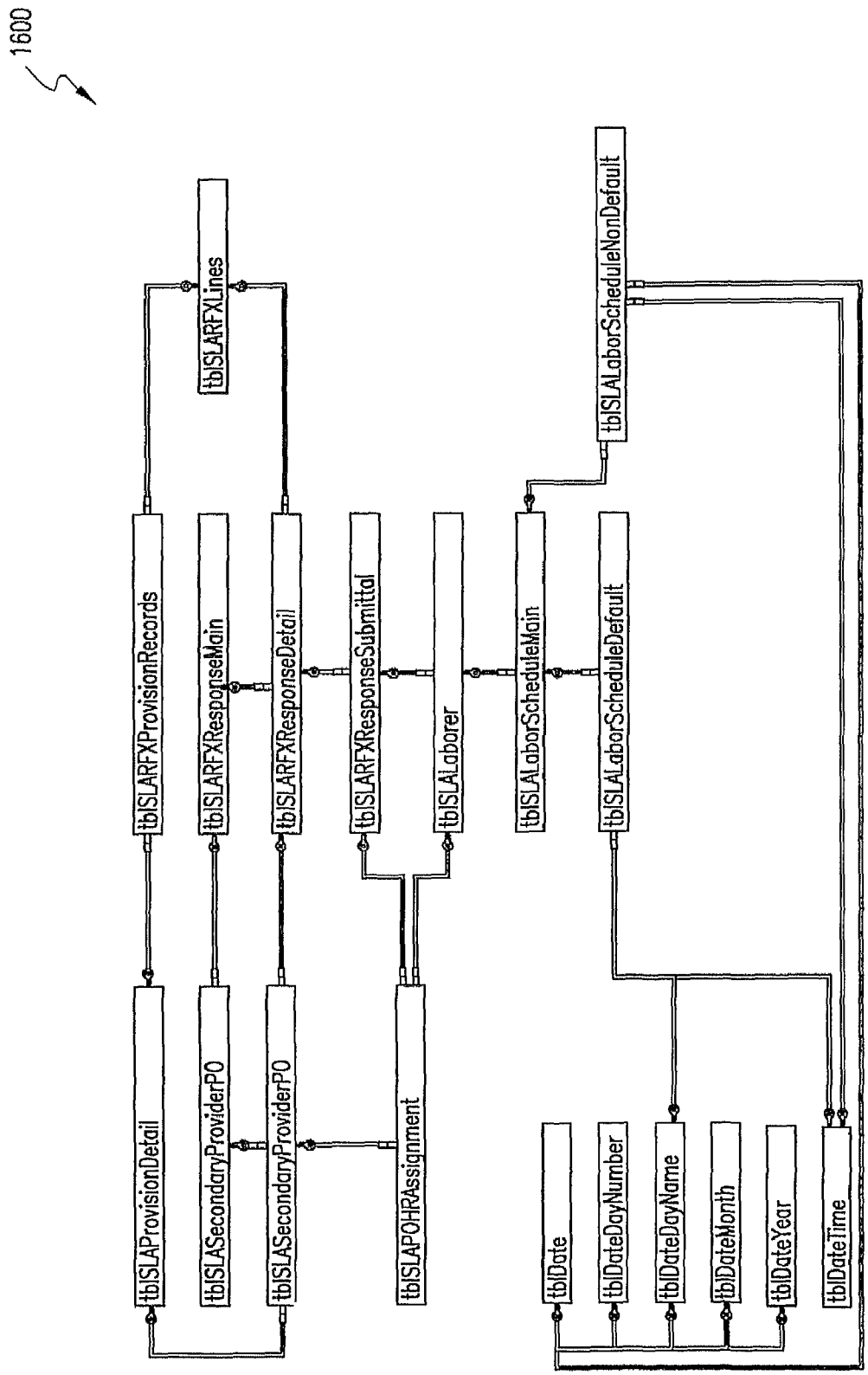
Figure 17A:
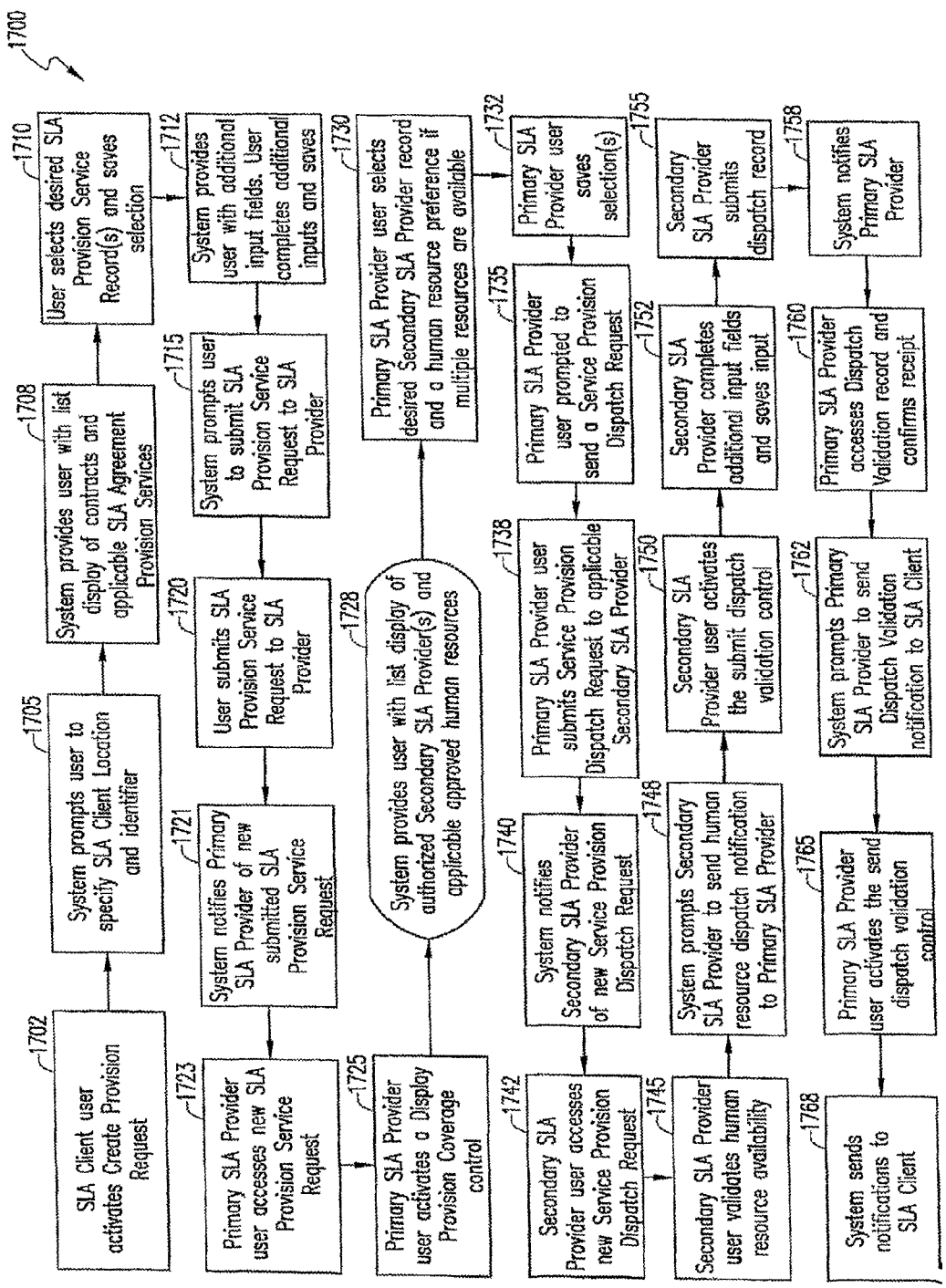
Figure 18:
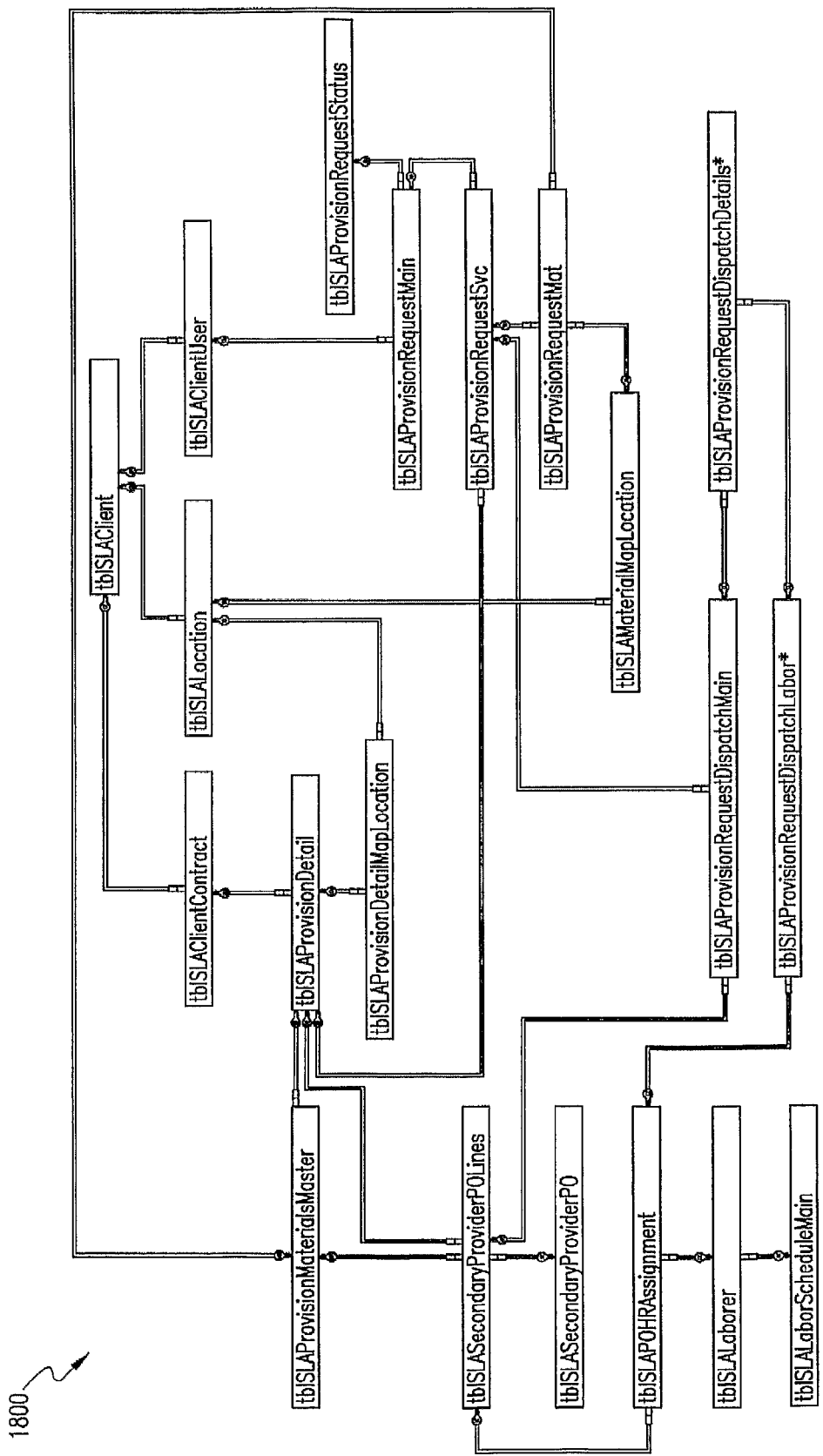
Figure 19A:
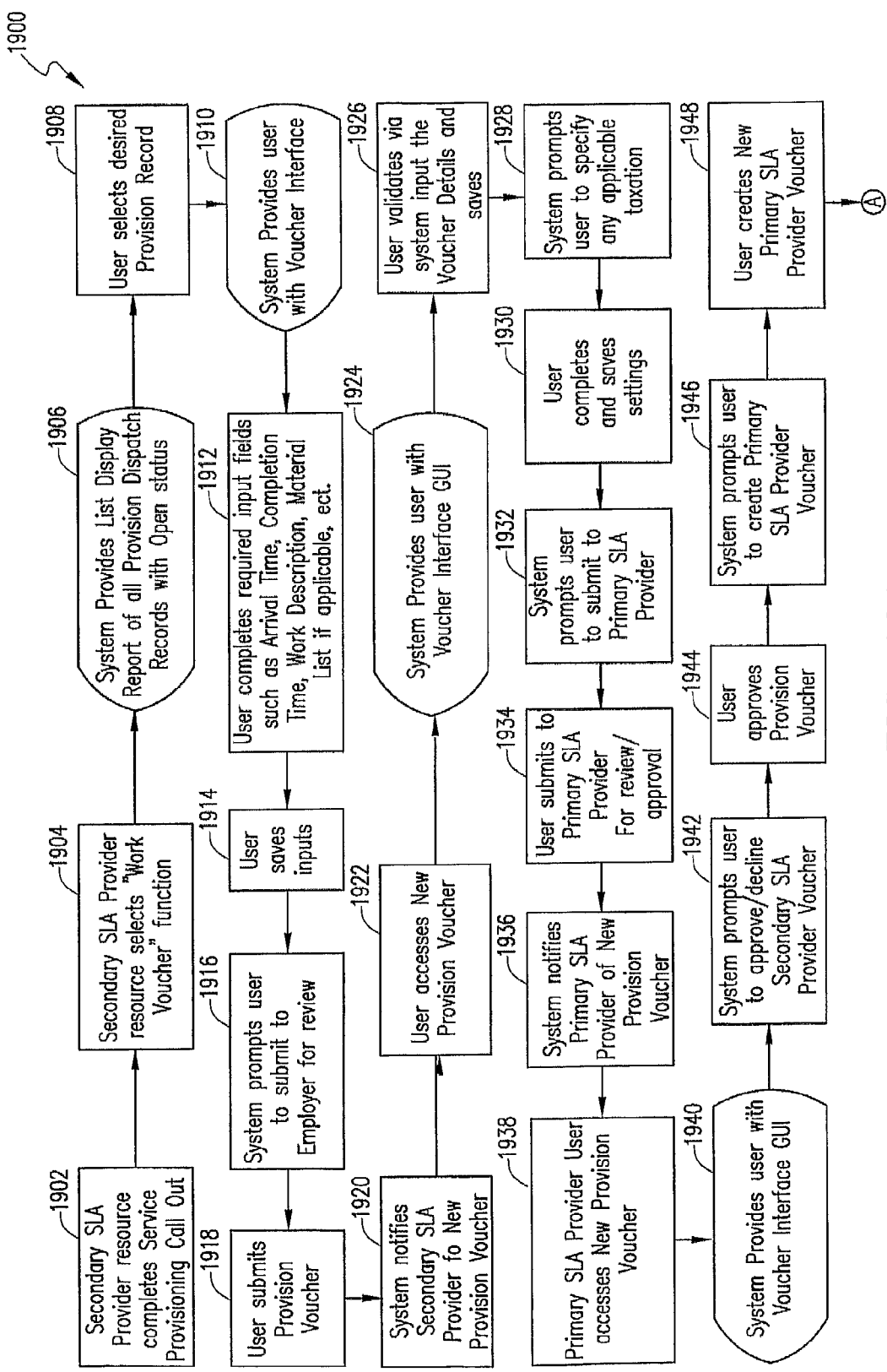
Figure 19B:
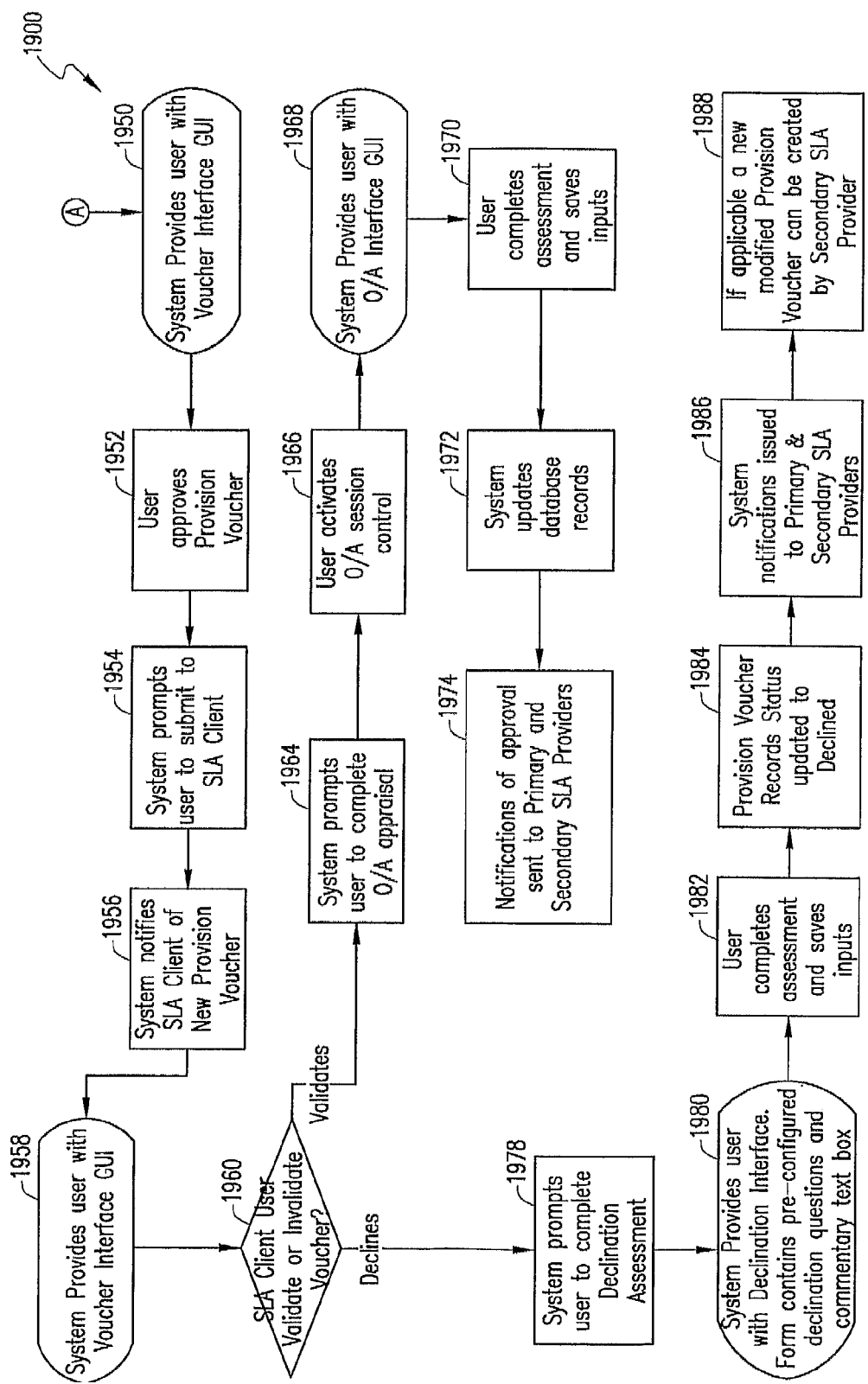
Figure 20:
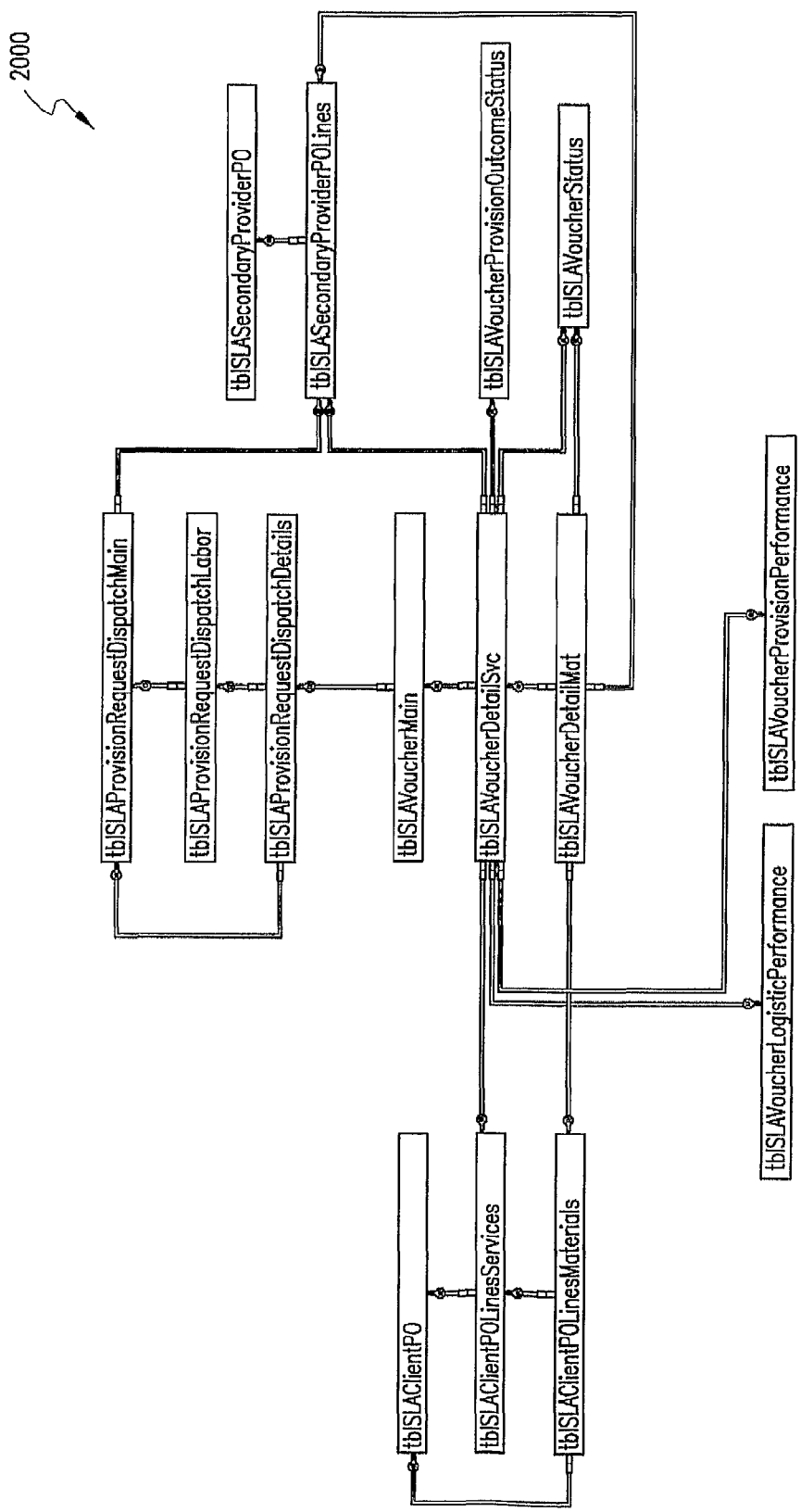
Figure 21:
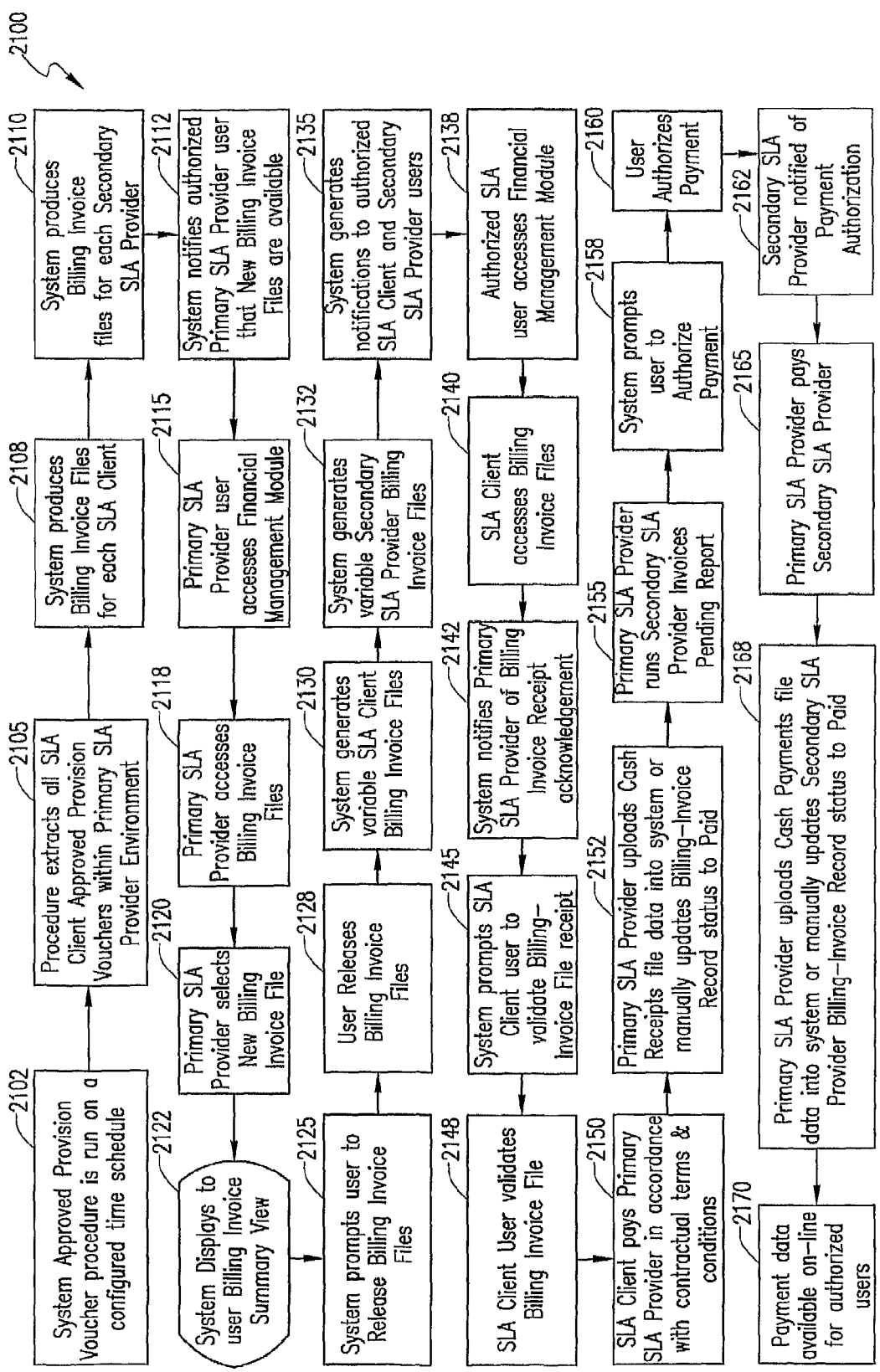
Figure 22:
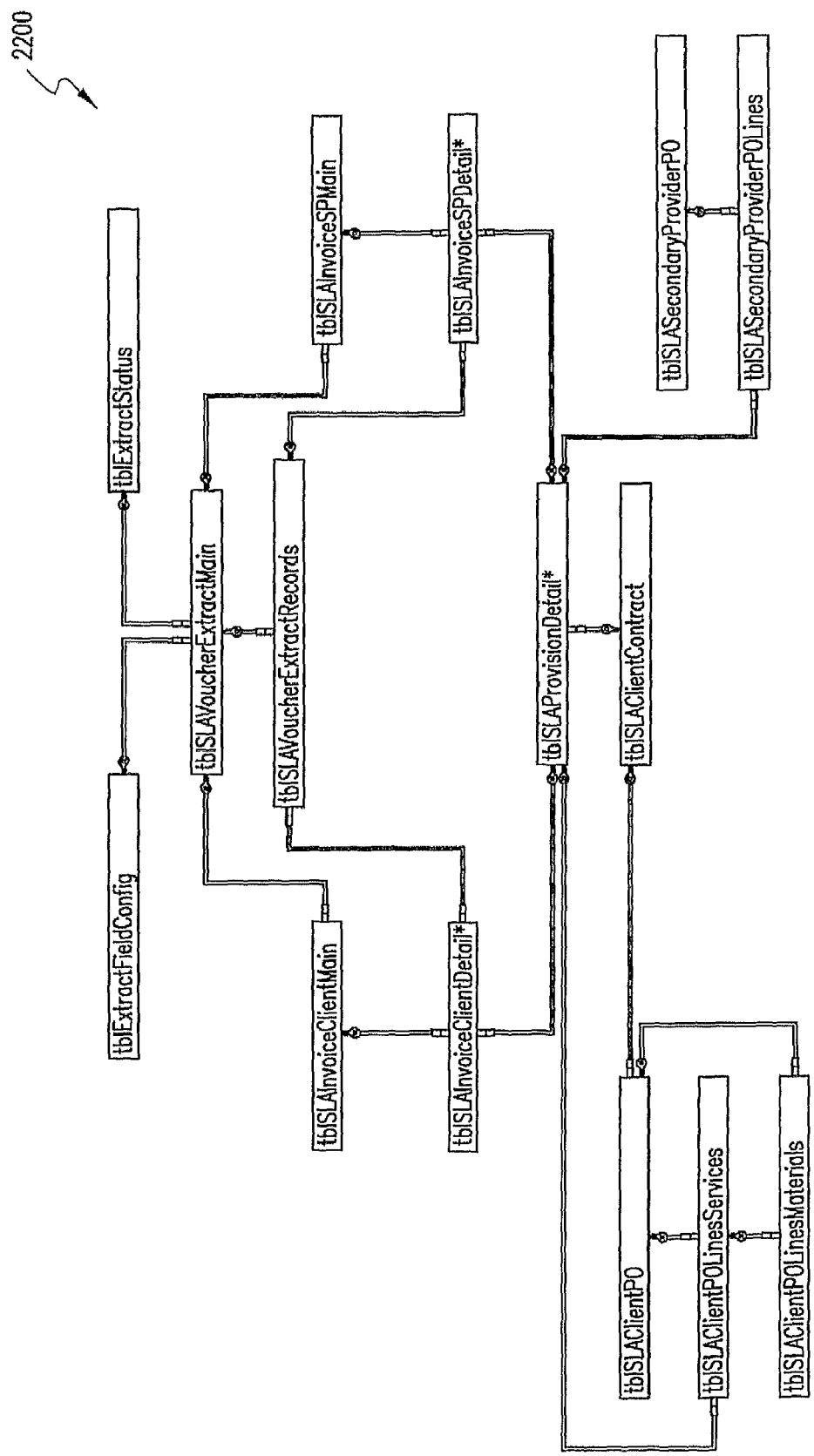
Figure 23:
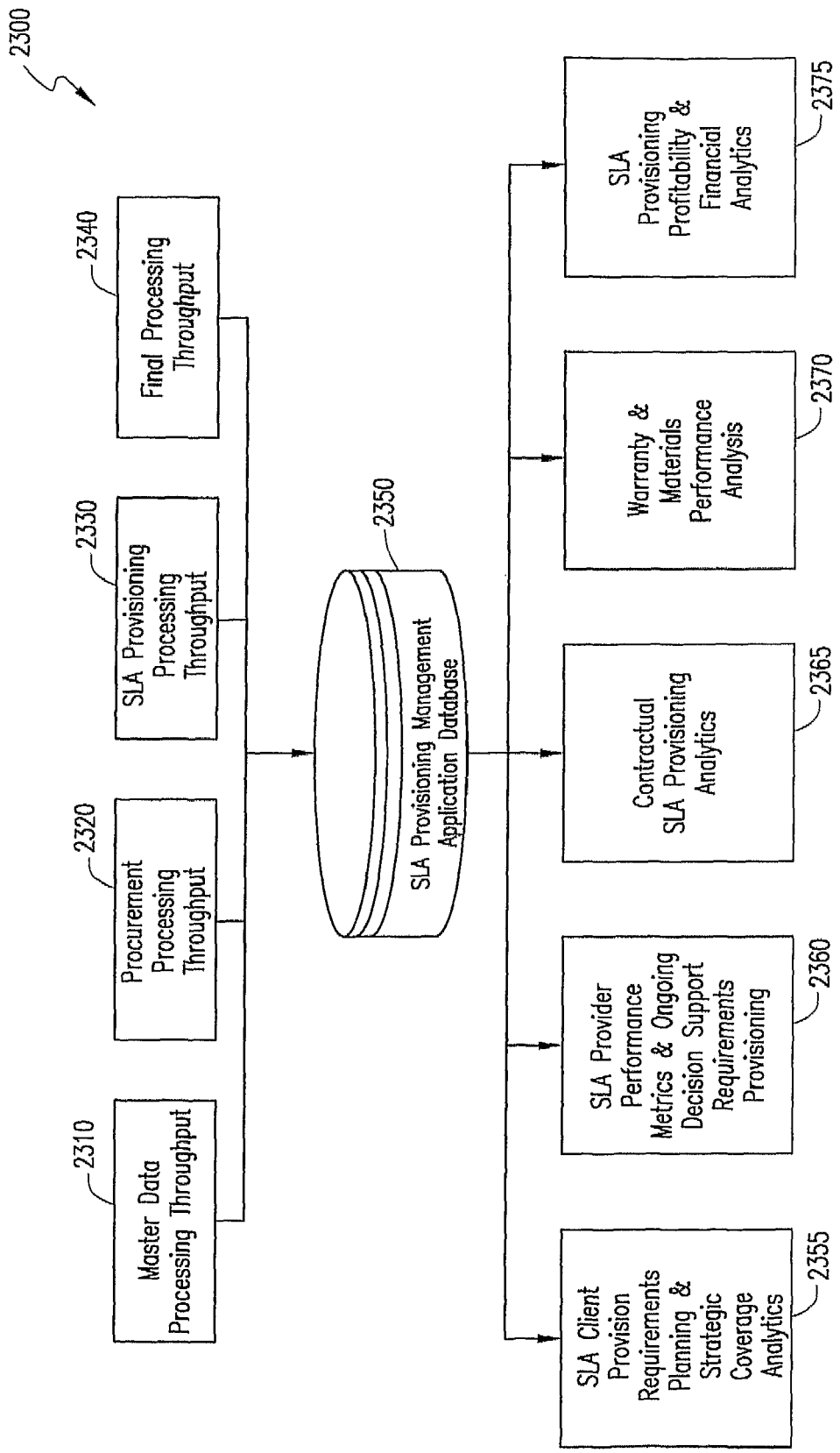

FIGS. 12A-B are flow diagrams that illustrate high-level processes applicable to procurement of outsourced secondary SLA services provision;

FIG. 13 is a database schema that supports a procurement function;

FIGS. 14A-B are flow diagrams that illustrate high-level processes applicable to human resource service provision management;

FIG. 15 is a flow diagram that illustrates a process of human resource calendar configuration;

FIG. 16 illustrates a database schema that supports a human resource service provision management function;

FIG. 17A is a flow diagram illustrating a process flow applicable to the logistical provision and administrative function;

FIG. 17B depicts an interface embedded with active controls for use in connection with the process flow of FIG. 17A;

FIG. 17C is depicts an interface embedded with active controls for use in connection with the process flow of FIG. 17A;

FIG. 18 illustrates a database schema that supports the logistical provision and administrative function;

FIGS. 19A-19B illustrate processes applicable to SLA provision work acknowledgement and quality assurance;

FIG. 20 illustrates a database schema that supports SLA provision work acknowledgement and quality assurance;

FIG. 21 is a flow diagram that illustrates processes applicable to a bill-pay function;

FIG. 22 illustrates a database schema that supports the bill-pay function;

FIG. 23 is a macro-level view of an information management and decision support function;

Table 1 is an illustrative storage table housing the identity of and general business data for an Primary SLA provider;

Table 2 is an illustrative storage table housing the identity of and general information for users associated with an SLA primary provider;

Table 3 is an illustrative storage table housing the identities of various SLA provision types;

Table 4 is an illustrative storage table housing the identities of various SLA provision labor types;

Table 5 is an illustrative storage table housing the identities of various SLA provision response time measurements;

Table 6 is an illustrative storage table housing the identities and properties of SLA materials;

Table 7 is an illustrative storage table housing the mapping relationship between SLA materials and locations;

Table 8 is an illustrative storage table housing the identities and properties of physical site locations;

Table 9 is an illustrative storage table housing the identities of physical site location types as stored in Table 8;

Tables 10-13 are illustrative hierarchical/relational storage tables housing the identities and relationships of geographical locations stored within the system;

Tables 14-22 are illustrative hierarchical/relational storage tables that house the source labor skill/attribute profiling data within the system;

Tables 23-25 are illustrative storage tables housing the identity of SLA provision labor profiles and related skills/attributes as created by primary SLA provider;

Table 26 is an illustrative storage table housing the mapping relationship and proficiency requirements between SLA provision labor profiles and SLA material master records;

Table 27 is an illustrative storage table housing the general business information relative to SLA clients;

Table 28 is an illustrative storage table housing the pertinent details relative to SLA client contracts;

Table 29 is an illustrative storage table housing the pertinent details relative to SLA client users;

Table 30 is an illustrative storage table housing the pertinent details relative to SLA client service provision records;

Table 31 is an illustrative storage table housing the pertinent details relative to SLA client service provision material records and the mapping relationship to a related service provision Record stored in Table 30;

Table 32 is an illustrative storage table housing the mapping relationship between an SLA client service provision record and system stored SLA provision labor profile;

Table 33 is an illustrative storage table housing the mapping relationship between SLA provision detail records and physical locations;

Tables 34-36 are illustrative storage tables housing details pertinent to purchase orders between a primary SLA provider and an SLA client;

Tables 37-38 are illustrative storage tables housing details pertinent to primary SLA provider RFx bids;

Table 39 is an illustrative storage table housing the mapping relationship between SLA client provision detail records and primary SLA provider RFx bids;

Table 40 is an illustrative storage table housing the identity and general business information applicable to secondary SLA providers;

Table 41 is an illustrative storage table housing the identity and general information applicable to secondary SLA provider users;

Tables 42-46 are illustrative storage tables housing the identities of SLA labor provision profile business families provided by secondary SLA providers and the geographical coverage area applicable to same;

Table 47 is an illustrative storage table housing the details pertinent to RFx bids posted to secondary SLA providers;

Tables 48-49 are illustrative storage tables housing the details applicable to secondary SLA provider RFx bid responses;

Table 50 is an illustrative storage table housing the details pertinent to human resource provision candidates submitted by secondary SLA providers in the course of the RFx bid response process;

Tables 51-52 are illustrative storage tables housing the details applicable to purchase orders between primary SLA providers and secondary SLA providers;

Table 53 is an illustrative storage table housing the identity and details applicable to service provision labor resources;

Table 54 is an illustrative storage table housing the assignment details applicable to individual service provision labor resources;

Tables 55-57 are illustrative storage tables housing information relative to service provision labor resources' calendar/time availability;

Tables 58-63 are illustrative storage tables housing base source data used by a calendar system;

Tables 64-66 are illustrative storage tables housing the identity of and details applicable to an SLA provision service request;

Table 67 is an illustrative storage table housing the status codes that can be used in conjunction with an SLA provision service request;

Table 68 is an illustrative master storage table housing the identity and base details pertinent to a provision dispatch request;

Table 69 is an illustrative storage table that houses details pertinent to SLA resource availability in conjunction with an SLA provision service request;

Table 70 is an illustrative storage table that houses the SLA resource preference options available to a primary SLA provider user during the process, the value being stored in Table 68;

Table 71 is an illustrative storage table that houses the potential status codes applicable to an SLA provision service request during its life cycle, the value being stored in Table 68;

Table 72 is an illustrative storage table that houses the specific details pertinent to the provision dispatch request;

Table 73 is an illustrative master storage table housing the identity and base details pertinent to an SLA provision voucher;

Table 74 is an illustrative storage table housing the service details applicable to an SLA provision voucher;

Table 75 is an illustrative storage table housing the material details applicable to an SLA provision voucher;

Table 76 is an illustrative storage table housing the potential provision outcome result disposition types applicable to an SLA provision voucher line item;

Table 77 is an illustrative storage table housing the potential status codes applicable to an SLA provision voucher through out its life cycle;

Table 78 is an illustrative storage table housing the potential quality performance disposition codes applicable to an SLA provision voucher line item;

Table 79 is an illustrative storage table housing the potential administrative performance disposition codes applicable to an SLA provision voucher line item;

Table 80 is an illustrative storage table housing the identity of primary declination codes utilized by an SLA client while reviewing an SLA provision voucher;

Table 81 is an illustrative storage table housing details pertinent to declined SLA provision vouchers;

Table 82 is an illustrative storage table housing the identity and base information pertinent to the approved SLA voucher extract batch file;

Table 83 is an illustrative storage table housing the identity and base information pertinent to the specific records associated with an approved SLA voucher extract batch file;

Table 84 is an illustrative storage table housing the identity and base information pertinent to the SLA client invoice-billing file;

Table 85 is an illustrative storage table housing the identity and information pertinent to the specific records associated with an SLA client invoice-billing file;

Table 86 is an illustrative storage table housing the identity and base information pertinent to the secondary SLA provider invoice-billing file; and Table 87 is an illustrative storage table housing the identity and information pertinent to the specific records associated with a secondary SLA provider invoice-billing file;

Table 88 is an illustrative storage table housing the identities of various "SLA client provision coverage periods;

Table 89 is an illustrative storage table housing the identities of miscellaneous SLA provision expense types that could be encumbered by a labor resource in the course of providing services to a SLA client;

Table 90 is an illustrative storage table housing the values of secondary SLA provider bid response billing rates applicable to specific SLA client provision coverage periods; and Table 91 is an illustrative storage table housing the values of secondary SLA provider bid response billing rates applicable to specific SLA provision expense types.

Those having skill in the art will appreciate that the illustrative table entries shown in Tables 1-91 are not an exhaustive list of potential data values. Addition of other data values is a simple database modification that can easily be achieved by one of ordinary skill.

DETAILED DESCRIPTION OF ILLUSTRATIVE EMBODIMENT(S) OF THE INVENTION

Various embodiments of the invention provide a comprehensive, web-enabled computer system and method for enabling and managing primary business functions applicable to outsourced service level agreement (SLA) provisioning among primary SLA providers, secondary SLA providers, and SLA clients. The primary business functions include contract management, procurement, human resource deployment, SLA logistics, SLA deliverable management, financial data processing, inter-enterprise system collaboration, and reporting/information management. For purposes of this patent application, the term business function refers to any one of a plurality of core business endeavors present in a best practices SLA management system, including a master data function, a procurement function, a human resource service provision management function, a provision administration function, an SLA work acknowledgement and quality assurance function, a bill/pay function, and an information management/reporting function.

From a high-level perspective, robust business functionality is, in a typical embodiment, incorporated over a collaborative web-enabled data processing environment supported by a database designed specifically to acquire, process, and manage data applicable to the outsourced SLA provisioning commodity. The data processing environment, referred to as an SLA provisioning management environment, typically includes the master data function, the procurement function, the human resource service provision function, the provision administration function, the SLA work acknowledgement and quality assurance function, the bill/pay function, and the information management/reporting function.

The master data function stores SLA client master data that is applicable, for example, to general business information, logistical control information, SLA contract information, SLA provision detail information, and purchase order information. The master data function may also store an SLA provision skill profiling and job description source library, an SLA provision skill profile library, and an SLA provision detail to SLA provision skill profile matrix.

The procurement function typically performs multiple functions to enable primary SLA providers to acquire and store business information applicable to secondary SLA providers, to enable primary SLA providers to classify secondary SLA providers in terms of SLA skill provision and geographical coverage capabilities, to enable primary SLA providers to systematically identify and quantify SLA client coverage requirements as detailed in the master data function, to enable primary SLA providers to generate systematic RFx bids from SLA client coverage records, to enable primary SLA providers to systematically and logically generate bid solicitation listings of secondary SLA providers for each RFx bid created, to enable secondary SLA providers to systematically generate RFx bid responses and submit applicable human capital resources affiliated with the responses as needed, to enable primary SLA providers to systematically review submitted request for quote/request for proposal/request for bid (RFx) bid responses, and to enable primary SLA providers to systematically accept/award RFx bid responses and create secondary SLA provider purchase orders with reference to the RFx bid response details.

The human resource service provision management function typically performs multiple functions to enable primary SLA provider review and approval disposition of submitted RFx bid response candidates, to enable systematic primary SLA provider disposition/status notification regarding submitted RFx bid response candidates to the secondary SLA provider, to enable SLA provision resource record creation by a primary SLA provider upon approval/acceptance of submitted RFx bid response candidates, to enable secondary SLA provider human resource(s) system access, to enable systematic agreement execution by secondary SLA provider human resource(s), to enable work availability calendar administration/configuration by secondary SLA provider and approved human resource(s), to enable primary SLA provider logistical time coverage evaluation and to enable primary SLA provider proactive human resource black out period mediation.

The provision administration function typically performs multiple functions to enable service provision request functionality by which an SLA client can create and submit a service provision request to a primary SLA provider and to enable primary SLA provider system query features that can be used to output a listing of configured secondary SLA providers as well as their applicable pricing and availability of pertinent human capital resources designated for service provision dispatch. Query criteria can be generated via selective user input or systematic input as would be the case upon receipt of a distinct SLA client service provision request.

The provision administration function also typically performs multiple functions to enable a primary SLA provider to systematically submit a service provision dispatch request record to a secondary SLA provider, to enable a secondary SLA provider to confirm resource availability and subsequent dispatch of the resource to the primary SLA provider and to enable a primary SLA provider to confirm resource dispatch to an SLA client.

The SLA work acknowledgement and quality assurance function typically performs multiple functions to enable secondary SLA provider resource access to a service disposition voucher function by which details relative, for example, to work performed, materials deployed, and timing are input in response to a service provision dispatch request, to enable a secondary SLA provider to submit a service disposition voucher to an SLA client for review and approval disposition, to enable an SLA client to process a secondary SLA provider service disposition voucher and provide quality assurance assessment information, and to enable an SLA client to submit a disposed-of secondary SLA provider service disposition voucher to a primary SLA provider.

The bill/pay function typically performs financial data processing functions enabling configured systematic extract of approved SLA client approved service disposition vouchers, systematic generation of primary SLA provider to SLA client billing-invoice files, systematic generation of secondary SLA provider to primary SLA provider billing invoice files, primary SLA provider payment receipt data upload feature upon SLA client payment, and primary SLA provider payment release to secondary SLA provider feature premised upon SLA client payment.

The information management/reporting function typically performs a general information outputs function. The function leverages acquired system data to produce reports and analytics.

Figure 1:
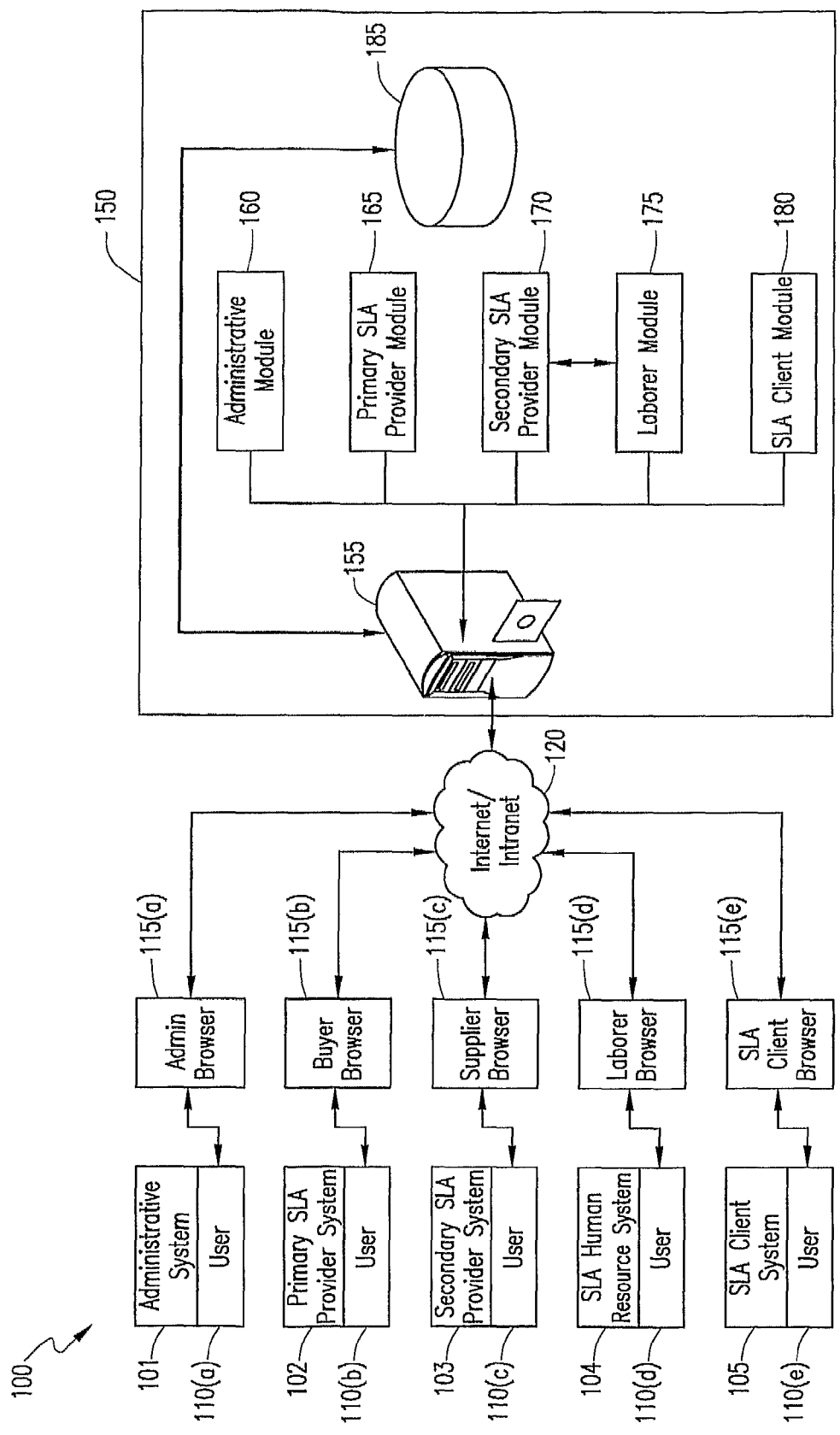

Turning now to the FIGURES, FIG. 1 is a high-level view of physical communications/data network. Five primary types of computer network points are illustrated within FIG. 1, namely, a browser or other user interface (UI), a communications/web server, an application server, an application module, a database server, and a database. Although a typical environment includes a hosted web-enabled solution, various embodiments could be ported over a wide area network (WAN) while utilizing an Intranet. With minimal modifications in hardware and application programming, application of various principles described herein are not limited from a computer environment perspective.

Referring again to FIG. 1, a computer system 100 includes a procurement/SLA management system 150, user systems 101-105 operable by system users 110(a)-(e) via system browsers 115(a)-(e), an internet/intranet communications network 120, an application server 155 including data processing modules 160-180, and a database system 185. The user systems 101-105 are system entrance and access portals typically represented by minimal login/security functionality and a graphical user interface (GUI).

The data processing modules 160-180 include an administrative module 160, a primary SLA provider module 165, a secondary SLA provider module 170, a laborer module 175, and, for example, an SLA client module. The administrative module 160 could in some embodiments be eliminated if a primary SLA provider were to purchase or license a solution in total and place the system 100 on its own infrastructure.

The primary SLA provider module 165 functions as a business administrator for the computer system 100 and, in a typical embodiment, controls upload of SLA clients, secondary SLA providers, application users, and SLA human resource laborers. Those having skill in the art will appreciate that the primary SLA provider is the business entity that has SLA clients, is contracted to provide SLA and other services, sub-contracts with secondary SLA providers, and is ultimately responsible for the quality of SLA provision personnel and the SLA provision work performed.

The secondary SLA provider module 170 supports communications and business processing for business entities that sub-contract with primary SLA providers to provide SLA provision coverage. The SLA laborer module 175 supports communications and business processing for individual SLA provision laborers that are engaged by sub-contracted secondary SLA providers. The SLA client module 180 supports communications and business processing for individual SLA clients that require and contract SLA provision.

In various embodiments, collaborative communications and business processing capabilities bring the diverse entities illustrated as part of the computer system 100 together in a managed real-time data-processing setting. In contrast, in many prior systems, multiple systems have typically been utilized in attempts to manage these business endeavors. In the past, client data and activities have typically been administered in a customer relationship management (CRM) or other custom application, while logistics are administered within some type of project management application; meanwhile, the supplier and human resource administration functions and details are typically managed in additional applications, if at all.

The system 100 is a full life-cycle procurement, logistical management and administrative solution that binds the primary SLA provider, secondary SLA provider(s), and SLA client together into one collaborative work environment. The system 100 serves to enable primary SLA provider control over: SLA provision logistics planning, provision resource skill levels/proficiencies, provision resource availability/capacity, SLA provision resource dispatch, SLA provision process communications, SLA provision quality assurance and return on investment management. Additionally, the system 100 integrates all of the core functional business processes, such as but not limited to, vendor management, procurement, accounting, finance and risk management into one environment so that the use of multiple disparate and costly applications can be avoided.

Figure 2A:
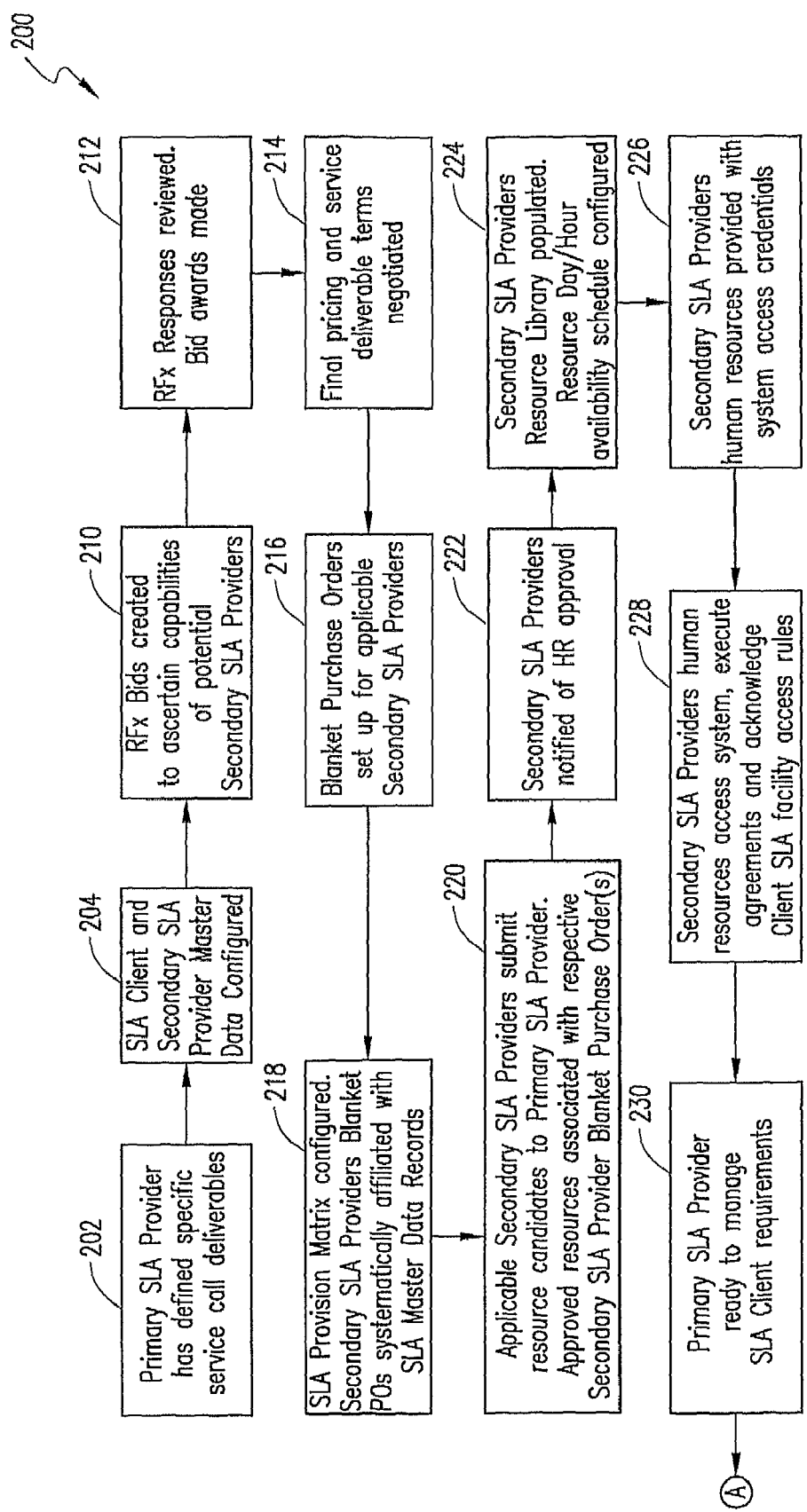
Figure 2B:
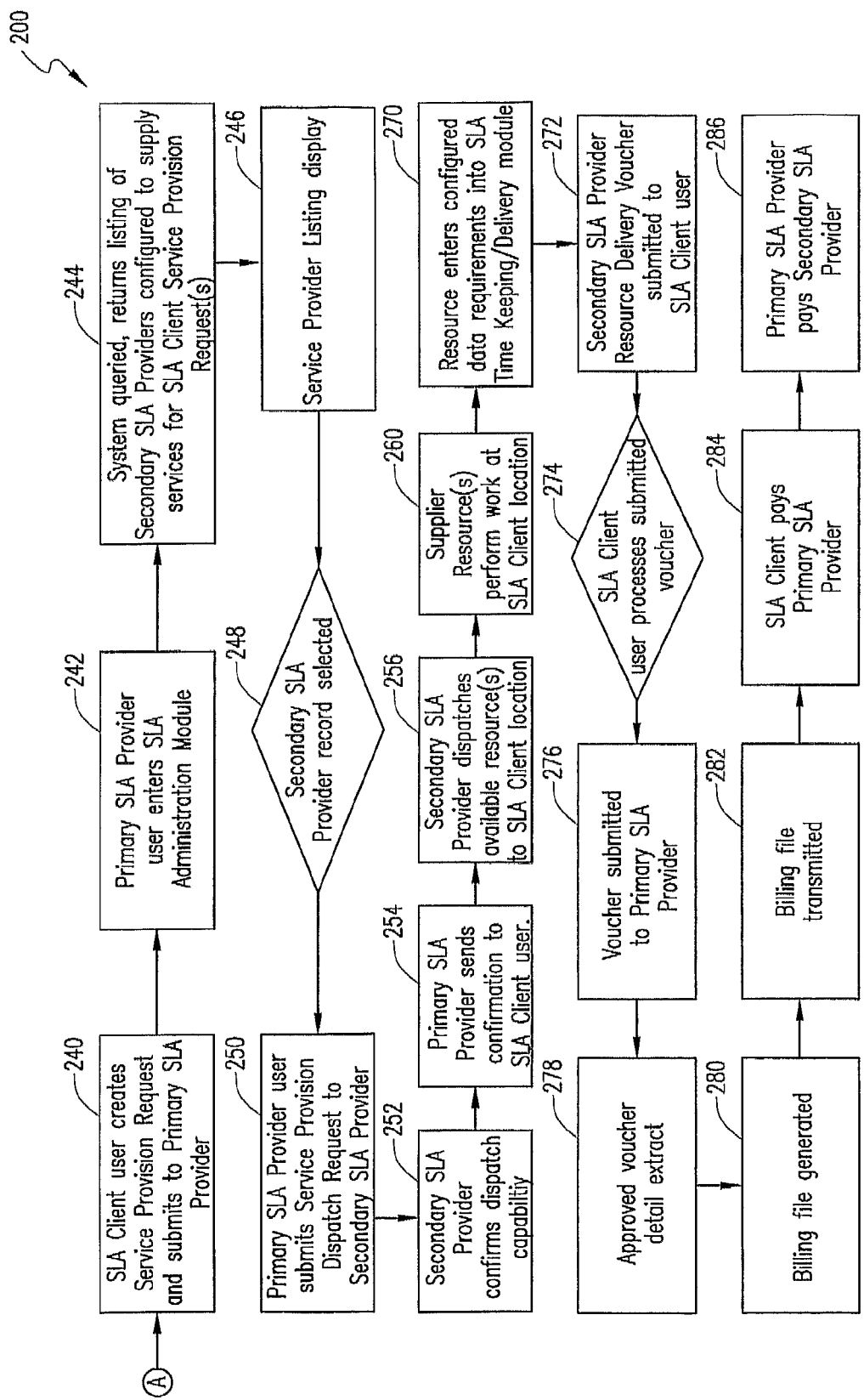

FIGS. 2A-B represent a high-level end-to-end view of a system and method for managing outsourced service level agreement (SLA) and non-SLA deliverables. In FIG. 2A, a process flow 200 begins at step 202. At step 202, a primary SLA provider has defined or anticipated specific service call deliverables associated with one or more SLA clients at one or more geographic locations. At step 204, master data corresponding to an SLA client and a secondary SLA provider is configured. At step 210, RFx bids are created from SLA requirement records to ascertain pricing and resource capabilities of potential secondary SLA providers. At step 212, RFx responses are reviewed and bid awards are made based upon service provision capability and pricing. At step 214, final pricing and service deliverable terms are negotiated with applicable service providers.

At step 216, blanket purchase orders are set up for applicable secondary SLA providers. At step 218, an SLA provision matrix is configured and secondary SLA provider blanket purchase orders are systematically affiliated with SLA master data records. The primary SLA provider maintains edit control over the matrix and can manually build relationships, as would be the case where a secondary SLA provider is identified via a non-competitive bid process. At step 220, applicable secondary SLA providers submit resource candidates to the primary SLA provider. Approved resources are associated with respective secondary SLA provider blanket purchase orders. At step 222, the secondary SLA providers are notified of human resource (HR) approval. At step 224, a secondary SLA provider resource library is populated and a system-provided resource day/hour availability schedule is configured.

At step 226, the secondary SLA provider human resources are provided with system access credentials. At step 228, the secondary SLA providers human resources access the system 100, execute agreements, and acknowledge client SLA facility access requirements/rules. At step 230, the primary SLA provider is ready to manage SLA client requirements.

Referring now to FIG. 2B, execution proceeds from step 230 to step 240. At step 240, an SLA client user creates a service provision request and submits same to the primary SLA provider. At step 242, a primary SLA provider user enters the SLA administration module 160. At step 244, the system 100 is queried and returns a listing of all secondary SLA providers configured to supply services for the SLA client service provision request(s). At step 246, the service provider listing displays, for example, approved service provider resources, resource availability, blanket purchase order reference and contract service charge, and an applicable past performance delivery matrix. At step 248, a secondary SLA provider record is selected. At step 250, the primary SLA provider user submits a service provision dispatch request to the secondary SLA provider. At step 252, the secondary SLA provider confirms dispatch capability.

At step 254, the primary SLA provider sends confirmation to the SLA client user. At step 256, the secondary SLA provider dispatches available resource(s) to the SLA client location. At step 260, the supplier resource(s) perform work at the SLA client location. At step 270, the supplier resource enters configured data requirements into the SLA timekeeping/delivery module. At step 272, a secondary SLA provider resource delivery voucher is submitted to the SLA client user. At step 274, the SLA client user processes the submitted voucher and completes a deliverable rating. At step 276, the voucher is submitted to the primary SLA provider and is approved. At step 278, a systematic configured approved voucher detail extract occurs and a billing file is generated for the SLA client. At step 282, the billing file is transmitted to the SLA client. At step 284, the SLA client pays the primary SLA provider. At step 286, the primary SLA provider pays the secondary SLA provider.

FIG. 3 is an illustrative web home page for a primary SLA provider user. In FIG. 3, UI 300 has been segmented into two primary sections, a user navigation bar/menu 310 and an activity dashboard 320. The navigation bar/menu 310 is the primary UI mode to activate application functionality as desired, while the activity dashboard 320 serves a user to highlight/prompt specific business activities that need attention. The user is able to navigate to the same application functions and forms via ether the user navigation bar/menu 310 or the activity dashboard 320.

Typical information aspects of the master data function are general business information, logistical control information, SLA contract information, and SLA provision detail information. General business information includes information pertinent to the primary SLA provider and SLA client. Illustrative database tables used for the storage of the general business information include Tables 1-2, 8-9, 27, and 29. Examples of general business information include business information elements regarding the business entity type, incorporation identity, operational locations, company size, employee count, and user information. Physical-location geography is defined in terms of database settings as represented, for example, in Tables 10-13. This geographic schema, which can be expanded to incorporate mail code or other unique settings such as business districts, enables a location to be defined in terms of country, region, county, and city/population center.

The logistical control information represents a basic definition of the primary SLA provider's business model in terms of SLA provisioning. There are various types of information defined, of which one group of information deals with provision service types, provision labor types, provision time frames, provision materials, and provision material stocking facilities. Illustrative database tables used for the storage of the logistical control information include Tables 3-7 and 88-89.

Data values utilized by a specific primary SLA provider are preferential and will often vary greatly from industry to industry and from company to company. The storage tables represent base data that could be used by a primary SLA provider while managing specific transactional records. Thus, the configuration data could be viewed as a source library by which the primary SLA provider defines the potential data values to be encountered in terms of provision service types and provision SLA response time frames. Other information groups defined as sources for the logistical control information are an SLA job description source library, an SLA provision skill profile library, and an SLA provision detail to SLA provision skill profile matrix.

The information (i.e., SLA job description source library, SLA provision skill profile library, and SLA provision detail to SLA provision skill profile matrix) typically includes details pertinent to a business or technical aptitude applicable to the services provision being provided by the primary SLA provider resource to collective SLA clients. While the logistical control information elements discussed above deal with how business, is conducted this control data defines what the provision field of endeavor is. Illustrative database tables used for the storage of the SLA provision resource skill profile information include Tables 23-26. These tables store the identity of specific SLA resource provision skill/attribute profiles created by a primary SLA provider and the details applicable to the profile.

Table 26 specifically maps any applicable material master records to a provision resource profile as deemed necessary. A typical case in point is a manufacturer of gas-fired generators. In such a case, a specific SLA provision profile may be created for a repair or installation technician. Furthermore, the manufacturer may want to designate only specific generator unit models to be associated with the SLA provision profile and, going a step further, associate specific unit parts for which the SLA provision profile must have technical proficiency in servicing.

As can be seen from Tables 23-25, most of the data elements contained within these tables are integers and not text fields because the system 100 is well-defined with a hierarchical data library serving as the source for the SLA resource provision skill/attribute profile tables. The source library data is contained in Tables 14-22. Tables 14-22 contain the skill set profile source data, while Tables 23-25 contain the information pertinent to a specific configured and saved SLA provision resource profile. Though not explicitly depicted, source data related to skill set profiling can be introduced to the data environment to meet the needs of the primary SLA provider.

The master data function illustrated above generally at steps 202-204, represents a foundational cornerstone from which all SLA provisioning activities are managed. In the above-referenced narrative, a primary SLA provider defines, for example, what it is in business for, how it conducts business, the types of business/technical resources it utilizes to provide client services, and where it generally conducts business. FIGS. 4-9 and Tables 1-36 provide further information regarding the master data function.

Figure 4:
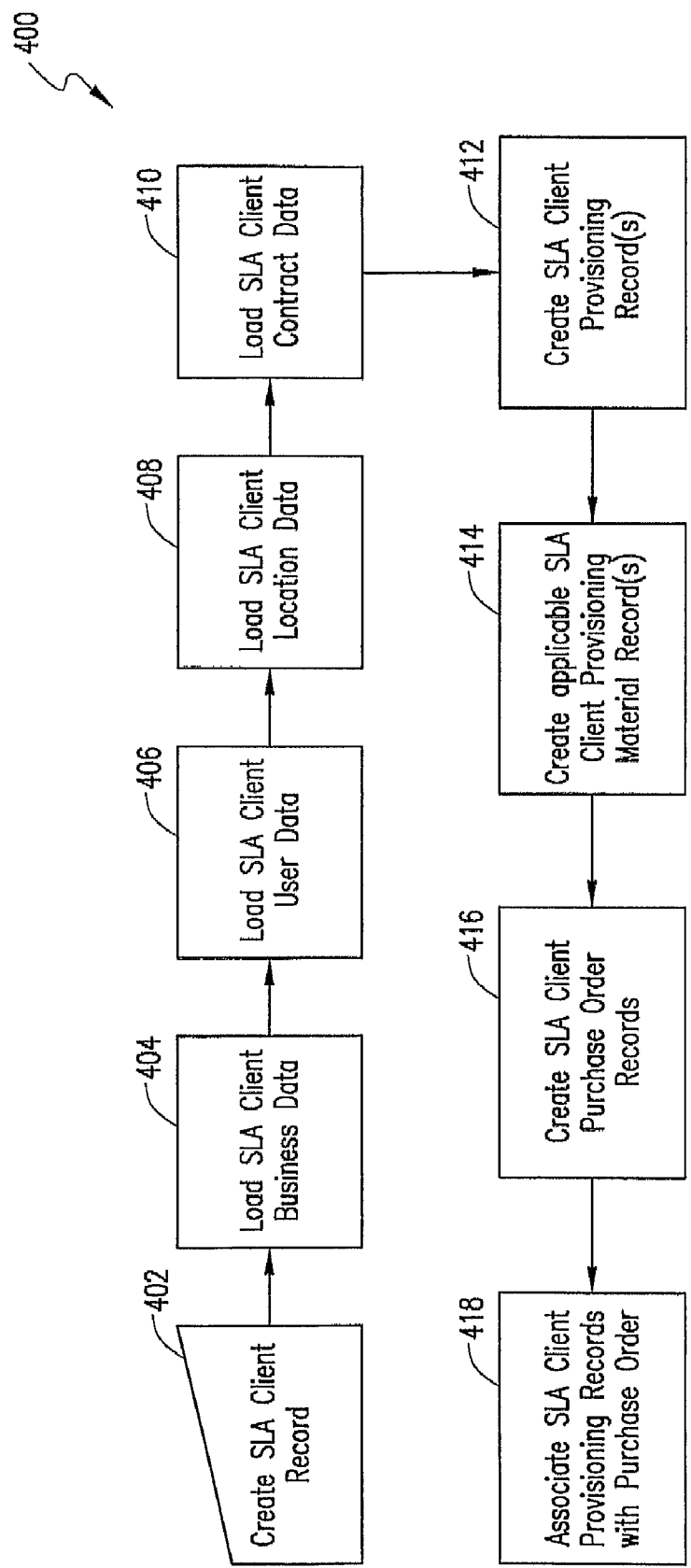
FIG. 4 is a flow diagram that illustrates high-level functionality of an SLA client master data function.

FIG. 4 is a flow diagram that illustrates high-level functionality of the SLA client master data function. Data record type creation is depicted in FIG. 4 as being a linear process. The depicted process is not necessarily a requirement or constraint but is only displayed as such for purposes of general understanding. One skilled in the art will appreciate that certain data record types are logically dependent upon a master data record prerequisite. For instance, it would be impossible to load SLA client user information if there were no SLA client business entity record to be associated with.

Returning again to FIG. 4, a process flow 400 begins at step 402. At step 402, an SLA client record is created either manually or via a data feed. At step 404, SLA client business data is loaded either manually or via a data feed. At step 404, SLA client user data is loaded either manually or via a data feed. At step 408, SLA client location is loaded either manually or via a data feed. At step 410 SLA client contract is loaded. At step 412, SLA client provisioning record(s) are created. At step 414, applicable SLA client provisioning material record(s) are created. At step 416, SLA client purchase order record(s) are created. At step 418, the SLA client provisioning records are associated with a purchase order to create purchase order line items.

FIG. 5 is a flow diagram that illustrates a process for creation and library storage of an SLA provision labor profile. In general terms, this profile represents the skills attributes necessary for a human resource laborer to perform provisioning services associated with a primary SLA provider product or system. In FIG. 5, a process 500 begins at step 502. At step 502, a primary SLA provider user navigates to an SLA service provision skill profile control from a home page. At step 504, the user selects a create new provisional skill profile option. At step 506, the user selects business sector from a pull down list display. At step 508, the user selects a business arena from a constrained pull down list display. At step 510, the user selects a business family from a constrained pull down list display.

At step 512, the user selects general functions from a constrained pull down list display. At step 514, the user selects skills/attributes from constrained pull down menu(s). At step 516, the user adds custom certifications, attributes, etc. . . . not contained in a source data library. At step 518, the user associates a service profile with material master record(s) and specifies a required proficiency. At step 520, the user adds a job title and optional prose description. At step 522, the user saves the created record. At step 524, a determination is made whether the job title is unique. If so, execution proceeds to step 526, at which step the record is stored in an SLA provision labor profile library. If, at step 524, the job title is not determined to be unique, execution returns to step 520. In an optimized environment, a primary SLA provider creates the full slate of service profiles that would satisfy all provisioning obligations.

FIG. 6 is a flow diagram that illustrates a process for creation and library storage of SLA provision materials. In FIG. 6, a process 600 begins at step 602, at which step the primary SLA provider user navigates an SLA provision materials module. At step 604, the user selects create new material master record. At step 606, the user specifies a short material name. At step 608, the user specifies a description of the material. At step 610, the user specifies if the material is a function or a finished good. At step 612, the user specifies if the material is stocked. At step 614, the user specifies the manufacturer of the material. At step 616, the user specifies the last cost of the material. At step 618, the user specifies the last cost date of the material. At step 620, the user specifies the quantity of inventory on hand of the material. At step 622, the user specifies a replenishment stock point for the material. At step 624, the user specifies a replenishment stock quantity for the material. At step 626, the user saves settings.

At step 628, a determination is made whether the material is stocked. If it is so determined at step 628, execution proceeds to step 630. At step 630, the user is provided a graphical user interface (GUI) enabling selection of location records. At step 632, the user selects locations and defines an on-hand quantity. At step 634, the user selects save settings. At step 636, the saved settings are stored in the SLA provision material library. If at step 628, it is not determined that the material is stocked, execution proceeds to step 636.

Various aspects of a job description may be defined, for example, in non-prose or database terms. Simple job description profiling may be enabled if that is a primary SLA provider's desired business mode. In such a case, the skill profiling tool can be bypassed, enabling the upload or manual creation of defined job titles and descriptions that are representative of the skills needed to provide SLA client services provision. FIGS. 5 and 6 are illustrative of these concepts.

Definition of the logistical control information centers upon the primary SLA provider's core competency; thus, outside the context of a specific SLA client's provisioning needs, it is logical to define and document what the scope of provisioning services could be with regard to labor, warranty, timing, equipment, etc . . . , which definition takes place within this information management endeavor.

The system 100 initiates a referential cycle by enabling the primary SLA provider to upload or input base details relative to SLA client contracts. Table 28 provides an illustrative view of high-level information stored relative to a specific contract. Most of the data is basic business information; however, Table 28 also stores the number of specific distinct provisioning services that are applicable to the contract record. A reason for the provisioning count is to make sure that, as the process proceeds, there are no holes in the provisioning network and that all contracted services are engaged and accounted for. After entry of base contract data, the primary SLA provider is enabled to use a specific SLA contract record as a reference point to create more precise SLA provision detail records. See, e.g., Tables 30-33.

Figure 7:
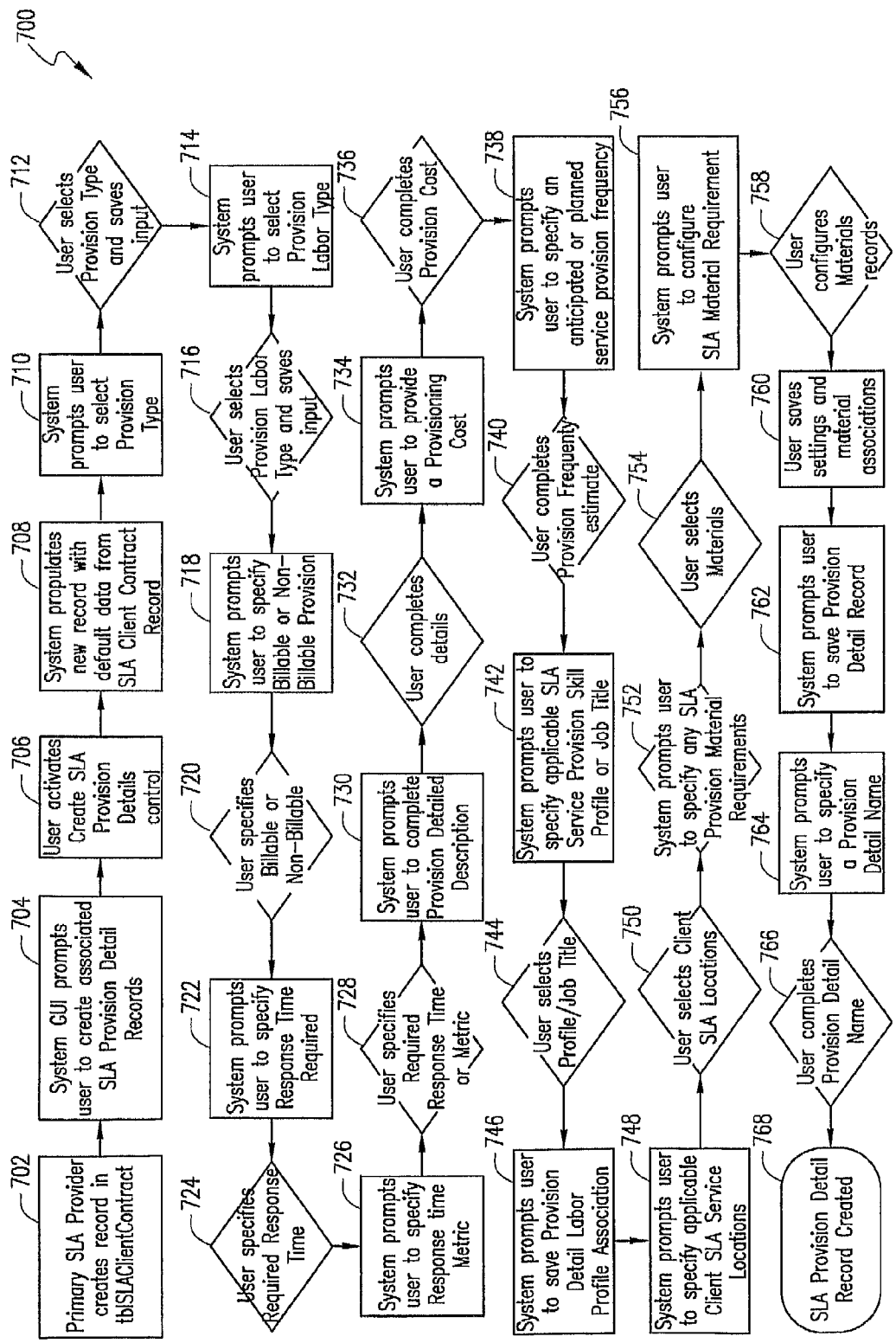
FIG. 7 is a flow diagram that illustrates creation and storage processes pertinent to SLA provision records.

FIG. 7 is a flow diagram that illustrates creation and storage processes pertinent to SLA provision records. In FIG. 7, a process flow 700 begins at step 702, at which step a primary SLA provider loads contract data fields and creates a record in tblSLAclientContract (See Table 28). The process 700 could, for example, be a linear process flowing from entry of base contract information or the user could be provided a GUI enabling the user to select a specific SLA contract record from a list display of multiple SLA contract records filtered by SLA client or other variables.

Steps 704-708 pertain to creation of an SLA provision detail record. At step 704, a system GUI prompts the user to create associated SLA provision detail records. At step 706, the user activates a create SLA provision details control. At step 708, the system 100 populates the new record with default data from the SLA client contract records.

Steps 710-712 pertain to selection of a specific provision type that would have already been established via application configuration with possible values being stored, for example, in Table 3. At step 710, the system 100 prompts the user to select a provision type. At step 712, the user selects a provision type and saves the input.

Steps 714-716 pertain to selection of a specific provision labor type that would have already been established via application configuration with possible values being stored, for example, in Table 4. At step 714, the system 100 prompts the user to select a provision labor type. At step 716, the user selects a provision labor type and saves the input.

Steps 718-720 pertain to user specification regarding the billable or non-billable nature of the SLA activity. A non-billable activity would be the case if the contract called, for example, for warranty service. At step 718, the system 100 prompts the user to specify billable or non-billable provisions. At step 720, the user specifies billable or non-billable and saves the input. From step 720, execution proceeds to step 722.

Steps 722-724 pertain to user specification regarding the time constraint applicability for this record, wherein the illustrated decision path from 724=yes. At step 722, the system 100 prompts the user to specify whether a response time is required. At step 724, the user specifies whether a response time is required and saves the input.

Steps 726-728 pertain to selection of a specific provision service response time that would have already been established via application configuration with possible values being stored, for example, in Table 5. This SLA service response time is the time differential from SLA client notification of a problem to service commencement by an SLA service provider as established between the parties and typically documented within an applicable SLA contract. At step 726, the system 100 prompts the user to specify a response time metric, if applicable. At step 728, the user specifies the required response time or metric and saves the input.

Steps 730-732 pertain to user descriptive commentary input of particular details, contract information, or general information as desired. At step 730, the system 100 prompts the user to complete provision detailed description. At step 732, the user completes the details and saves the input.

Steps 734-736 pertain to user specification/estimation of primary SLA provision cost. At step 734, the system 100 prompts the user to provide a provisioning cost. At step 736, the user completes the provision cost and saves the input.

Steps 738-740 pertain to user specification/estimation of the number of SLA provision service occurrences that may apply. Basic logistical planning typically demands such a projection. Such information has a direct impact upon an ensuing RFx bid process. The information constitutes the quantity through which a service provider plans resource availability and leverages the bid process to ascertain best negotiated pricing. At step 738, the system 100 prompts the user to specify an anticipated or planned service provision frequency. At step 740, the user completes the provision frequency estimate and saves the input.

In the process depicted in steps, 742-746 the user is prompted to select a specific SLA provision skill profile to associate with the SLA provision detail record. The user has an option to select either an SLA provision skill profile or as previously indicated a stored job title if the primary SLA provider opts to use this mode. Although the process depicts the selection of a previously-stored record, the system 100 could support variable creation of either a job title/description SLA provision skill profile. Best practices entail previously-created and stored SLA resource provision profile records premised upon the primary SLA provider's business dynamic. The previously-saved resource profile record details are stored, for example, in Tables 23-25. At step 742, the system 100 prompts the user to specify applicable SLA service provision skill profile or job title. At step 744, the user selects a profile/job title from a pull down menu. At step 746, the system 100 prompts the user to save a provisional detail labor profile association and the user saves the association.

In the process depicted in steps 748-750, the user is prompted to select and associate the applicable SLA client provision service facilities/locations. At step 748, the user is prompted to specify applicable client SLA service locations. At step 750, the user selects client SLA locations from a pull down menu and saves the input.

During the process depicted in steps 752-760, the user is prompted to select any material relationships that may exist regarding the SLA provision Detail record. Step 752 is typically a simple Yes/No prompt; in step 752, the selection for illustrative purposes is Yes. At step 752, the system 100 prompts the user to specify any SLA provision material requirements. At step 754, the user selects materials from a pull down menu. A default material(s) list is provided due to previously-established relationships made between SLA provision skill profiles and material master records as stored, for example, in Table 26. Such a list may be provided as an optimal business processing mode, but need not serve as a constraint, meaning that a user may have access to the entire materials master list if desired.

During the process depicted in steps 756-758, the user is prompted to establish configuration settings applicable to any selected material master records. The user indicates, for example, if the materials are billable/non-billable, warranty goods, stocked goods, stocking requirements, etc. Those having skill in the art will appreciate that configuration attributes illustrated in Table 31 are not a constraint and additional attributes could be added to the application and database. At step 756, the user is prompted to configure SLA material requirements such as stocking requirements, warranty designation, etc. . . . At step 758, the user configures materials records. At step 760, the user saves settings and material associations.

During the process depicted in steps 762-768, the user is prompted to save and name the SLA provision detail record. Although the process flow does not explicitly depict this functionality, the primary SLA provider user could save the record in temporary status for completion at another time. In such a case, the database would maintain track through status codes of complete or incomplete and active or inactive records. At step 762, the system 100 prompts the user to save the provision detail record and the user saves the record. At step 764, the system 100 prompts the user to specify a provision detail name. At step 766, the user completes the provision detail name and saves the input. At step 768, the SLA provision detail record is created and stored.

A primary SLA provider would not typically be expected to use the SLA contract information capabilities if there were never any needs generated from an SLA client. Typically, service level agreements are governed via contract(s). There is a clear business need to link and reference provisioning activities to executed contracts because SLA contract details typically reside in a separate contract management application with limited or no cross-functional application capability with enterprise procurement, project management, or financial data processing applications. In many cases, the contract details reside only on paper. Thus, inputting base contract details into an application that will actually manage the specific SLA activities is an improvement over standard business procedures. Inputting these base contract details into a management application enables downstream SLA and administrative data processing activities to take place in a manner by which a business thread is maintained back to the original SLA contract.

Figure 8:
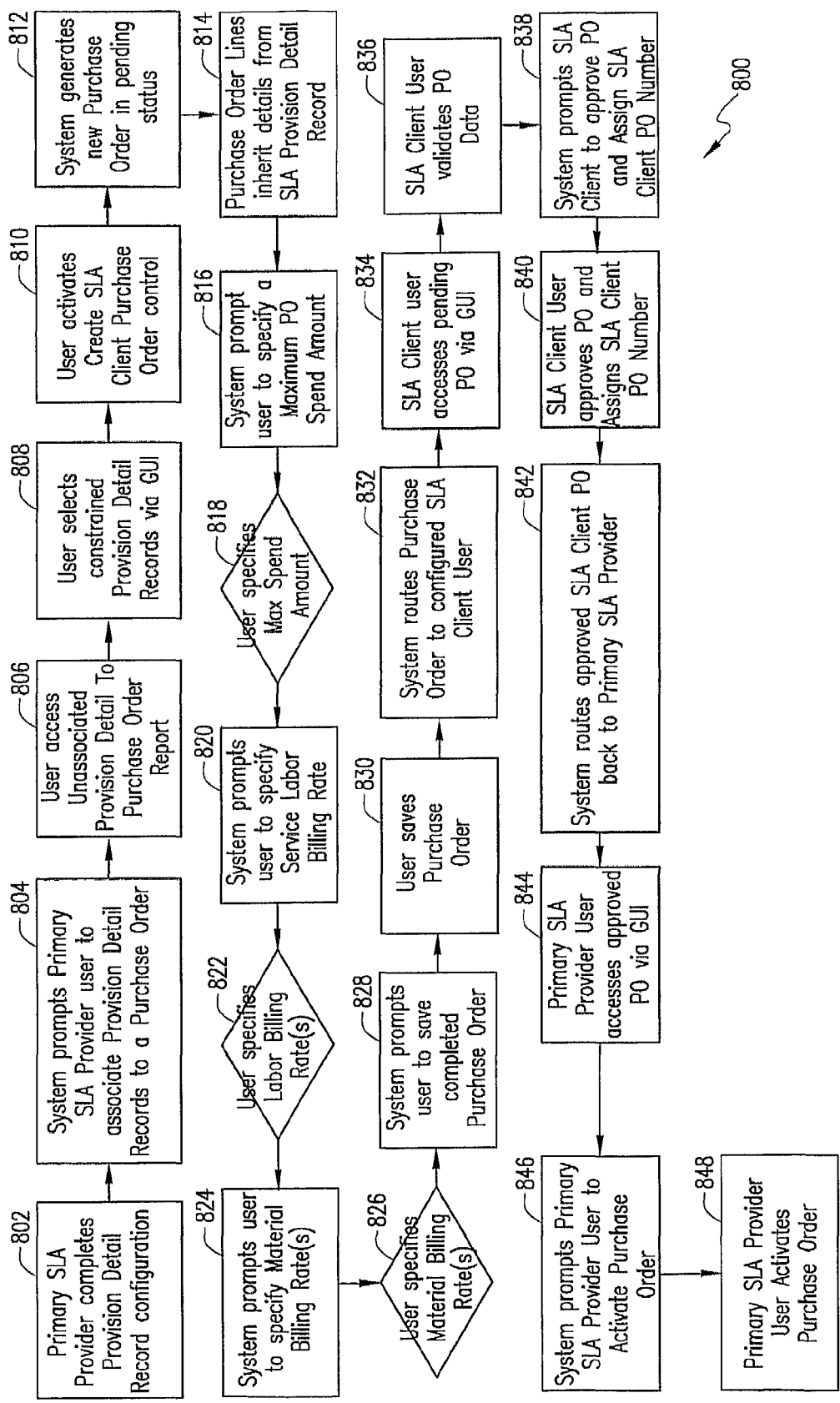
FIG. 8 is a flow diagram that illustrates creation and storage processes pertinent to SLA client purchase orders.

FIG. 8 is a flow diagram that illustrates creation and storage processes pertinent to SLA client purchase orders. Purchase order information as discussed in relation to FIG. 8 is distinct from an SLA provision outsource procurement process. Many business entities prefer to conduct financial transactions under the auspices of a controlled financial system. Unfortunately, due to the complex nature of SLA provision work, much of the control details cannot be ported/transferred from the SLA contract to a financial system because most financial/procurement systems are configured in a simplistic description-quantity-cost mode. This typically results in a scenario where the real details reside in the contract and the financial system in effect houses the financial transaction authority record.

Various embodiments permit extraction of those SLA contract details for numerous uses, one of which is to establish a best-practice purchase order process. Ultimately, many of the SLA provision activities will result in billable transactions. Thus, it makes logical sense to anticipate this business need and establish a relationship between specific SLA provision detail records and purchase orders created for the SLA client and primary SLA provider to conduct financial transactions.

Referring again to FIG. 8, a process flow 800 begins at step 802, at which step the primary SLA provider completes provision detail record configuration. Step 802 represents prerequisite activity that was described in the previous SLA provision detail information discussion. From step 802, execution proceeds to step 804.

Steps 804-808 illustrate a process by which a primary SLA provider user gains access to SLA provision detail records that are unassociated with a respective SLA client purchase order and selects specific records for such affiliation as desired. SLA provision detail records are identified for a specific SLA client that have no financial system payment authorization records) Within this process, the user is able to utilize database filters such as, for example, SLA client name, date, primary SLA client user to narrow the output record set. The system 100 prompts the primary SLA provider user to establish a financial transaction processing mechanism. At step 804, the system 100 prompts the primary SLA provider user to associate the provision detail records to a purchase order. At step 806, the user accesses an unassociated provision detail to purchase order report. At step 808, the user selects constrained provision detail records via a GUI.

At step 810, the user activates a create SLA client purchase order control. At step 812, the system 100 generates a new purchase order in pending status. At step 814, the purchase order lines inherit details from the SLA provision detail records. Steps 810-814 do not imply that only a new purchase order record can be created during the flow 800. Although not explicitly depicted, an existing SLA client purchase order record could be displayed and selected, which would be the case in the event that the SLA client's preferred mode entailed the use of, a master blanket purchase order. In an effort to not obscure salient features of the process depicted by steps 810-814, the process is represented by creation of a new purchase order record. Within the process depicted in steps 810-814, certain configured SLA provision detail record elements typically automatically populate the purchase order lines. In similar fashion, certain SLA contract details, as configured, would populate the purchase order header.

Steps 816-826 represent the processes by which a primary SLA provider user completes traditional financial information applicable to the purchase order. The illustrative information elements depicted include purchase order maximum expenditure, service labor rates, and material rates. At step 816, the system 100 prompts the user to specify a maximal purchase order spend amount. At step 818, the user specifies the maximal spend amount and saves input. At step 820, the system 100 prompts the user to specify a service labor billing rate. At step 822, the user specifies labor billing rates and saves input. At step 824, the system 100 prompts the user to specify material billing rate(s). At step 826, the user specifies material billing rate(s) and saves input.

Steps 828-830 are basic steps in saving the purchase order. At this stage in the process 800, the purchase order is not yet active. At step 828, the system 100 prompts the user to save the completed purchase order. At step 830, the user saves the completed purchase order.

Steps 832-840 represent SLA client purchase order handling and approval processes. At step 832, the system 100 routes the completed purchase order to a configured SLA client user as triggered, for example, by the status code connected to the record in step 830. Notifications are issued, for example, via e-mail and system dashboard update. At step 834, the SLA client user accesses the pending purchase order via a GUI. At step 836, the SLA client user validates purchase order data. At step 838, the system 100 prompts the SLA client to approve the purchase order and assigns the SLA client purchase order number. At step 840, the SLA client user approves the purchase order and assigns an SLA client purchase order number. Steps 836-840 do not explicitly depict a scenario by which an SLA client user does not validate the purchase order data. The system 100, however, provides the back-and-forth functionality in the event that corrections are needed or data elements are disputed. There is a collaborative validation and approval process contained within the system 100 that facilitates and guarantees correct data during subsequent data processing activities.

Steps 842-848 represent the actions taken by a primary SLA provider user to complete the SLA client Purchase Order process and enable the Purchase Order to be activated within the system 100. At step 842, the system 100 routes the approved SLA client purchase order back to the primary SLA provider. Notifications are issued, for example, via e-mail and system dashboard update. At step 844, the primary SLA provider user access is the approved purchase order via the GUI. At step 846, the system 100 prompts the primary SLA provider user to activate the purchase order. At step 848, the primary SLA provider user activates the purchase order.

Figure 9:
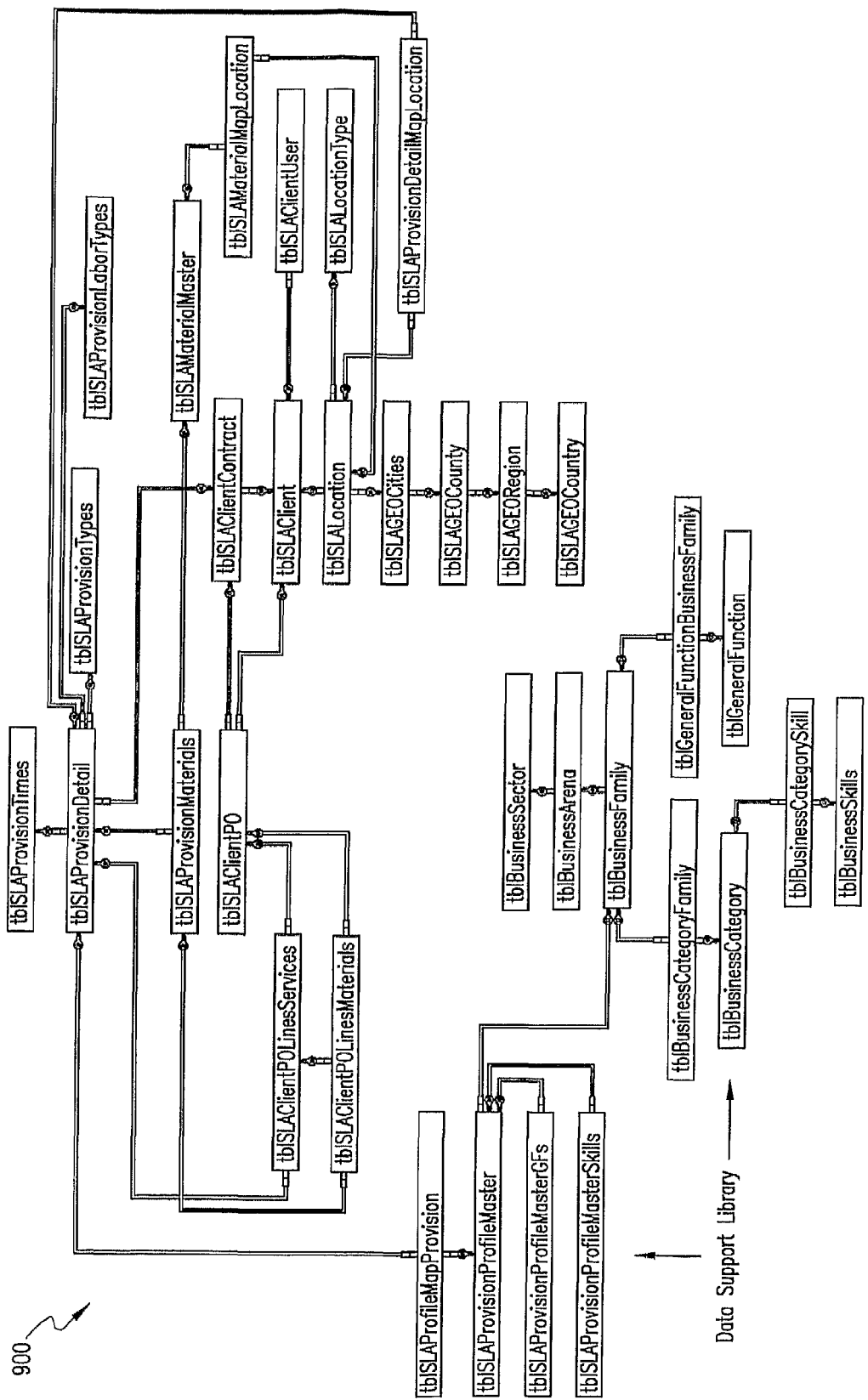
FIG. 9 is a diagram that illustrates a database schema that supports a master data function.

A master data supporting database model is represented by FIG. 9. These having skill in the art will appreciate that this supporting data model and application module essentially serve as the framework for the conducting of SLA provisioning services. The integrated data model summarizes the primary and basic business information aspects required to conduct business in an optimized manner while depicting the inherent relational nature of the business information. As previously indicated, these inherently-related business information aspects have traditionally resided in disparate data processing systems which traditionally do not communicate with each other. Because of this application module and supporting database schema, primary SLA providers can now define and store within one data processing system their SLA provisioning requirements in a manner which is genuinely reflective of their business dynamic, which must consider, for example: contracts, contact personnel, physical locations, required provisioning labor attributes, logistical parameters, non-performance penalties, and financial processing authorizations.

The procurement function deals specifically with sourcing, bidding, and purchase order generation activities undertaken by the primary SLA provider and secondary SLA providers. Those activities typically entail: 1) enabling primary SLA providers to acquire and store business information applicable to secondary SLA providers; 2) enabling primary SLA providers to classify secondary SLA providers in terms of SLA skill provision and geographical coverage capabilities; 3) enabling primary SLA providers to systematically identify and quantify SLA client coverage requirements as detailed in the master data function; 4) enabling primary SLA providers to generate systematic RFx bids from SLA client coverage records; 5) enabling primary SLA providers to systematically generate bid listings of secondary SLA providers for created RFx bids to be posted for bid response processing; 6) enabling secondary SLA providers to systematically generate RFx bid responses and submit applicable human capital resources affiliated with the responses as needed; 7) enabling primary SLA providers to systematically review submitted RFx bid responses; and 8) enabling primary SLA providers to systematically accept/award RFx bid responses and create secondary SLA provider purchase orders with reference to the RFx bid response details. Tables 37-52 and FIGS. 10-13 are particularly pertinent to these activities. The logical systematic methodology described above relative to the master data function enables a primary SLA provider to define their potential SLA provision services in terms of discrete personnel provision skill requirements, material/parts competency, and physical locations/geography serves as the base information platform by which secondary SLA providers are classified and sourced.

Figure 10:
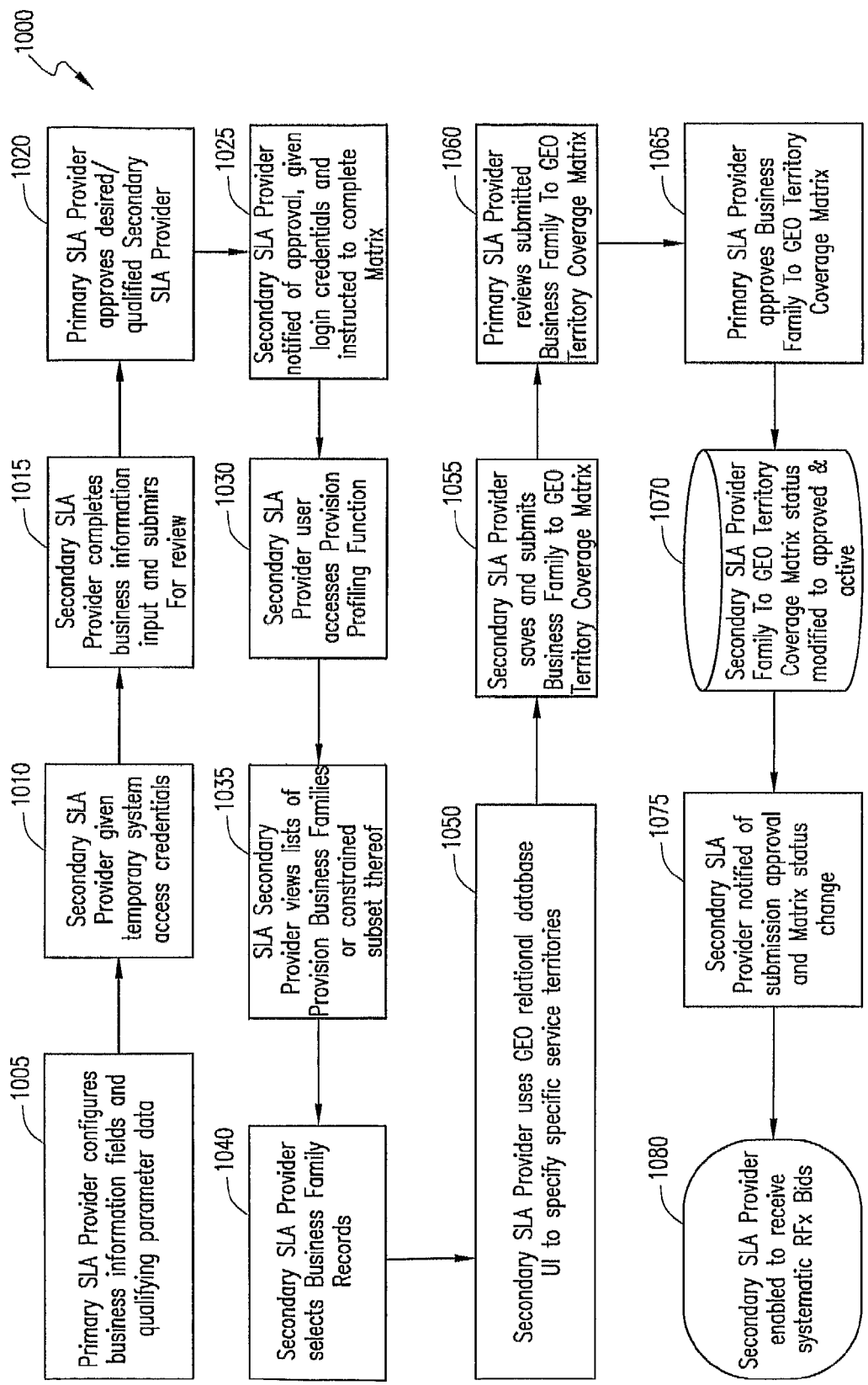
FIG. 10 is a flow diagram that illustrates a process of secondary SLA provider system enablement.

FIG. 10 is a flow diagram that illustrates a process of secondary SLA provider system enablement. In FIG. 10, a process flow 1000 includes steps 1005-1080. Steps 1005-1025 represent basic steps that get a secondary SLA provider approved and into the system 100. The process flow 1000 begins at step 1005, at which step the primary SLA provider configures business information fields and any applicable qualifying parameter data pertinent to a secondary SLA provider. At step 1010, after completion of the basic business information configuration for secondary SLA provider qualification, the potential secondary SLA providers are given temporary system access credentials from the primary SLA provider. These credentials could be passed along in a number of modes such as, for example, telephone, encrypted messaging.

The credentials enable the secondary SLA provider user to access the system 100. The secondary SLA provider user is presented with a GUI similar to that shown in FIG. 3, by which basic navigation techniques are used to access primary business information input form(s). At step 1015, the secondary SLA provider completes general qualification business information input and submits same to the primary SLA provider for review.

Steps 1020-1025 depict primary SLA provider review and disposition of the qualifier information submitted by the secondary SLA provider. This work flow is illustrated only with regard to a positive result, by which the secondary SLA provider is qualified/approved to conduct business. At step 1020, the primary SLA provider approves of the secondary SLA provider if the secondary SLA provider is considered qualified by the primary SLA provider. At step 1025, the secondary SLA provider is notified of approval, given regular system login credentials, and is instructed to complete a provision profile matrix. During steps 1005-1025, the primary SLA provider configures the information functions that they want visibility to as well as identifying to the system 100 any pre-determined required values that serve as qualification parameters. Illustrative basic business information elements are contained in Tables 40-41. The primary SLA provider has virtually no configuration limitations regarding the qualification parameters they wish to make functional within the system 100.

Steps 1030-1055 illustrate basic steps by which a secondary SLA provider documents their service provision capabilities in context of field of endeavor and geography. The secondary SLA provider is provided a GUI that enables them to access a business profiling tool. The business profiling tool prompts the user to navigate a sector-arena-family hierarchical relational drill-down tool. At step 1030, a user of the secondary SLA provider accesses a provision profiling function. At step 1035, in accordance with preconfigured rules, the secondary SLA provider views a complete list of provision business families or a constrained primary SLA provider subset thereof. Using this tool, the secondary SLA provider can specify which specific funictional/technical areas of expertise represent their core competencies. At step 1040, the secondary SLA provider selects business family records applicable to resource supply capabilities of the secondary SLA provider.

Upon selection of the business families, the secondary SLA provider may then utilize a geographical specification tool (e.g., Country-Region-County-City) and associate territorial coverage areas for any selected business families. At step 1050, the secondary SLA provider uses a geographic relational database user interface to specify service territories. Specification of national, regional, county or population-center coverage respectively. In a typical embodiment, the user interface supports aggregate or distinct business family to geographical territory mapping. Upon saving the desired selections, stored, for example, in Tables 42-46, the secondary SLA provider may submit the selections back to the primary SLA provider for review and disposition. At step 1055, the secondary SLA provider saves and submits the business family to geographic territory coverage matrix.

If desired, a primary SLA provider could restrict the service provision matrix specification for secondary SLA providers to only those provision skill profiles and geographical specifications defined within the master data function. For exemplary purposes, these constraints are not discussed in detail; those having skill in the art will appreciate that utilizing such constraints could generally make the secondary SLA provider onboard processing easier, but would not typically be considered a best practice mode of operation, given that a macro data view of secondary SLA provider provision capacity is an optimal view when changing business requirements is taken into account.

Steps 1060-1080 depict completion of the process flow 1000. As above, only a positive disposition of the secondary SLA provider submission is detailed. The net result of the process flow 1000 is a mapping of secondary SLA providers to both business family and geographical territorial coverage area. At step 1060, the primary SLA provider reviews the submitted business family to geographic territory coverage matrix created by the secondary SLA provider. At step 1065, the primary SLA provider approves the business family to geographic territory coverage matrix. At step 1070, the secondary SLA provider business family to geographic territory coverage matrix status is modified to approved and active. At step 1075, the secondary SLA provider is notified of submission approval and matrix status change, for example, via online and e-mail notifications. At step 1080, the secondary SLA provider is enabled to receive systematic RFx bids premised upon business family provision and geographic territory criteria.

At the conclusion of the process flow 1000, the primary SLA provider has acquired and stored information relative to potential SLA client provision needs as well as potential secondary SLA provider service-coverage capacity. The next steps in the overall process 200 are relative to RFx bid requirement identification, RFx bid generation, and RFx bid solicitation.

Figure 11:
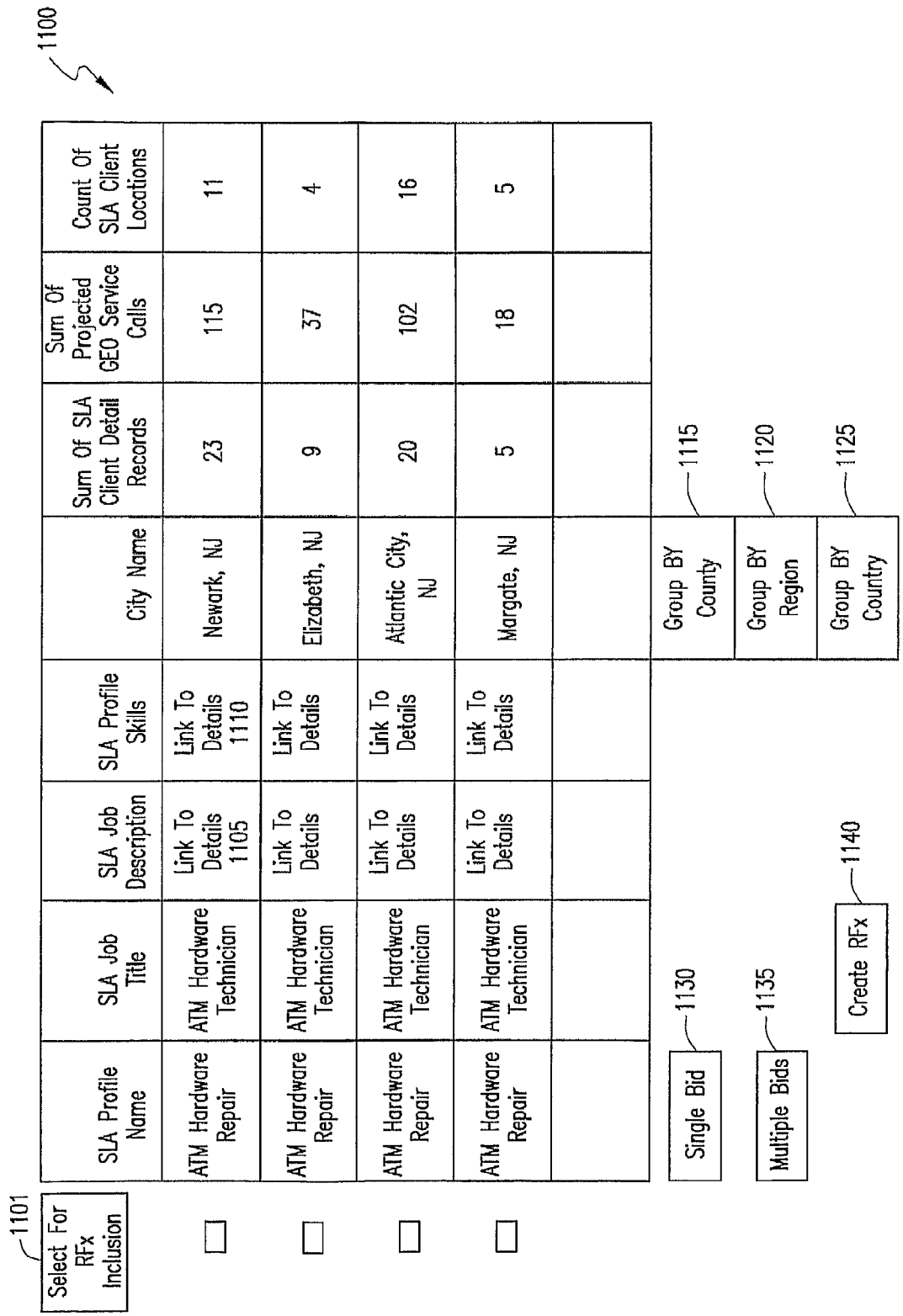
FIG. 11 is a sample output report detailing SLA provision detail records not associated with at least one secondary SLA provider purchase order.

FIG. 11 is a sample output report detailing SLA provision detail records not associated with at least one secondary SLA provider purchase order. A system report output 1100 for the primary SLA provider details all active SLA client provision detail records that are not affiliated with either an active RFx bid or active secondary SLA provider purchase order.

The strategy used is to document potential SLA client requirements in a formalized database methodology that accounts for each and every requirement, associates each and every requirement to a specific record, maps each record to an SLA provision skill profile, and assigns geographic coverage points affiliated with the requirement. A result of this methodology is the output report 1100, which sets the stage for the creation of RFx bids to be issued to secondary SLA providers for the purpose of receiving quotations.

Controls 1115, 1120, and 1125 represent variable view controls for the primary SLA provider user that enables the user to group and view record sets in wider geographical segments. The controls 1115, 1120, and 1125 are typically convenience and business-practice preferences.

Control 1105 provides the user with insight into the detailed SLA Job Description. This path is geared to provide enhanced visibility. In the event that this field is not utilized by the primary SLA provider then the link is inactive or ghosted thereby preventing the user from drilling into the details.

Control 1110 provides the user with insight into an applicable detailed SLA provision skill profile. This path is geared to provide enhanced visibility. Furthermore, in the event that this field is not utilized by the primary SLA provider, the link is inactive or ghosted, thereby preventing the user from drilling into the details.

Controls 1101, 1130, and 1135, respectively, are the primary controls that are used to select a specific record or group of records for inclusion into a new RFx bid and designate if the selected record(s) are to be grouped into a single RFX bid or if each selected record is to be associated with a unique RFx bid. The control 1135 is inactive until such time that at least two records were selected.

Upon selection of desired record(s) via the control 1101 and designation of either multiple or a single RFx inclusion preference (control 1130 or control 1135), the user then activates a create-RFx control (control 1140) to launch the RFx development process. A business objective is to not have any records appear in an unassociated SLA provision detail record report, because this would mean that there is no outsourced or sub-contracted provision service coverage for the applicable SLA client(s).

FIGS. 12A-B are flow diagrams that illustrate high-level processes applicable to procurement of outsourced secondary SLA services provision. Referring now to FIG. 12A, a process flow 1200 directed to RFx bid development and secondary SLA provider RFx bid selection and solicitation is illustrated. The process flow 1200 begins at step 1202. At step 1202, the primary SLA provider runs a system-provided unassociated SLA client provision detail report. At step 1204, the system 100 provides a function for the primary SLA provider user to generate RFx bid(s) from selected report records. At step 1206, the system 100 creates RFx bid record(s) as configured in step 1204. At step 1208, an RFx bid create session is launched for the primary SLA provider user. It will be apparent to those having skill in the art that step 1208 could be launched independently from a GUI menu control, meaning that a primary SLA provider user would not necessarily be required to create a RFx bid by running the reporting output previously described at steps 1202-1206. In such an instance, the system 100 could present to the user all records that have been slated for RFx inclusion but for any number of reasons not yet completed. For demonstration purposes, however, the process flow 1200 depicts a process by which the RFx Create bid session runs directly from user actions taken in conjunction with the sample output report of FIG. 11.

As illustrated, the primary SLA provider user launches the RFx bid create session at step 1208 and is presented with the available record set. At step 1210, the user selects the specific RFx bid associated with the provision detail records desired. Multiple provision detail records can be aggregated onto a single RFx.

At step 1212, pre-configured database elements applicable to the provision detail record(s) are used to populate elements of the RFx bid. The RFx bids inherent information details from the SLA provisioning record set, including, for example, SLA provision skill profile, service location details, provision SLA requirements, and anticipated service frequency. Step 1212 is typically little more than a presented GUI form enabling the user to access individual records through standard navigation techniques. Those having skill in the art will appreciate the administrative ease this process provides for the user as well as the fact that data input errors are virtually eliminated. Pertinent details applicable to physical provision services and the logistics thereof are acquired directly from the SLA provision detail records, which are linked directly to SLA client contract records.

Once the core record set is established upon the RFx, the primary SLA provider user then has editing/configuration access to the records at step 1215. At step 1215, the primary SLA provider user configures, for example, labor type options, SLA penalty terms, and maximal rates.

Although the user may decide to take no action, the user may be provided with options so that business endeavors can be enhanced. Data elements such as billing labor types, maximum billing Rates, SLA penalty terms, and service provisioning response times can be configured, for example, to insure that profitability and service provision quality objectives are established during the bid process. An example is billing rates. It would be optimal from a primary SLA provider perspective to cap the billing rates being quoted by secondary SLA providers at a rate equal to or less than the billing rate that will ultimately be paid by an applicable SLA client. Another example is service provision response times. Again, it is optimal from a performance perspective if the service provision response times were configured to be a shorter time frame than that contracted time frame applicable to the primary SLA provider. The editable user interface enables a primary SLA provider to protect its interests in a systematic framework.

Step 1218 is a saving process upon completion of the configurations of step 1215. Decision support features may be designed into the system 100 at this step that check and validate any user configurations that could pose potential problems for the primary SLA provider. Validations such as profitability or quality assurance analysis may be used to indicate to a user that parameters applicable to specific bid items could result in increased business endeavor risks.

At this point the primary details needed to send out a RFx bid to secondary SLA providers are complete; however, various administrative details remain to be completed. Typically, an RFx bid will entail specific elements such as, for example, a bid header section, a bid detail section, and a bid response section. RFx bids are usually accompanied by a defined set of supplier agreements that are executed at the time of bid response processing. Furthermore, the nature of RFx bids is such that much information on most issued bids is redundant and standard in format and content across a business enterprise. Thus, a bid template tool is used to manage issues pertinent to RFx bid content and formatting.

Regarding RFx bid templates, specific database tables store default RFx bid information elements, such as, for example, questions and statements. The primary SLA provider is able to configure the standard default content applicable to the default RFx bid information elements. Thus, the information elements may be predefined and require no user editing. Moreover, the system 100 may store specific configurable information elements, meaning that the user may create a bid item, designate the item to be a statement, question, etc. and then further designate if the information element requires a supplier response and designate if the response is constrained to a specific data type such as, for example, a number, text, date or currency.

In various embodiments, a services provision framework includes RFx bid items. Associations of RFx bid items can be made to logical default RFx bid categories and sections. Each bid item can be assigned to a logical group or category and up one tier each category can be logically grouped to a section. Thus, RFx bid content grouping is enabled.

Above the bid content grouping is a more complex RFx bid template layer which enables a primary SLA provider to establish the UI display order of sections, categories within sections, and RFx bid items within categories. Thus, various RFX bid items may be created and stored in a structured content and layout format. Thus RFx bid templates represent a business content control mechanism that, when combined with provision detail RFx data, forms the basis for rapid and detailed RFx Bid generation.

RFx bid templates are stored within the system 100 and, in step 1220, the primary SLA provider user is prompted to select a pre-configured RFx bid template of their choice. The primary SLA provider user is prompted to associate RFx bid settings with a pre-defined content bid template that defines the remainder of the non-provision detail RFx bid data fields. Bid template data fields can be default completed or require specific user inputs. The system 100 may provide the user with options (if enterprise configured) to enable or disable specific bid items as the user deems appropriate for their specific needs. For instance, the user may be dealing with a supplier base that is established and well known. In such instances, the user may opt to disable certain bid items that request of potential secondary SLA providers specific information, for example, regarding past history or quality assurance interrogatories. Conversely, the primary SLA provider also has the capability, through configuration, to lock in specific bid items that could then not be disabled by the user during the RFx bid development process.

Upon selection of the appropriate RFx bid items, the user, where applicable, inputs information as needed to suit the specific RFx bid being processed at step 1222. Simple examples of this input are specification of the primary SLA provider bid administrator or the required bid response due date. Upon completion of the desired inputs, the user saves the data modifications at step 1224. Although not depicted in the process flow 1200, the user may have editing capability.

The system 100 may use status code management techniques to enable temporary storage so that data processing may take place at an another time or by another user.

Once all the information is complete on the RFx bid, the RFx bid solicitation list is established at steps 1226-1232. Step 1226 becomes available to the primary SLA provider user upon completion and saving of desired bid item inputs. At this point, the system 100 provides a previously-inactive post RFx bid control. The control is activated at step 1228 and at step 1230 the user is provided a list display of all approved secondary SLA providers affiliated with the RFx bid that are authorized, for example, to provide business family and territorial coverage. The systematic affiliation is typically a database mapping of provision skill business family(s) and geographic parameter(s) as established as previously described in step 1070.

At step 1232, the primary SLA provider user selects either all or a subset of the secondary SLA providers contained in the potential RFx bid solicitation list. There are typically a number of decision support tools to assist the user in this selection process that provide valuable information to the user about the secondary SLA provider relative, for example, to tracked quality assurance, pricing, and SLA provision penalty metrics.

Upon selection and saving of the desired secondary SLA providers by the user, at step 1234, the system 100 prompts the user to post the RFx bid to those selected secondary SLA providers. At step 1236, the user activates the post RFx bid control, which results in the broadcast of the RFx bid at step 1238 and notification of the secondary SLA providers for example, via e-mail and dashboard update at step 1240. The posting listing established by the user is stored, for example, in Table 47. The primary SLA provision detail record information to be used in the RFx bid process is stored, for example, in Tables 37-39.

Referring now to FIG. 12B, at step 1244, the secondary SLA providers access the RFx bid and execute any template-defined bid processing agreements. Step 1244 is typically enabled via the application GUI. The execution of supplier agreements such as, but not limited to, non-disclosure (NDA) and intellectual property (IP) agreements as previously disclosed; therefore, specific controls are made available to the secondary SLA provider user by which the agreements can be executed on-line or not. For purposes of the process flow 1200, the presumption is that the secondary SLA providers will indeed execute any configured agreements established by the primary SLA provider.

At step 1246, the secondary SLA provider provides inputs to all application RFx bid functions requiring a response. The system 100 typically utilizes a simple bid item response counter that does not allow submission of a bid response until all required bid response elements have been completed. Furthermore, the system 100 as typically configured enables a data validation function where the bid response items can only be completed in the correct data object and format as prescribed. RFx bid response details are stored, for example, in Tables 48-49 and 90-91.

At step 1248, the secondary SLA providers create human resource submittal records applicable to the SLA provision labor profile. Although step 1248 typically takes place as a sub-process within step 1246, the SLA resource submittal process is highlighted as a separate process step for purposes of clarity. During step 1248, the secondary SLA provider typically uses the provided GUI to drill into any applicable SLA resource profiles contained within the RFx bid and create resource submittals affiliated with the SLA resource profiles. The submittal information is contained, for example, within Table 50. The system 100 can be adapted to accommodate a general secondary SLA provider labor resource library to be used in an association mode by which resources are mapped to SLA provision skill profiles in a macro mode as opposed to a micro mode (individual RFx(s)) as depicted herein. This mode might be useful in the event that a particular primary SLA provider is not interested in conducting competitive RFx bids and prefers to work with secondary SLA providers using master agreements.

In another mode, submittal of resources takes place after the RFx bid response process, rather than during the RFx bid response. This may be the case when the RFx bids are solicited to cover provision services that may be months in the future. In such cases, the submittal of specific labor resources during the actual bid process may be irrelevant. Those having skill in the art will appreciate that the illustrative process depicted is not the only mode of associating secondary SLA provider resources to SLA client requirements.

At step 1250, the secondary SLA providers save information settings and submit the bid response to the primary SLA provider. Step 1250 represents the completion of required bid response information, thereby enabling the secondary SLA provider to submit their complete RFx bid response. Step 1250 results in record updating and triggers systematic application notifications to any pre-configured users at step 1252.

Steps 1254-1258 represent the primary SLA provider bid response disposition process. At step 1254, the primary SLA provider reviews bid responses from the secondary SLA providers. At step 1256, the primary SLA provider accepts desired bid responses. At step 1258, the secondary SLA providers are notified, for example, via system update and e-mail, of bid awards.

Presuming that at least one secondary SLA provider bid response is worthy of a bid award, the primary SLA provider specifies award of at least one bid response record. The primary SLA provider can award multiple bid responses and issue awards for all or a subset of the bid provision detail response items. For instance, a secondary SLA provider may be designated for one service coverage area applicable to the bid but not another. In another example, a secondary SLA provider may be designated for a specific SLA provision coverage time but not others. Such is the case, for instance, if the bid response indicated an exorbitant price quote for off hours or weekend provision call outs. Bid response award disposition can be variable and flexible, enabling the primary SLA provider to utilize procurement best practices during this process.

Steps 1260-1270 depict a process by which the primary SLA provider creates purchase requisitions from awarded secondary SLA provider bid responses. At step 1260, the primary SLA provider is prompted to create secondary SLA provider purchase requisitions. At step 1262, the primary SLA provider activates a create purchase order requisition control. At step 1264, the system 100 creates purchase requisitions using inherited bid response data. At step 1266, the system 100 provides a list display of all secondary SLA providers that received a bid award applicable to the RFx bid. At step 1268, the primary SLA provider reviews the created purchase requisitions for accuracy and, if needed, modifications. At step 1270, the primary SLA provider saves the purchase requisitions and submits same to the secondary SLA provider for review/approval.

Similarly to the unassociated SLA provision detail report, the system 100, using database-driven status codes, can provide a report output to the primary SLA provider of all bid response awards that need to be processed into purchase orders. The illustrated process indicates a linear process that jumps from award to purchase requisition processing for purposes of simplicity and ease of description. In some embodiments, the process may be independent with processing taking place at an alternative time and perhaps by alternative personnel.

A purchase requisition processing module is activated and the primary SLA provider user is provided a list display of all pending bid response awards awaiting processing if the illustrated process were performed in independent mode. The process illustrates a linear mode as noted so the user would not need to select pending awarded bid response(s). Since the process presumes a requisition process emanating from a particular RFx bid record set, the system 100 creates the purchase requisition(s) with the information to be contained within the requisition(s) being inherited from the awarded bid response records. Purchase requisitions, as a default mode, are created one per secondary SLA provider and may contain multiple line items as needed. Such would be the case if an applicable RFx bid award were affiliated with multiple SLA provision detail records.

Once the purchase requisitions have been created, the system 100 enables the primary SLA provider, for example, to review or add commentary. Once satisfied with the information contained on the purchase requisition, the primary SLA provider user saves and approves the purchase requisition(s). This action trigger status code updates within the system 100 as well as issuance of system-based notifications to applicable secondary SLA providers.

Steps 1272-1278 represent the secondary SLA provider handling of the purchase requisitions created by the primary SLA provider. The system 100 supports variable secondary SLA provider approval work flow. Not explicitly depicted herein is a work flow applicable to data or information disagreements that may be encountered during the process.

During steps 1272-1278, the secondary SLA provider reviews, approves, and re-submits back to the primary SLA provider the completed purchase Requisition. At step 1272, the secondary SLA provider is notified of the pending purchase requisition. At step 1274, the secondary SLA provider reviews the purchase requisition details and approves the purchase requisition. At step 1276, the system 100 submits the approved purchase requisition to the primary SLA provider. At step 1278, the primary SLA provider is notified of the approved purchase.

At step 1280, the primary SLA provider accesses the approved purchase requisition. At step 1282, the primary SLA provider activates a create purchase order control. At step 1284, the system 100 creates the purchase order. At step 1286, the primary SLA provider defines an internal purchase order number and approves the purchase order. At step 1288, the secondary SLA provider is notified of the approved purchase order. At step 1290, the purchase order is made available to the secondary SLA provider. For illustrative purposes, a simple database table structure is illustrated that uses the same Tables 51 and 52 as repositories for both the purchase requisition and purchase order data.

FIG. 13 is a database schema that supports the procurement function. A database schema 1300 is a representative high-level illustrative database schema that supports the data processing functionality described in this latest topical disposition. Those having skill in the art will appreciate that a seamless information thread continues through an evolving downstream data processing session, resulting in procurement module business information connectivity all the way back to the master data function. In various embodiments, an inherited information design reduces user inputs, eliminates data entry errors, and provides an optimized audit capability.

The next process of the overall methodology is the human resource service provision management function, which includes: 1) enabling primary SLA provider review and approval disposition of submitted RFx bid response candidates; 2) enabling systematic primary SLA provider disposition/status notification regarding submitted RFx bid response candidates to secondary SLA provider; 3) enabling SLA provision Resource record creation by a primary SLA provider upon approval/acceptance of submitted RFx bid response candidates; 4) enabling secondary SLA provider human resource(s) system access; 5) enabling systematic agreement execution by secondary SLA provider human resource(s); 6) enabling work availability calendar administration/configuration by secondary SLA provider and approved human resource(s); 7) enabling primary SLA provider logistical time coverage evaluation; and 8) enabling primary SLA provider proactive human resource black out period mediation function. A black out period is a period of service provisioning unavailability for a particular human resource or a collective group of resources.

Typically the mode in which SLA provision outsourcing is conducted is that the specific nature of administrative management is one in which the primary SLA provider reaches agreements with secondary SLA provider business-entity management or sales personnel with minimal or no real business analysis conducted at the SLA provision labor resource level. This is not to imply that all due diligence or historical performance evaluation of the secondary SLA providers is ignored, but rather a general state of affairs as to what level of business management is undertaken. Ultimately, the quality/success of client SLA provision is the result of SLA provision labor quality, capacity, and availability in conjunction with adequate logistical planning and communications.

FIGS. 14A-B are flow diagrams that illustrate high-level processes applicable to human resource service provision management. In FIG. 14A, a process flow 1400 begins at step 1402. Steps 1402-1406 illustrate a process by which primary SLA providers are systematically notified of any existing secondary SLA provider purchase orders that are not associated with at least one SLA provision resource assignment record. At step 1402, the primary SLA provider user accesses a human resource labor management module. At step 1404, the primary SLA provider navigates a menu-driven GUI to select unassigned secondary SLA provider purchase orders. At step 1406, the system 100 provides a list display report grouped by secondary SLA provider and purchase orders. Although not explicitly depicted, there will be access to record management in the event that labor assignment affiliations already exist. Record modification in the event of necessary personnel changes would logically dictate such functionality.

Steps 1408-1416 address primary SLA provider user selection of desired SLA provision labor resources, which process depicts a mode by which the secondary SLA provider had previously submitted resource records during the RFx bid process. This process can be variable and, although not explicitly depicted, functionality is available for the secondary SLA providers to transmit resource records for review pretty much anytime during the review process. Such is the case in the event that that submitted resource records were unsatisfactory or no longer available for assignment for any number of reasons. At step 1408, the user selects an applicable secondary SLA provider record and activates a managed human resource control. At step 1410, the system 100 provides the user with a listing of all secondary SLA provider resource submittals applicable to the associated source RFx bid response. At step 1412, the system 100 provides a control for the user to link to resource(s) submittal details. At step 1414, the user selects via a GUI those specific human resources desired to provide SLA provision coverage. At step 1416, the user saves the approved resources record set and the system 100 sends notification regarding same to the secondary SLA provider.

This process enables the primary SLA provider user to examine the details of the submittal(s) and make their desired selections accordingly. Although there are many additional possible features not explicitly disclosed herein, those having skill in the art will appreciate that the review and selection process results in primary SLA provider control over the resources that will ultimately provide services on their behalf. Table 53 contains details pertinent to labor resource system enablement, while assignment details are contained in Table 54.

Upon selection of the desired resources, the system 100 enables a reverse affirmation process at steps 1418-1424, by which the secondary SLA provider can verify the resource availability and their continued desire to affiliate the resource with the applicable provision assignment. At step 1418, the system 100 creates human capital labor assignment records for the approved resources with a status of pending. At step 1420, the secondary SLA provider confirms resource assignment approval via a GUI. At step 1422, the primary SLA provider is notified of assignment acknowledgement, for example, via system notification. At step 1424, the secondary SLA provider is provided with system access credentials for applicable resources.

Steps 1426-1430 address administrative system enablement of the SLA provision labor resource. Various protective labor resource agreements can be configured by a primary SLA provider upon system access, such as, for example, NDA, IP protection, and acknowledgement of temporary work agreements. This process depicts a positive action by the labor resource. Other results would occur in the event labor resource agreements are not executed in a timely manner or perhaps even out of disagreement. At step 1426, the secondary SLA provider resources access the system 100 with provided credentials. At step 1428, the secondary SLA provider resources execute configured online agreements. At step 1430, system notifications are sent to both the primary and secondary SLA providers.

Presuming that all goes well with labor resource enablement, the next process entails configuration of the labor resource availability calendar at steps 1432-1442. At step 1432, the secondary SLA provider is prompted to access and configure a human resource calendar. At step 1434, the secondary SLA provider accesses a human resource calendar module. At step 1436, the secondary SLA provider accesses a specific human resource record. At step 1438, the secondary SLA provider provides standard human resource blackout periods and general periods of availability. At step 1440, the secondary SLA provider repeats steps 1434-1438 for all applicable assigned human resources affiliated with a respective secondary SLA provider. At step 1442, upon completion of all resource calendar configurations, the secondary SLA provider submits purchase order assignment calendar configurations to the primary SLA provider.

At this stage of the process 1400, the desired labor resource(s) have been designated for the respective SLA provision service activities. The process flow 1400 includes a sophisticated and efficient logistical means by which labor resource coverage periods can be input into the system 100 and analyzed for planning support purposes. At a high level, in human resource service provision management in accordance with various embodiments, secondary SLA providers are prompted to input the basic schedule of the assigned SLA provision labor resources. Basic configuration typically entails designation of standard black out periods such as weekends or nights or specific vacation or holiday periods. It should not be expected that a labor resource would be on call for 24 hours each and every day; in contrast, the secondary SLA provider very well may be responsible for 24 hour coverage.

Typically, the RFx bid contains information regarding the coverage time frames contracted; on the other hand, it should also be understood that in most cases complete coverage period provision would typically entail utilization of multiple labor resources and oftentimes multiple secondary SLA providers. Thus, during the next process, illustrated at steps 1445-1456, the primary SLA provider defines any potential service provision gaps. Ideally, the primary SLA provider establishes: 1) complete logistical coverage by each secondary SLA provider; or 2) complete aggregate coverage by multiple secondary SLA providers. The system 100 enables the primary SLA provider to statistically validate the aforementioned scenarios via the input/upload of labor resource calendar availability data and analysis of the data. This statistical validation is the focus of steps 1445-1456.

From step 1442, execution proceeds to step 1445 of FIG. 14B. At step 1445, the primary SLA provider user accesses the purchase order resource assignment list within the human resource labor management module. At step 1448, the primary SLA provider user activates and evaluates coverage control. At step 1450, the system 100 provides the primary SLA provider a report identifying any potential non-coverage periods or blackout times. At step 1452, the system 100 provides the primary SLA provider user the option to evaluate aggregate coverage by all secondary SLA providers for applicable coverage of specific SLA client provision detail records. At step 1454, the primary SLA provider user runs an aggregate coverage evaluation report. At step 1456, the system 100 provides the primary SLA provider a report identifying any potential aggregate non-coverage periods or blackout times.

Because the system 100 quantifies time in logically-segmented database units, it is simple to provide an SLA provision labor resource coverage report. The coverage analysis can be performed either at the individual or aggregate secondary SLA provider layer. Thus, individual secondary SLA provider coverage analysis can be reviewed or multiple secondary SLA provider resource coverage periods, affiliated with a single SLA client provision detail record, can be viewed collectively. The primary SLA provider is provided with the data needed to define whether the coverage is adequate. Moreover, identification may be made of any specific secondary SLA providers whose data input is either incongruent with coverage times as quoted during the RFx bid process or too limited in coverage scope as decided by the primary SLA provider. In other embodiments, a more sophisticated database management system can be employed that locks in RFx bid response coverage periods and thereby forces applicable secondary SLA providers to complete resource labor calendar records accordingly.

Steps 1458-1466 relate to an interface provided to the primary SLA provider user by which individual secondary SLA provider black out coverage periods can be selected and forwarded to applicable secondary SLA providers with commentary regarding expected schedule modifications that are anticipated by the primary SLA provider user. A positive result includes existing calendar record coverage modifications or submittal of additional labor resources to fill in potential coverage gaps. In the event of new submittals, the submittal review process described above is undertaken. The analysis and troubleshooting process may be initiated as many times as a primary SLA provider deems necessary to insure adequate SLA provision coverage.

Referring again to FIG. 14B, at step 1458, the system 100 provides the primary SLA provider an option to issue a coverage modification request to the secondary SLA provider(s) of choice. At step 1460, the primary SLA provider user selects applicable secondary SLA provider(s). At step 1462, the primary SLA provider user selects specific blackout periods identified needing review for each identified secondary SLA provider(s). At step 1464, either calendar modifications of existing assigned human resources are modified to mitigate blackout periods or additional human resource submittals can be made to bolster coverage scope or additional secondary SLA providers can be solicited via RFx bids. At step 1466, regardless of modifications needed regarding blackout periods, individual secondary SLA providers administer all their own human resource schedules so that real-time resource availability assessment is provided. The data library for use in connection with human resource calendaring functionality is stored in tables, such as, for example, Tables 58-63. Actual calendar data details applicable to an individual labor resource are stored in tables, such as, for example, Tables 55-57.

FIG. 15 is a flow diagram that illustrates a process of human resource calendar configuration. Three primary configuration modes established within a process flow 1500 are: 1) standard work schedule mode; 2) non-standard work schedule mode; and 3) daily activities mode. The standard work schedule is a standard expected schedule. In this mode, a secondary SLA provider establishes a base schedule for a specific labor resource who is affiliated to a purchase order assignment. The input in this mode establishes standard work days and standard hours of worker availability.

Referring again to FIG. 15, the flow 1500 begins at step 1502, at which step the secondary SLA provider user accesses the human resource labor management module. At step 1505, the secondary SLA provider user navigates a menu driven GUI to select the signed human resource records. At step 1508, the system 100 provides a list display report of all assigned human resources. At step 1510, the user selects a desired human resource record. At step 1512, the system 100 provides a list display report of pertinent details and a link to the applicable calendar. At step 1515, the user activates calendar control. At step 1518, the system 100 provides an option menu that may include the following: (1) configure standard schedule; (2) configure other schedule blackouts; and (3) maintain daily activities. At step 1520, the user activates a configure standard schedule control. At step 1522, the user is prompted with a weekly calendar view that presents, for example, all seven days of the week. At step 1525, the user provides input and saves same. At step 1528, the user activates a configure other scheduled blackouts control.

In a typical embodiment, the user needs only to activate a blackout radio button for all days that represent standard off days and save the settings. The user is also provided a display of each of the non-blackout days with incremental time breaks for every half hour, although this is a standard configuration that can be modified to the minute if need be. Each incremental break is accompanied with two controls: 1) start; and 2) end. The user configures each day by establishing both the start time and end time. Upon conclusion the user would save the settings and the standard calendar settings are stored to the database for the applicable SLA provision resource. Non-standard work schedule input entails designation of other scheduled black out periods. An example of this type of scheduled black out period is vacation time or standard company holidays. These periods by their very nature are variable and are therefore non-standard.

At step 1530, the system 100 prompts the user to: (1) define labor agreed holiday; and (2) define scheduled vacation days. At step 1532, the user provides input and saves same. The user is prompted to configure scheduled holidays and vacation/ personal days. The user activates the control and is presented with, for example, an annual calendar view segmented into 12 distinct months. The user selects the applicable month, which returns a drilled-down view of the month segmented into days. The user then selects the applicable day and saves the input. The user is prompted to designate the selection as either a holiday or a personal day. The user saves the input and continues until configuration is complete.

At step 1535, the system 100 provides the user notification that the service provision resource calendar is now active. At step 1538, the system 100 provides notifications to the primary SLA provider and the secondary SLA provider human resource user that the service provision resource calendar is now active. At step 1540, the secondary SLA provider user activates a maintain daily activities control. At step 1542, determination is made whether the specific resource has any planned service provision callouts. If the answer to the determination in step 1542 is positive, execution proceeds to step 1545.

Daily activities scheduling represents the input applicable to ongoing/continuous calendar availability applicable to an individual labor resource. The nature of outsourced labor utilization means that typically no laborer is waiting for one particular client to call with a problem. Thus it is typical that a specific labor resource is utilized to provide services to numerous SLA clients and numerous primary SLA providers as well. This calendar mode enables a current resource labor tracking mechanism by which specific blackout periods can be administered in the system 100 to provide real time availability reporting.

During steps 1545-1555, the user navigates to a point where daily blackout administration can be accessed. At step 1545, the system 100 prompts the user to select a work week and work day. At step 1548, the system 100 prompts the user to select the beginning of the blackout period. At step 1550, the system 100 prompts the user to enter the anticipated duration of the service call affiliated to the applicable human resource. At step 1552, the system 100 prompts the user to complete additional detail fields. At step 1555, the system 100 saves the input from steps 1545-1552. The applicable SLA provision resource is designated by the secondary SLA provider user and the user is presented by default a view of the current daily calendar; typically in a half-hour incremental view. The user selects the daily activity start time and end time and saves the setting. The input is stored and the SLA provision resource shows as unavailable for dispatch during this blacked out time frame. Calendar detail data is stored in tables such as, for example, Tables 55-57. Table 55 is a control table that stores the identity of the labor resource and the applicable PO Assignment. There can be multiple assignment coverage periods for one labor resource. Table 56 stores the basic work schedule, while Table 57 stores non-standard black out period details as well as daily black out periods as administered by the secondary SLA provider.

FIG. 16 illustrates a database schema that supports the human resource service provision management function. Those having skill in the art will appreciate that various embodiments provide the primary SLA provider with provisioning labor force logistical visibility and planning functionality necessary to meet the SLA demands of their clients.

Although not explicitly depicted, the configuration of systematic waning notifications to a primary SLA provider in the event of total labor blackout for one or more SLA client provisioning detail records is a natural provisioning feature. In various embodiments, advanced configurations may be implemented so that systematic actions and applicable notifications can be initiated to counter SLA client provisioning coverage black holes.

Previous activities have been prerequisites leading up to logistical administration/management of SLA service provision and quality assurance validation by applicable SLA clients. The primary topics covered regarding SLA provision dispatch include: 1) enabling service provision request functionality by which an SLA client can create and submit a service provision request to a primary SLA provider; 2) enabling primary SLA provider system query features that can be used to output a listing of configured secondary SLA providers as well as their applicable pricing and availability of pertinent human capital resources designated for service provision dispatch; 3) enabling primary SLA provider selection of specific available SLA provision Resource(s) as desired for potential dispatch; 4) enabling a primary SLA provider to systematically submit a service provision dispatch request record to a secondary SLA provider; 5) enabling a secondary SLA provider to confirm resource availability and subsequent dispatch of the resource to the primary SLA provider; and 6) enabling a primary SLA provider to confirm resource dispatch to an SLA client.

FIG. 17A is a flow diagram illustrating a process flow applicable to the logistical provision and administrative function. A process flow begins at step 1702. Steps 1702-1720 depict a process by which an SLA client submits a service provision request to the primary SLA provider. At step 1702, the SLA client user accesses the system 100, navigates an applicable menu and activates a create provision request control. Step 1702 does not explicitly indicate any user constraint or the use of specific authorization rights; however, various embodiments of the invention may integrate user roles and specific data processing rights/authority if so desired by an SLA client. At step 1705, the system 100 prompts the user to specify SLA client location and identifier. Step 1705 indicates an SLA client user selection of location to begin the query process. This is just a sample mode and not an inherent restriction. For instance, the query process may begin with a contract reference or a search for a specific provision detail record. At step 1708, the system 100 provides the user with a list display of contracts and applicable SLA agreement provision services. Step 1708 is augmented with FIG. 17B, which depicts a simple GUI in a form embedded with active controls enabling an SLA client user access to critical SLA provision information. The SLA client user either recognizes immediately the applicable SLA provision detail record or utilizes the embedded controls to ascertain through information review which pertinent SLA provision detail record(s) require provisioning. In FIG. 17B, the controls are all potentially active to provide the user with additional information views. However, 1708-A9 is inactive/ghosted until such time that at least one record was selected at 1708-A1. Each embedded link would provide the user with a new UI presenting information applicable to the column header. The SLA client user uses the check box(es) provided to designate which SLA provision detail record(s) will be associated with the SLA service provision request. The selection of the specific records in step 1710 triggers an additional UI input form, by which the SLA client user may add commentary at step 1712 if so desired.

At step 1710, the user selects desired SLA provision service record(s) and saves the selection. At step 1712, the system GUI provides the user with additional input fields. The user completes the additional inputs and saves. Those having skill in the art will appreciate, through review of Tables 64-66, that in a typical embodiment, during the process depicted at steps 1702-1712, the SLA client user is only be able to provide input to minimal fields since the rest are all default data. Additional input field options could easily be added to the database if the nature of the provision service work warranted such data element addition(s).

At step 1715, the system 100 prompts the user to submit the SLA provision service request to the SLA provider. Though not explicitly depicted at step 1715, in various embodiments, an SLA client user could have the ability to variably route a service provision request to a designated primary SLA provider user, such as a technical account manager for instance, if business requirements dictate such a scenario. Details applicable to steps 1702-1715 are stored in tables, such as, for example, Tables 64-67. At step 1720, the user submits the SLA provision service request to the SLA provider.

Steps 1721-1728 depict a process by which the primary SLA provider gains systematic access to secondary SLA provider details affiliated with the SLA client service provision request. At step 1721, the system 100 notifies the primary SLA provider of a newly-submitted SLA provision service request. Although not explicitly depicted at step 1721, service provision request responsiveness is typically administered and managed within the system 100, meaning the field dispatchresponseTimeID in Table 30 is active and utilized to create expedition notifications in the event that service provision request handling, by applicable parties, is not proceeding to pre-configured expectations/scheduling. Moreover, in various embodiments, an expanded user role function is utilized to variably route/designate expedition notifications to specific primary SLA provider users. On the other hand, SLA client users are noticed as to the status of the service provision request handling.

At step 1723, the primary SLA provider user accesses the new SLA provision service request, for example, via a GUI. At step 1725, the primary SLA provider user activates a display provision coverage control. At step 1728, the system 100 provides the user with a list display of authorized secondary SLA provider(s) and applicable approved human resources authorized to provide provision services for the respective provision detail record. The display typically shows, for example, availability, pricing, service metrics. Step 1728 provides the applicable primary SLA client user with a summary output view of affiliated secondary providers as shown in FIG. 17C.

In FIG. 17C, 1728-A1 is simply a selection check box option for the primary SLA provider user. However, this option is typically inactive/ghosted to the user in the event that the count of available resources in 1728-A5 is zero. When a user launches an active control in 1728-A5, a list display of the respective available human resources and their calendar availability summary is provided. The business information available for a primary SLA provider user not only results in resource visibility for potential dispatch, but also provides a window to critical financial and quality assurance business information enabling a best in class decision process.

Steps 1730-1732 depict a process by which a primary SLA provider selects, if desired, preferred specific available SLA provision Resources to be dispatched to an applicable SLA client location. At step 1730, the primary SLA provider user selects a desired secondary SLA provider record and a human resource preference if multiple resources are available. At step 1732, the primary SLA provider user saves selection(s). Although step 1730 depicts an illustrative process in which only one secondary SLA provider record is selected, multiple records can be selected. A primary SLA provider user may select multiple secondary SLA providers to receive a provision dispatch request record. In this event, the system 100, in a typical embodiment, handles the work flow in a First In-First Out manner. In another scenario, the situation could be critical in nature and mandate the dispatch of all available resources, regardless of secondary SLA provider affiliation. Various embodiments of the invention may enable multiple SLA provision resource dispatch requests from multiple secondary SLA providers.

Upon selection of the secondary SLA provider record, subsequent application functionality may enable the user to drill down into more detail and, if desired, the primary SLA provider user may designate a preferred SLA provision resource or list of resources desired for the provision call out. There are numerous reasons as to why a particular resource may be desired. Reasons include, for example, favorable historical quality metrics or SLA client preference. The information is stored in tables, such as, for example, Tables 68 and 69. Data stored in tables such as Tables 70-71 serves as source data for a field in Table 68. The identity of any preferred SLA provision resources slated for dispatch is stored, for example, in Table 69.

Steps 1735-1738 depict a process by which a primary SLA provider issues a service provision dispatch request. At step 1735, the primary SLA provider user is prompted to send a service provision dispatch request. At step 1738, the primary SLA provider user submits the service provision dispatch request to the applicable secondary SLA provider.

Steps 1740-1755 depict a process by which a secondary SLA provider systematically confirms resource availability and resource dispatch to an applicable primary SLA provider. At step 1740, the system 100 notifies the secondary SLA provider of the new service provision dispatch request. At step 1742, the secondary SLA provider user accesses the new service provision dispatch request. Steps 1740-1742, though not depicted, can be administered/managed more tightly within the system 100 as was indicated in step 1721.

At step 1745, the secondary SLA provider user validates human resource availability. Step 1745 depicts only a positive result regarding resource availability. Those having skill in the art will appreciate that this will not always be the case; however, the negative resulting transactions are being left out so as to not obscure salient features of various embodiments of the invention. In the event of negative resource availability, contrary to administered calendar data, in a typical embodiment, the system 100 tracks such secondary SLA provider deficiencies for quality metrics purposes and calculates the inefficiency factor of a secondary SLA provider regarding their resource capacity and availability. Upon resource availability validation, the system 100 typically prompts the secondary SLA provider to send dispatch verification to the applicable primary SLA provider. Additional details are input and stored during this process which when saved uploads a new record to the database stored in Table 72.

At step 1748, the system 100 prompts the secondary SLA provider to send a human resource dispatch notification to the primary SLA provider. At step 1750, the secondary SLA provider user activates the submit dispatch validation control. At step 1752, the secondary SLA provider completes additional fields and saves the inputs. At step 1755, the secondary SLA provider submits the dispatch record.

During steps 1740-1755, the secondary SLA provider is forced to establish the identity of SLA provision resource, the time of dispatch, and the estimated time of arrival during step 1745 with the inputs being stored, for example, in Table 72. Furthermore, the location information relative to facility access, directions etc. are provided and during this process acknowledged by the secondary SLA provider. As much as steps 1740-1755 force the secondary SLA provider to commit regarding logistical labor dispatch, these steps also provide the secondary SLA with the critical SLA client logistical information for proper provisioning dispatch.

Steps 1758-1768 depict a process by which a primary SLA provider systematically notifies the SLA client of SLA provision Resource dispatch to the provision location. At step 1758, the system 100 notifies the primary SLA provider of the dispatch record. At step 1760, the primary SLA provider accesses dispatch validation record and confirms receipt. At step 1762, the system 100 prompts the primary SLA provider to send a dispatch validation notification to the SLA client. At step 1765, the primary SLA provider user activates the send dispatch validation control. At step 1768, the system 100 sends notifications to the SLA client and the dispatch record is made available online.

Steps 1758-1760 can be time-administered and managed via expedition configuration if desired. The process of steps 1758-1768 completes the circuit that begins with an SLA client problem and ends with the SLA client user being notified of provision resources' estimated time of arrival.

FIG. 18 illustrates a database schema that supports the logistical provision and administrative function. Those having skill in the art will appreciate that various embodiments of the invention use a supporting data schema and application processing that not only introduce badly needed visibility and logistical control into a provisioning endeavor but also integrates necessary personnel and communications onto a single platform. Although not explicitly depicted, configurations may be established within various embodiments by which increased automation can be introduced to enable systematic provisioning request and labor dispatch. Such a scenario is often desirable in the event that applicable primary SLA provider personnel are not available to respond to an SLA client provisioning service request.

FIGS. 19A-19B illustrate processes applicable to SLA provision work acknowledgement and quality assurance. The description associated with FIGS. 19A-B focuses on tracking and documentation of pertinent provisioning activities that take place pursuant to a service provision dispatch. In a scenario in which either a secondary SLA provider or SLA client contacts a primary SLA provider to notify them that a dispatched provision resource failed to arrive at a provision location site, the system 100 may include functionality for handling such a scenario. Functionality may be provided to an SLA client user to initiate a no-show work flow process or, upon a direct communication to the primary SLA provider user, such as a phone call, a work flow process may be enabled to re-start the process, step 1725 at the point of available provision resource review (See FIG. 17 C) while referencing the already-stored database records applicable to the provision work at hand.

The description relative to FIGS. 19A-B focuses on: 1) enabling secondary SLA provider resource access to a service disposition voucher function by which details relative, for example, to work performed, materials deployed, and timing are input into the system 100 in response to a service provision dispatch request; 2) enabling secondary SLA providers to submit a service disposition voucher to a primary SLA provider for review and approval disposition; 3) enabling primary SLA provider to review and approve a service disposition voucher from secondary SLA provider; 4) enabling primary SLA provider to create a primary SLA provider service disposition voucher with reference from the secondary SLA provider service disposition voucher and submit same to an SLA client for review and disposition; 5) enabling SLA client to process a primary SLA provider service disposition voucher and provide quality assurance assessment information; and 6) enabling systematic notification to primary and secondary SLA provider users upon SLA client service disposition voucher processing.

Referring again to FIG. 19A, a process flow 1900 begins at step 1902, at which step the secondary SLA provider resource completes a service provisioning callout. Steps 1904-1918 depict a process of SLA provision resource service disposition voucher handling. At step 1904, the secondary SLA provider resource navigates a menu driven GUI to select a work voucher function. At step 1906, the system 100 provides a list display report of all provision dispatch records with a status of open. The list display presented to the SLA provision resource would typically be capable of handling multiple assignments (e.g., multiple assignments where open dispatch records are prevalent).

At step 1908, the user selects a desired provision record. The action in step 1908 results in the system 100 providing a service disposition voucher UI at step 1910. The UI typically inherits all of the pertinent details affiliated with the provision dispatch record set. Thus, the SLA provision resource would typically need only to complete the data input applicable to the service provision work performed, which input is accomplished at step 1912. Upon saving of the input at step 1914, the system 100 stores the transaction details, for example, in Tables 73-77.

Once the voucher record is saved, the SLA provision resource is prompted to submit the voucher to the pre-configured secondary SLA provider user for review and subsequent transaction processing at steps 1916 and 1918. The action taken at step 1918 triggers notification to the preconfigured secondary SLA provider user at step 1920.

At step 1922, the user accesses the new provision voucher from a menu or provided link. Step 1922 depicts the process by which a secondary SLA provider user navigates to the specific functional application module that enables service disposition voucher processing. The access is enabled via standard menu navigation or by activating the specific dashboard notification link applicable to the voucher transaction.

Steps 1924-1934 depict secondary SLA provider service disposition voucher handling. At step 1924, the system 100 provides the user with a voucher interface GUI. The voucher contains pricing as established on the secondary SLA provider purchase order. The system 100 presents to the secondary SLA provider user the voucher information submitted by the SLA provision Resource as well as information integrated from the applicable secondary SLA provider purchase order and applicable PO line item(s). Step 1924 is primarily a validation step providing the secondary SLA provider awareness of the completed provision work and review of the purchase order details contained within the voucher.

At step 1926, the user validates via system input the voucher details and saves same. Step 1926 is a physical validation of the information stored in the database by the secondary SLA provider user. The validation action results in a system prompt to the secondary SLA provider user to complete any applicable taxation assessment input at step 1928. Upon completion of the taxation data input or validation, if taxation assessment is preconfigured, the secondary SLA provider user saves the data settings at step 1930.

Steps 1932-1934 result in submittal of the work acknowledgement voucher to the configured primary SLA provider user. At step 1932, the system 100 prompts the user to submit the voucher to the primary SLA provider. At step 1934, the user submits the voucher to the primary SLA provider for review/approval.

Steps 1936-1944 depict a process by which a primary SLA provider reviews and makes disposition upon a submitted secondary SLA provider service disposition voucher. Steps 1936-1938 enable the configured primary SLA provider user access to the submitted secondary SLA provider service disposition voucher. At step 1936, the system 100 notifies the primary SLA provider of the new provision voucher. At step 1938, the primary SLA provider user accesses the new provision voucher from a menu or provided link.

At step 1940, the system 100 provides the user with a voucher interface GUI. The voucher contains pricing as established on the secondary SLA provider purchase order. The primary SLA provider user is typically provided an interface with a record display detailing all the pertinent details applicable to the service provision activity as well as the secondary SLA provider Purchase Order. At step 1942, the user has the option of either approving or disapproving of the detailed information provided therein. A positive action is depicted, by which the submitted service disposition voucher is approved at step 1944. After step 1944, the secondary SLA provider user is systematically notified of the approval of the submitted service disposition voucher.

Steps 1946-1954 depict a process by which the primary SLA provider can integrate the details from an approved secondary SLA provider service disposition voucher into a distinct primary SLA provider service disposition voucher, which will inherit applicable SLA client purchase order data. Once the approval of the voucher occurs at step 1944, the primary SLA provider user is prompted to create a new service disposition voucher at step 1946, for example, by activating the provided control at the UI. The depicted process is of a linear nature for illustrative purposes only. The creation of the new service disposition voucher can variably be undertaken at a different time and by different personnel if configured accordingly by a primary SLA provider. The user creates a new service disposition voucher at step 1948, which triggers a process and data integration similar to that of the secondary SLA provider handling of the service disposition voucher at steps 1908-1910.

Referring now to FIG. 19B, at step 1950, the system 100 provides the user with a voucher interface GUI. The voucher contains pricing as established on the SLA client purchase order. The system 100 creates a primary SLA provider service disposition voucher that contains the details applicable to the physical service provision work performed as well as the pertinent financial details relative to the SLA client purchase order.

There is not necessarily a business reason for the SLA client to see any pertinent details applicable to the secondary SLA provider except for the data input relative to the service provision work as entered by the SLA provision resource. Thus, the new primary SLA provider service disposition voucher is created which contains details pertinent to the relationship between the SLA client and the primary SLA provider.

Steps 1952-1954 depict actions taken by a primary SLA provider user to approve and submit the completed primary SLA provider service disposition voucher to the SLA client. Although the system 100 creates a new primary SLA provider service disposition voucher, the data is actually a sub-set of data contained in Tables 73-77. Those having skill in the art Steps 1956-1988 depict the steps taken by an SLA client while processing the submitted primary SLA provider service disposition voucher. At step 1956, the system 100 notifies the SLA client of the new provision voucher. At step 1958, the system 100 provides the user with a voucher interface GUI. The voucher contains pricing as established on the SLA client purchase order.

At step 1960, the SLA client user is prompted to approve or decline the service disposition voucher as submitted. Although not explicitly depicted, in various embodiments the SLA client may incorporate enhanced user roles and work flow and make the approval configuration more complex and robust. Presuming the SLA client user approves of the information contained within the service disposition voucher at step 1960, the user is prompted by the system 100 at step 1964 to activate a control that launches a quality assurance assessment session at steps 1964-1966. At step 1964, the system 100 prompts the user to complete a QA appraisal. At step 1966, the user activates a QA session control. Once the Q/A session is launched, the system 100 at step 1968 provides the user with a GUI form enabling the SLA client to assess the quality and timeliness of the service provision work as well as the timeliness and administrative ease of the provisional logistics that preceded the physical service provisioning.

Upon completion of the assessment, the SLA client is prompted to save their input at step 1970. This action triggers system 100 updates at step 1972 and subsequent systematic notifications of the approval to the applicable primary and secondary SLA provider users at step 1974.

If, at step 1960, the SLA client user declines the service disposition voucher, execution proceeds to step 1978. At step 1978, the SLA client user is prompted to complete a declination assessment, since there is at this point in time a debate regarding aspects of the provisioning services.

At step 1980, the system 100 provides the SLA client user with a GUI enabling designation of specific information objections as well as commentary input to justify any such objections. At step 1982, the SLA client user completes their assessment and saves the input. This action triggers the system 100 to store the record at step 1984 and subsequent notification of the declination to applicable primary and SLA provider users at step 1986. Step 1988 represents a start over that may be designed for purposes of application processing to be a perpetual loop by which an intervention process could be introduced and input acquired and stored from multiple parties. Details pertinent to voucher declination are stored in a table such as, for example, Table 81 while the declination codes themselves are stored in a table, such as, for example, Table 80.

FIG. 20 illustrates a database schema that supports SLA provision work acknowledgement and quality assurance.

SLA penalties assessment are a matter of database comparison, given that provision failure is typically a matter of: 1) dispatch untimeliness, 2) provision arrival timeliness or 3) provision failure. In the case of scenarios 1) and 2), the systematic use of status code management, date/time record stamping, and user validation adequately monitors these provisioning aspects. As for scenario 3), penalty assessment is a function of the SLA client voucher disposition. A discussion of the bill/pay function concerns the financial data processing function of the system 100. An information thread is sequenced as follows:

SLA client contract information tied to
provision detail records tied to
SLA client PO records tied to
primary SLA provider RFx bids tied to
secondary SLA provider RFx bid responses tied to
RFx bid awards tied to
secondary SLA provider PO records.

The above information thread completes the administrative setup that results in SLA provision coverage.

The continuing information thread is as follows:
SLA client service provision request (generated with reference to a provision Detail Record) tied to
primary SLA provider service provision dispatch request tied to
secondary SLA provider service provision dispatch tied to
provision Resource service disposition voucher tied to
secondary SLA provider service disposition voucher tied to
primary SLA provider service disposition voucher tied to
SLA client service disposition voucher Processing.

Various elements covered below include: 1) configured systematic extract of approved SLA client approved service disposition vouchers; 2) systematic generation of primary SLA provider to SLA client billing invoice files; 3) systematic generation of secondary SLA provider to primary SLA provider billing invoice files; 4) primary SLA provider Payment Receipt data upload feature upon SLA client payment; and 5) primary SLA provider Payment Release to secondary SLA provider feature premised upon SLA client payment.

FIG. 21 is a flow diagram that illustrates processes applicable to a bill-pay function. Steps 2102-2105 depict base extract of SLA client approved service disposition vouchers. This extract is configurable during program set up and entails the designation of an extract cycle period. The extraction record set information is stored in tables, such as, for example, Tables 82-83. Table 83 contains the identity of individual service disposition voucher line items; thus, the extract procedure validates record non-existence within this table as qualification for data extraction, meaning that records would not be redundantly extracted in error. Although not explicitly depicted, record extract can be configured in a more robust fashion, by which variable factors such as payment terms and accounting cycles can be introduced to effect specific record set extraction.

Steps 2108-2110 depict processes by which billing invoice files are generated from the base extract. At step 2108, the system 100 produces as configured billing invoice files for each SLA client. At step 2110, the system 100 produces as configured billing invoice files for each secondary SLA provider. Because the system 100 is full life cycle transaction and business entity centric, invoice files are generated for both billing to the SLA client on behalf of the primary SLA provider and billing to the primary SLA provider on behalf of the secondary SLA provider. The invoice files are multiple in the event that within the extract cycle period there were transactions for more than one SLA client and more than one secondary SLA provider.

Steps 2112-2128 collectively represent primary SLA provider billing invoice file handling. These steps depict a control process by which designated primary SLA provider user(s) can access and review the compiled files. The process is configurable and may in various embodiments be bypassed if a primary SLA provider opts not to undertake the review and release process. At step 2112, the system 100 notifies the authorized primary SLA provider user that new billing invoice files are available for processing. At step 2115, the primary SLA provider user accesses the financial management module. At step 2118, the primary SLA provider accesses billing invoice files. At step 2120, the primary SLA provider selects a new billing invoice file. At step 2122, the system 100 displays to the user a billing-invoice summary view. At step 2125, the system 100 prompts the user to release billing-invoice files. At step 2128, the user releases the billing-invoice files. At step 2130, the system 100 generates variable SLA client billing invoice files.

Upon release of the billing invoice files at step 2128, the system 100 generates parsed SLA client and secondary SLA provider billing invoice file views at steps 2130-2132. At step 2135, designated system users are notified that billing invoice files have been made available for review. The files are available for review within the system 100 to authorized configured users only. Only records pertinent to a specific business entity are typically viewed by users of the business entity (e.g., SLA client or secondary SLA provider). If desired the invoice files may be additionally transmitted, for example, via EDI if business methods warrant such transaction modes.

Steps 2138-2148 depict a process by which the secondary SLA provider and SLA client acknowledge receipt of the files. SLA client acknowledgement is in no way connected to or dependent upon secondary SLA provider file receipt acknowledgment. With EDI and EFT technologies this could be a silent transaction process by which funds are moved based upon service disposition voucher approval. After all, the financial transactions would be limited to source data elements that would already have gone through various approval processes.

At step 2138, an authorized SLA user accesses the financial management module. At step 2140, the SLA client accesses billing invoice files. At step 2142, the system 100 notifies the primary SLA provider of billing invoice receipt acknowledgment. At step 2145, the system 100 prompts the SLA client user to validate billing invoice file receipt. At step 2148, the SLA client user validates the billing invoice file.

At step 2150, the SLA client pays the primary SLA provider in accordance with contractual terms and conditions. At step 2152, the primary SLA provider uploads cash receipts file data into the system 100 or manually updates billing invoice record status to paid. At step 2155, the primary SLA provider runs a secondary SLA provider invoices pending report. At step 2158, the system 100 prompts the user to authorize payment. At step 2160, the user authorizes payment. At step 2162, the secondary SLA provider is notified of payment authorization. At step 2165, the primary SLA provider pays the secondary SLA provider in accordance with contractual terms and conditions. At step 2168, the primary SLA provider uploads cash payments file data into the system 100 or manually updates secondary SLA provider billing invoice records status to paid. At step 2170, payment data is available online for authorized users.

FIG. 22 illustrates a database schema that supports the bill-pay function.

FIG. 23 is a macro-level view of information management and decision support functionality in accordance with principles of the invention. In FIG. 23, a system 2300 includes an SLA provisioning management application database 2350 that receives as inputs a master data processing throughput 2310, a procurement processing throughput 2320, an SLA provisioning processing throughput 2330, and a financial processing throughput 2340.

Outputs from the SLA provisioning management application database 2350 include an SLA client provisioning requirements planning & strategic coverage analytics output 2355, an SLA provider performance metrics & ongoing decision support requirements provisioning output 2360, a contractual SLA provisioning analytics output 2365, a warranty & materials performance analysis output 2370, and an SLA provisioning profitability & financial analysis output 2375. Referring now in particular to the output 2355, a primary SLA provider utilizing an outsource mode to meet SLA service provision requirements for their SLA clients could unnecessarily risk failure if their provision servicing network is inadequate upon initial setup.

Various processes enable decision support functions inherent in the output 2355. These include: 1) contract information translation to provision detail records; 2) human resource provision skill profiling; 2) SLA client location mapping to provision detail records; 3) secondary SLA provider RFx bid and SLA provision resource submittal response processing; 4) SLA provision resource assignment; and 5) SLA provision resource calendar configuration/administration. The methodology provides a primary SLA provider the means by which SLA provision network gaps or inefficiencies can be identified before contractual SLA provision coverage initiates. If a primary SLA provider were to have zero historical data for the purpose of analytics, the methodology employed could be leveraged to identify potential SLA provision deficiencies based, for example, upon: 1) geographical coverage; 2) skill proficiency coverage; or 3) time frame coverage. On the other hand, if a primary SLA provider were to have existing data relative to SLA service provision frequency at the time of the analysis, more detailed variable views could be generated to broaden the scope of provision gap identification.

The value of the risk-identification decision support mode goes well beyond its utilization during coverage network setup. Once the provision network is configured, an alarm monitor may be configured that systematically notifies a primary SLA provider in the event that all assigned resources affiliated with a specific provision Detail Record/PO have been blacked out.

Turning now to the output 2360, various processes enable SLA provision performance analysis. The processes include: 1) specification of SLA provision response time frame affiliated with provision detail record(s); 2) online SLA client service provision request processing affiliated with provision detail record(s); 3) tracked primary SLA provider service provision request processing; 4) tracked secondary SLA provider service provision dispatch request processing; 5) tracked secondary SLA provider service provision dispatch processing; 6) SLA provision resource service disposition voucher processing; 7) secondary SLA provider service disposition voucher processing; 8) primary SLA provider service disposition voucher processing; and 9) SLA client service disposition voucher processing. These processes provide a means of acquiring details necessary to adequately track and manage SLA provision performance. Those having skill in the art will appreciate that SLA service provisioning in a service provision life cycle context begins with an SLA client service request and culminates with assessment being made as to the quality of the provision service work. When viewed in this context, the life cycle may be broken down into sub-functions that can be measured and analyzed. Various embodiments permit quantification and analytics relevant but not limited to: 1) primary SLA provider impact upon SLA provision time frame objectives; 2) secondary SLA provider impact upon SLA provision time frame objectives; 3) SLA provision resource impact upon SLA provision time frame objectives; 4) SLA provision resource impact upon SLA provision service objectives; and 5) SLA client satisfaction/dissatisfaction. Analysis can be undertaken regarding secondary SLA provider macro performance (i.e., as a business entity) or micro performance (i.e., accounting for individual provision resource performance)

Turning now to the output 2365, various processes enable contractual SLA provisioning analysis. In contrast to the output 2360, which stresses provider performance, the output 2365 stresses an inverse view that looks at contract SLA performance in terms, for example, of SLA non-provision penalties and SLA provision objective metrics. SLA provision performance can be viewed in various dimensions, such as multi-contract SLA client aggregate provision performance or aggregate SLA performance views for multi-SLA client contracts specific to a particular product and or service and or internal business organization.

Furthermore, various embodiments enable a primary SLA provider to view contracts in a unique manner. Because of the skill profiling functionality and database-driven SLA response time frame codes, contract comparison views are enabled that readily point out similarities and differences pertinent to SLA client contracts that specifically entail coverage for similar products and/or services. SLA contracts often vary from SLA client to SLA client. Some variances may be small and some variances may be significant. Various embodiments provide the means of exposing these variances in a manner that is suitable for review and analysis.

SLA contracts, for a particular geographic region or SLA clients in a particular industry such as, for example, telecommunications, contain provision response time frames that are half of all other applicable SLA contracts. This major variance could potentially be correlated, for example, to a particular sales organization or roll over contract provision terms. Furthermore, various embodiments provide direct metrics outputs pertaining to the impact of those variances. A system objective is to provide the primary SLA provider with all of the views necessary to not only identify SLA contract provision.

Turning now to the output step 2370, in analogous fashion to contract parameter analysis, so too can specific service and material warranty parameters be tracked and managed. Turning now to step 2375, SLA provisioning profitability & financial analysis output pertains, for example, to contract pricing, secondary SLA Pricing, SLA provision penalties, and material costs. Analytics are enabled that ultimately aim to improve bottom-line financial business performance.

Embodiments of the present invention may be implemented in, for example, hardware, software (e.g., carried out by a processor that executes computer-readable instructions), or a combination thereof. The computer-readable instructions may be program code loaded in a memory such as, for example, Random Access Memory (RAM), or from a storage medium such as, for example, Read Only Memory (ROM). For example, a processor may be operative to execute software adapted to perform a series of steps in accordance with principles of the present invention. The software may be adapted to reside upon a computer-readable medium such as, for example, a magnetic disc within a disc drive unit. The computer-readable medium may also include, for example, a flash memory card, EEROM based memory, bubble memory storage, or ROM storage. The software adapted to perform according to principles of the present invention may also reside, in whole or in part, in static or dynamic main memories or in firmware within a processor (e.g., within microcontroller, microprocessor, or a microcomputer internal memory).

Illustrative Tables 1-91 follow:

Table key

TABLE 1

Design
tblSLAPP (Design View)

| Column | Data Type | Length |
|---|---|---|
| SLAPPID | uniqueidentifier | 16 |
| SLAPPName | varchar | 100 |
| SLAPPStatusID | int | 4 |
| vParentCompanyName | varchar | 100 |
| vBusinessEntityTypeID | int | 4 |
| vFedIdentity | varchar | 50 |
| vYearCorp | varchar | 50 |
| vDandBNumber | varchar | 50 |
| vDandBRating | varchar | 50 |
| vFTEmployees | int | 4 |
| vFT_W2_employees | int | 4 |
| vURL | varchar | 100 |
| vPhone | varchar | 50 |
| vFax | varchar | 50 |
| vDBECertification | varchar | 50 |
| vDBETypeId | int | 4 |
| vDBECertificateNumber | varchar | 50 |
| vDBECertifyingBody | varchar | 50 |
| vEDI | char | 1 |
| vEFT | char | 1 |
| vClientEmployees | int | 4 |
| vCountryID | int | 4 |
| vPriorYearRevenues | money | 8 |
| vClientCount | numeric | 9 |
| NetROI | percentage | 4 |

TABLE 2

Design
tblSLAClientUser (Design View)

| Column | Data Type | Length |
|---|---|---|
| SLAPPUserID | uniqueidentifier | 16 |
| SLAPPID | uniqueidentifier | 16 |
| UserNameLast | varchar | 25 |
| UserNameFirst | varchar | 25 |
| UserPhone | varchar | 50 |
| UserEmail | varchar | 50 |
| UserSysLogin | varchar | 10 |
| Position/Title | varchar | 50 |

TABLE 3

Design
tblSLAProvisionTypes (Design View)

| Column | Data Type | Length |
|---|---|---|
| SLAProvisionTypeID | int | 4 |
| SLAProvisionTypeDesc | varchar | 50 |
| Status | int | 4 |

Data
tblSLAProvisionTypes (Data View)

| SLAProvisionTypeID | SLAProvisionTypeDesc | Status |
|---|---|---|
| 1 | Purchase_Warranty_Repair | Active |
| 2 | Extended_Warranty_Repair | Active |
| 3 | Service_Warranty_Repair | Active |
| 4 | Preventive_Provisioning | Inactive |
| 5 | Non-Contracted_Provisioning | Inactive |

TABLE 4

Design
tblSLAProvisionLaborTypes (Design View)

| Column | Data Type | Length |
|---|---|---|
| SLAProvisionLaborTypeID | int | 4 |
| SLAProvisionLaborTypeDesc | varchar | 50 |
| Status | int | 4 |

Data
tblSLAProvisionLaborTypes (Data View)

| SLAProvisionLaborTypeID | SLAProvisionLaborTypeDesc | Status |
|---|---|---|
| 1 | Time_Only | Inactive |
| 2 | Time_and_Expense | Inactive |
| 3 | Time_and_Material | Active |
| 4 | Time_and_Expense_and_Material | Active |
| 5 | Fixed_Price | Inactive |
| 6 | Labor_Differential | Inactive |

TABLE 5

Design
tblSLAProvisionTimes (Design View)

| Column | Data Type | Length |
|---|---|---|
| SLAResponseTimeID | int | 4 |
| SLAResponseTimeDesc | varchar | 500 |
| Qualifier_Desc | varchar | 500 |

Data
tblSLAProvisionTimes (Data View)

| SLAResponseTimeID | SLAResponseTimeDesc |
|---|---|
| 1 | Half Hour |
| 2 | Hour |
| 3 | End_Of_Business_Day |
| 4 | Calendar_Day |
| 5 | Next_Business_Day |

TABLE 6

Design
tblMaterialMaster (Design View)

| Column | Data Type | Length |
|---|---|---|
| MaterialMasterID | int | 4 |
| MaterialMasterShortName | varchar | 50 |
| MaterialMasterDesc | varchar | 500 |
| GoodTypeID | int | 4 |
| ManufacturerID | int | 4 |
| StockedItem | bit | 1 |
| LastCost | money | 8 |
| LastPurchase/MFGDate | datetime | 8 |
| QtyOnHand | numeric | 9 |
| ReorderPoint | numeric | 9 |
| ReorderQty | numeric | 9 |

TABLE 7

Design
tblMaterialMapLocation (Design View)

| Column | Data Type | Length |
|---|---|---|
| MaterialMasterID | int | 4 |
| LocationID | int | 4 |
| QtyOnHand | numeric | 9 |

TABLE 7-continued

Design
tblMaterialMapLocation (Design View)

| Column | Data Type | Length |
|---|---|---|
| LockedQty | numeric | 9 |
| StockRecordID | uniqueidentifier | 16 |

TABLE 8

Design
tblLocation (Design View)

| Column | Data Type | Length |
|---|---|---|
| SLAClientID | uniqueidentifier | 16 |
| LocationID | int | 4 |
| LocationTypeID | int | 4 |
| LocationName | varchar | 50 |
| StreetAddress | varchar | 100 |
| GEOCityID | int | 4 |
| PostalCodeID | varchar | 50 |
| MannedFacility | bit | 1 |
| LocationBadgingRequired | bit | 1 |
| GovtClearanceRequired | bit | 1 |
| LocationParkingDesc | varchar | 500 |
| LocationAccessDesc | varchar | 500 |
| LocationFreightDeliveryDesc | varchar | 500 |
| EmergencyAccessContactDetails | varchar | 500 |

TABLE 9

Design
tblLocationType (Design View)

| Column | Data Type | Length |
|---|---|---|
| LocationTypeID | int | 4 |
| Description | varchar | 50 |
| constname | varchar | 50 |

TABLE 10

Design
tblGEOCountry (Design View)

| Column | Data Type | Length |
|---|---|---|
| CountryID | int | 4 |
| CountryName | varchar | 100 |
| CountryAbbr | varchar | 50 |
| CurrencyName | varchar | 100 |
| CurrencyUnicode | varchar | 5 |

TABLE 11

Design
tblGEORegion (Design View)

| Column | Data Type | Length |
|---|---|---|
| Region_ID | int | 4 |
| Region_Name | varchar | 50 |
| Region_Type_ID | int | 4 |
| Country_ID | int | 4 |

TABLE 12

Design
tblGEOCounty (Design View)

| Column | Data Type | Length |
|---|---|---|
| County_ID | int | 4 |
| County_Name | varchar | 100 |
| Region_ID | int | 4 |

TABLE 13

Design
tblGEOCities (Design View)

| Column | Data Type | Length |
|---|---|---|
| City_ID | int | 4 |
| City_Name | varchar | 100 |
| County_ID | int | 4 |

TABLE 14

Design
tblBusinessSector (Design View)

| Column | Data Type | Length |
|---|---|---|
| BusinessSectorID | int | 4 |
| bsDescription | varchar | 100 |
| bsVisibleFlag | bit | 1 |
| bsSortId | int | 4 |

TABLE 15

Design
tblBusinessArena (Design View)

| Column | Data Type | Length |
|---|---|---|
| BusinessArenaID | int | 4 |
| baBusinessSectorID | int | 4 |
| baBusinessArenaName | varchar | 100 |
| baVisibleFlag | char | 1 |
| baSortID | int | 4 |

TABLE 16

Design
tblBusinessFamily (Design View)

| Column | Data Type | Length |
|---|---|---|
| BusinessFamilyID | int | 4 |
| bfBusinessArenaID | int | 4 |
| bfBusinessFamilyName | varchar | 100 |
| bfVisibleFlag | bit | 1 |
| bfSortID | int | 4 |

TABLE 17

Design
tblGeneralFunction (Design View)

| Column | Data Type | Length |
|---|---|---|
| GeneralFunctionID | int | 4 |
| gfName | varchar | 100 |

TABLE 17-continued

Design
tblGeneralFunction (Design View)

| Column | Data Type | Length |
|---|---|---|
| gfVisibleFlag | bit | 1 |
| gfSortID | int | 4 |

TABLE 18

Design
tblGeneralFunctionBusinessFamily (Design View)

| Column | Data Type | Length |
|---|---|---|
| GeneralFunctionID | int | 4 |
| BusinessFamilyID | int | 4 |
| GFMapBF_ID | int | 4 |

TABLE 19

Design
tblBusinessCategory (Design View)

| Column | Data Type | Length |
|---|---|---|
| BusinessCategoryID | int | 4 |
| bcBusinessCategoryName | varchar | 100 |
| bcVisibleFlag | int | 4 |
| bcSortID | int | 4 |

TABLE 20

Design
tblBusinessCategoryFamily (Design View)

| Column | Data Type | Length |
|---|---|---|
| BusinessCategoryID | int | 4 |
| mBusinessFamilyID | int | 4 |
| required | bit | 1 |
| RecordMapID | int | 4 |

TABLE 21

Design
tblBusinessSkills (Design View)

| Column | Data Type | Length |
|---|---|---|
| BusinessSkillID | int | 4 |
| bskDescription | varchar | 100 |
| bskVisibleFlag | bit | 1 |
| bskSortID | int | 4 |

TABLE 22

Design
tblBusinessCategorySkill (Design View)

| Column | Data Type | Length |
|---|---|---|
| bsmBusinessSkillID | int | 4 |
| bsmBusinessCategoryID | int | 4 |
| bsmSortId | int | 4 |
| CatMapSkillID | int | 4 |

TABLE 23

Design
tblSLAProvisionProfileMaster (Design View)

| Column | Data Type | Length |
|---|---|---|
| SLAProfileGUID | uniqueidentifier | 16 |
| PSLAUserGUID | uniqueidentifier | 16 |
| SLAProfileName | varchar | 255 |
| SLAProfileBusinessSectorID | int | 4 |
| SLAProfileBusinessArenaID | int | 4 |
| SLAProfileBusinessFamilyID | int | 4 |
| SLAJobTitle | varchar | 50 |
| SLAJobDescription | varchar | 2500 |
| rpmRecordDate | datetime | 8 |
| rpmCurrentStatusID | int | 4 |

TABLE 24

Design
tblSLAProvisionProfileMasterGFs (Design View)

| Column | Data Type | Length |
|---|---|---|
| SLAGFRecord_ID | int | 4 |
| SLAProfileGUID | uniqueidentifier | 16 |
| GeneralFunctionID | int | 4 |

TABLE 25

Design
tblSLAProvisionProfileMasterSkills (Design View)

| Column | Data Type | Length |
|---|---|---|
| SLAProfileGUID | uniqueidentifier | 16 |
| rsSkill_ID | int | 4 |
| rsSkillPriority | int | 4 |
| SLASkillRecord_ID | int | 4 |

TABLE 26

Design
tblSLAProfileMapMaterial (Design View)

| | | |
|---|---|---|
| SLAProfileGUID | uniqueidentifier | 16 |
| MaterialMasterID | int | 4 |
| ProficiencyID | int | 4 |
| CertificationRequired | bit | 1 |
| CertificationDesc | varchar | 100 |
| CertificationDate | datetime | 8 |

TABLE 27

Design
tblSLAClient (Design View)

| Column | Data Type | Length |
|---|---|---|
| SLAClientID | uniqueidentifier | 16 |
| SLAClientName | varchar | 100 |
| SLAClientStatusID | int | 4 |
| vParentCompanyName | varchar | 100 |
| vBusinessEntityTypeID | int | 4 |
| vFedIdentity | varchar | 50 |
| vYearCorp | varchar | 50 |
| vDandBNumber | varchar | 50 |
| vDandBRating | varchar | 50 |
| vFTEmployees | int | 4 |
| vFT_W2_employees | int | 4 |
| vURL | varchar | 100 |
| vPhone | varchar | 50 |

TABLE 27-continued

Design
tblSLAClient (Design View)

| Column | Data Type | Length |
|---|---|---|
| vFax | varchar | 50 |
| vDBECertification | varchar | 50 |
| vDBETypeId | int | 4 |
| vDBECertificateNumber | varchar | 50 |
| vDBECertifyingBody | varchar | 50 |
| vEDI | char | 1 |
| vEFT | char | 1 |
| vClientEmployees | int | 4 |
| vCountryID | int | 4 |
| vPriorYearRevenues | money | 8 |
| vClientCount | numeric | 9 |
| NetROI | percentage | 4 |

TABLE 28

Design
tblSLAClientContract (Design View)

| Column | Data Type | Length |
|---|---|---|
| SLAClientID | uniqueidentifier | 16 |
| SLAContract | varchar | 100 |
| SLAContractStatusID | int | 4 |
| ContractRecordID | int | 4 |
| ContractStartDate | datetime | 8 |
| ContractEndDate | datetime | 8 |
| ContractPaymentTermID | int | 4 |
| ContractPenaltyTerms | bit | 1 |
| IncentiveTerms | bit | 1 |
| CountofSLAProvisionSvcs | numeric | 9 |
| ProvisionDetailRecordCount | numeric | 9 |
| SLAClientIndustryID | int | 4 |
| SLAContractTypeID | int | 4 |
| SLAContractSalesOrgID | int | 4 |
| SLAContractSalesUserID | uniqueidentifier | 16 |

TABLE 29

Design
tblSLAClientUser (Design View)

| Column | Data Type | Length |
|---|---|---|
| SLAClientUserID | uniqueidentifier | 16 |
| SLAClientID | uniqueidentifier | 16 |
| UserNameLast | varchar | 25 |
| UserNameFirst | varchar | 25 |
| UserPhone | varchar | 50 |
| UserEmail | varchar | 50 |
| UserSysLogin | varchar | 10 |
| Position/Title | varchar | 50 |

TABLE 30

Design
tblSLAProvisionDetail (Design View)

| Column | Data Type | Length |
|---|---|---|
| SLAContractRecordID | int | 4 |
| SLAProvisionID | uniqueidentifier | 16 |
| SLAProvisionTypeID | int | 4 |
| SLAProvisionLaborTypeID | int | 4 |
| SLAResponseTimeID | int | 4 |
| SLAProvisionDesc | varchar | 5000 |
| BillableProvision | bit | 1 |
| SLAProvisionCost | money | 8 |
| ExpectedProvisionFrequency | numeric | 9 |

TABLE 30-continued

Design tblSLAProvisionDetail (Design View)

| Column | Data Type | Length |
|---|---|---|
| ProvisionRecordFriendlyName | varchar | 100 |
| SLANonProvisionPenaltyDesc | varchar | 1000 |
| SLANonProvisionPenalty | money | 8 |
| DispatchResponseTimeID | int | 4 |
| StatusID | int | 4 |

TABLE 31

Design tblSLAProvisionMaterials (Design View)

| Column | Data Type | Length |
|---|---|---|
| MaterialMasterID | int | 4 |
| SLAProvisionProvisionMaterialID | uniqueidentifier | 16 |
| SLAProvisionID | uniqueidentifier | 16 |
| WarrantyMaterial | bit | 1 |
| StockRecordID | uniqueidentifier | 16 |
| LockedtyCount | numeric | 9 |

TABLE 32

Design tblSLAProfileMapProvision (Design View)

| SLAProfileGUID | uniqueidentifier | 16 |
|---|---|---|
| SLAProvisionID | uniqueidentifier | 16 |
| DetailMatchSkills | bit | 1 |
| DetailMatchJobDesc | bit | 2 |
| SLAProfileMapProvisionID | uniqueidentifier | 16 |

TABLE 33

Design tblSLAProvisionDetailMapLocation (Design View)

| Column | Data Type | Length |
|---|---|---|
| SLAProvisionID | uniqueidentifier | 16 |
| LocationID | int | 4 |
| SLAProvisionLocationID | uniqueidentifier | 16 |

TABLE 34

Design tblSLAClientPO (Design View)

| Column | Data Type | Length |
|---|---|---|
| SLAClientPOID | uniqueidentifier | 16 |
| SLAClientPO | varchar | 50 |
| CreateDate | datetime | 8 |
| StartDate | datetime | 8 |
| EndDate | datetime | 8 |
| POVersion | numeric | 9 |
| POStatus | int | 4 |
| POMaxSpend | money | 8 |
| SLAContractRecordID | int | 4 |

TABLE 35

Design tblSLAClientPOLinesServices (Design View)

| Column | Data Type | Length |
|---|---|---|
| SLAClientPOID | uniqueidentifier | 16 |
| SLAClientPOIDLine | numeric | 9 |
| SLAProvisionID | uniqueidentifier | 16 |
| SLAProvisionShortDesc | varchar | 50 |
| SLAProvisionBillingRate | money | 8 |
| SLANonProvisionPenalty | money | 8 |
| ServicesRecordID | uniqueidentifier | 16 |

TABLE 36

Design tblSLAClientPOLinesMaterials (Design View)

| Column | Data Type | Length |
|---|---|---|
| SLAClientPOID | uniqueidentifier | 16 |
| SLAClientPOIDLine | numeric | 9 |
| SLAProvisionProvisionMaterialID | uniqueidentifier | 16 |
| MaterialBillRate | money | 8 |
| MaterialsPORecordID | uniqueidentifier | 16 |

TABLE 88

Design tblProvisionPeriods (Design View)

| Column | Data Type | Length |
|---|---|---|
| SLAProvisionPeriodDesc | varchar | 30 |
| SLAProvisionPeriodID | int | 4 |

Data tblProvisionPeriods (Data View)

| SLAProvisionPeriodDesc | SLAProvisionPeriodID |
|---|---|
| Weekday_08:00-18:00 | 1 |
| Weekday_00:01-07:59 | 2 |
| Weekday_18:01-24:00 | 3 |
| Weekend_08:00-18:00 | 4 |
| Weekend_00:01-07:59 | 5 |
| Weekend_18:01-24:00 | 6 |
| Holiday_08:00-18:00 | 7 |
| Holidad_00:01-07:59 | 8 |
| Holidad_18:01-24:00 | 9 |

TABLE 89

Design tblSLAProvisionExpenseTypes (Design View)

| Column | Data Type | Length |
|---|---|---|
| SLAProvisionExpenseTypeID | int | 4 |
| SLAProvisionExpenseTypeDesc | varchar | 50 |

Data tblSLAProvisionExpenseTypes (Data View)

| SLAProvisionExpenseTypeID | SLAProvisionExpenseTypeDesc |
|---|---|
| 1 | Parking/Toll |
| 2 | Auto Mileage |
| 3 | Hotel Room |
| 4 | Per Diem |

TABLE 37

Design
tblSLARFXMaster (Design View)

| Column | Data Type | Length |
| --- | --- | --- |
| SLA_RFx_ID | int | 4 |
| Originator_User_ID | int | 4 |
| RFX_Template_ID | int | 4 |
| Order_Status_ID | int | 4 |
| Client_Bid_ID | varchar | 100 |
| RFX_Administration_LocationID | numeric | 9 |
| Currency_ID | int | 4 |
| BudgetedExpenditure | money | 8 |
| Financial_Approval_Required | char | 1 |
| Non_Finanical_Approval_Required | char | 1 |
| DateCreated | datetime | 8 |

TABLE 38

Design
tblSLARFXLines (Design View)

| Column | Data Type | Length |
| --- | --- | --- |
| SLA_RFx_ID | int | 4 |
| SLA_RFx_Line_ID | int | 4 |
| SLAProfileGUID | uniqueidentifier | 16 |
| GEOCode_Type_ID | int | 4 |
| Provision_Desc | sql_variant | |
| Provision_Locations | sql_variant | |
| Expected_Service_Calls | numeric | 9 |
| Labor_Service_Type | int | 4 |
| Max_Bill_Rate | money | 8 |
| Max_Resource_Submittals | numeric | 9 |
| Provision_Response_Time ID | int | 4 |
| Provision_Response_Time_Desc | varchar | 500 |

TABLE 39

Design
tblSLARFXProvisionRecords (Design View)

| Column | Data Type | Length |
| --- | --- | --- |
| SLA_RFx_Line_ID | int | 4 |
| SLAProvisionID | uniqueidentifier | 16 |
| SLAProvisionProvisionMaterialID | uniqueidentifier | 16 |
| RFx_Provision_Record_ID | uniqueidentifier | 16 |

TABLE 40

Design
tblSLAProviderSecondary (Design View)

| Column | Data Type | Length |
| --- | --- | --- |
| SLASecondaryProviderID | int | 4 |
| vSPCompanyName | varchar | 100 |
| vParentCompanyName | varchar | 100 |
| RequestRowID | int | 4 |
| vPublic | char | 1 |
| vBusinessEntityTypeID | int | 4 |
| vFedIdentity | varchar | 50 |
| vYearCorp | varchar | 50 |
| vDandBNumber | varchar | 50 |
| vDandBRating | varchar | 50 |
| vFTEmployees | int | 4 |
| vFT_W2_employees | int | 4 |
| vURL | varchar | 100 |
| vPhone | varchar | 50 |
| vFax | varchar | 50 |
| vEmail | varchar | 50 |
| vRFXEmail | varchar | 50 |

TABLE 40-continued

Design
tblSLAProviderSecondary (Design View)

| Column | Data Type | Length |
| --- | --- | --- |
| vDBECertification | varchar | 50 |
| vDBETypeId | int | 4 |
| vDBECertificateNumber | varchar | 50 |
| vDBECertifyingBody | varchar | 50 |
| vSmallBusinessDesignationID | int | 4 |
| vEDI | char | 1 |
| vEFT | char | 1 |
| vClientEmployees | int | 4 |
| vContracted | char | 1 |
| vContractNumber | varchar | 50 |
| vContractDate | datetime | 8 |
| vStatusTypeID | int | 4 |
| vProfileFile | int | 4 |
| vCountryID | int | 4 |
| vApprovalStatusID | int | 4 |
| vCurrentStatusID | int | 4 |
| vAccountManagerID | int | 4 |
| vExpirationDate | datetime | 8 |
| vJDPowerRating | varchar | 50 |
| vISOCertified | varchar | 50 |

TABLE 41

Design
tblSLAProviderSecondaryUser (Design View)

| Column | Data Type | Length |
| --- | --- | --- |
| SLASecondaryProviderID | int | 4 |
| SLASecondaryProviderUserID | uniqueidentifier | 16 |
| SLASecondaryProviderUserName | varchar | 50 |
| SLASecondaryProviderUserPhone | varchar | 50 |
| SLASecondaryProviderUserEmail | varchar | 50 |
| SLASecondaryProviderUserTypeID | int | 4 |
| SLASecondaryProviderUserStatusID | int | 5 |
| SLASecondaryProviderUserCreateDate | datetime | 8 |
| SLASecondaryProviderUserLogin | varchar | 50 |

TABLE 42

Design
tblSLAProviderMapFamily (Design View)

| Column | Data Type | Length |
| --- | --- | --- |
| Record_Map_ID | int | 4 |
| vpSLAProviderID | int | 4 |
| vpFamilyID | int | 4 |
| vpApprovalStatusID | int | 4 |
| vpCurrentStatusID | int | 4 |
| vpApprovedDate | datetime | 4 |
| vpCreateDate | datetime | 4 |

TABLE 43

Design
tblSLAProviderMapCountry (Design View)

| Column | Data Type | Length |
| --- | --- | --- |
| SLAProviderMapFamID | int | 4 |
| pcCountryID | int | 4 |
| pcFamilyID | int | 4 |
| pcApprovalStatusID | int | 4 |
| pcCurrentStatusID | int | 4 |
| pcSLAProviderID | int | 4 |

TABLE 43-continued

Design
tblSLAProviderMapCountry (Design View)

| Column | Data Type | Length |
|---|---|---|
| pcCountryPartial | int | 4 |
| SLAProviderFamCountryID | int | 4 |

TABLE 44

Design
tblSLAProviderMapRegion (Design View)

| Column | Data Type | Length |
|---|---|---|
| SLAProviderFamCountryID | int | 4 |
| prRegionID | int | 4 |
| prFamilyID | int | 4 |
| prApprovalStatusID | int | 4 |
| prCurrentStatusID | int | 4 |
| pcSLAProviderID | int | 4 |
| prRegionPartial | int | 4 |
| SLAProviderpRegionID | int | 4 |

TABLE 45

Design
tblSLAProviderMapCounty (Design View)

| Column | Data Type | Length |
|---|---|---|
| SLAProviderpRegionID | int | 4 |
| prRegionID | int | 4 |
| prFamilyID | int | 4 |
| prApprovalStatusID | int | 4 |
| prCurrentStatusID | int | 4 |
| pcSLAProviderID | int | 4 |
| prCountyPartial | int | 4 |
| SLAProviderpCountyID | int | 4 |

TABLE 46

Design
tblSLAProviderMapCity (Design View)

| Column | Data Type | Length |
|---|---|---|
| SLAProviderpCountyID | int | 4 |
| pctCityID | int | 4 |
| prFamilyID | int | 4 |
| pctApprovalStatusID | int | 4 |
| pctCurrentStatusID | int | 4 |
| pcSLAProviderID | int | 4 |
| SLAProviderpCityID | int | 4 |

TABLE 47

Design
tblSLARFXPost (Design View)

| Column | Data Type | Length |
|---|---|---|
| SLA_RFx_ID | int | 4 |
| SLASecondaryProviderID | int | 4 |
| Post_Date | datetime | 8 |
| Post_Version | numeric | 9 |
| Response_Open_Date | datetime | 8 |
| Response_Close_Date | datetime | 8 |
| Partial_Response_Enabled | bit | 1 |
| Post_Record_ID | uniqueidentifier | 16 |

TABLE 48

Design
tblSLARFXResponseMain (Design View)

| Column | Data Type | Length |
|---|---|---|
| Row_id | int | 4 |
| Post_Record_ID | uniqueidentifier | 16 |
| SLA_RFx_ID | int | 4 |
| SLASecondaryProviderID | int | 4 |
| SLA_RFX_Resp_Status_ID | int | 4 |
| Date_Created | datetime | 8 |
| Date_Submitted | datetime | 8 |
| SLA_RFX_Resp_ID | uniqueidentifier | 16 |

TABLE 49

Design
tblSLARFXResponseDetail (Design View)

| Column | Data Type | Length |
|---|---|---|
| SLA_RFX_Resp_ID | uniqueidentifier | 16 |
| SLA_RFx_Line_ID | int | 4 |
| SLAProfileGUID | uniqueidentifier | 16 |
| Provision_Response_Time_Acceptance | bit | 1 |
| Billing_Rate_Labor | sql_variant | |
| Billing_Rate_Expenses | sql_variant | |
| Provision_Quote_ID | uniqueidentifier | 16 |
| Bid_Award_Status | int | 4 |

TABLE 50

Design
tblSLARFXResponseSubmittal (Design View)

| Column | Data Type | Length |
|---|---|---|
| SLA_Submittal_ID | uniqueidentifier | 16 |
| Provision_Quote_ID | uniqueidentifier | 16 |
| VendorContactID | int | 4 |
| VendorContactName | varchar | 100 |
| VendorContactPhone | varchar | 100 |
| VendorContactEmail | varchar | 100 |
| SLASubmittalStatusID | int | 4 |
| SubmittalDate | datetime | 8 |
| ResourceFirstName | varchar | 50 |
| ResourceLastName | varchar | 50 |
| ResourceMiddleName | varchar | 50 |
| WorkLocationAcceptance | bit | 1 |
| Work_Authorihaztion_Desc | varchar | 100 |
| Social_Security_No | varchar | 50 |
| MilitaryGovClearance | char | 1 |
| MilitaryGovClearanceDescription | varchar | 50 |
| EmploymentAgreement | char | 1 |
| VendorNotes | varchar | 1000 |
| DeclinedReason | varchar | 500 |
| ResumePath | varchar | 100 |
| AvailableStartDate | datetime | 8 |
| PreviouslyWorked | char | 1 |
| DrugTested | char | 1 |
| DrugTestDescription | varchar | 100 |
| DrugTestDate | datetime | 8 |
| People_ID | uniqueidentifier | 16 |

TABLE 51

Design
tblSLASecondaryProviderPO (Design View)

| Column | Data Type | Length |
|---|---|---|
| SLASecondaryProviderPOID | uniqueidentifier | 16 |
| PurchaseOrderIdentifier | varchar | 50 |

TABLE 51-continued

Design
tblSLASecondaryProviderPO (Design View)

| Column | Data Type | Length |
|---|---|---|
| CreateDate | datetime | 8 |
| StartDate | datetime | 8 |
| EndDate | datetime | 8 |
| POVersion | numeric | 9 |
| POStatus | int | 4 |
| POMaxSpend | money | 8 |
| ApprovalStatusID | int | 4 |
| SLA_RFX_Resp_ID | uniqueidentifier | 16 |
| POReqID | uniqueidentifier | 16 |
| POReqNumber | varchar | 20 |
| SSPUserApprovalID | uniqueidentifier | 16 |
| PSPApproverID | uniqueidentifier | 16 |

TABLE 52

Design
tblSLASecondaryProviderPOLine (Design View)

| Column | Data Type | Length |
|---|---|---|
| SLASecondaryProviderPOID | uniqueidentifier | 16 |
| Provision_Quote_ID | uniqueidentifier | 16 |
| SLAProfileGUID | uniqueidentifier | 16 |
| Billing_Rate_Labor | sql_variant | |
| Billing_Rate_Expenses | sql_variant | |
| SLAProvisionID | uniqueidentifier | 16 |
| SLASecondaryProviderPOLineID | uniqueidentifier | 16 |
| SLASecondaryProviderPOLine | numeric | 9 |
| SLAProvisionDesc | varchar | 5000 |
| SLAProvisionProvisionMaterialID | uniqueidentifier | 16 |
| SLAMaterialPrice | money | 8 |
| SLANonProvisionPenaltyDesc | varchar | 1000 |
| SLANonProvisionPenalty | money | 8 |
| POReqID | uniqueidentifier | 16 |
| POReqLineNumber | numeric | 9 |

TABLE 90

Design
tblBRProvisionPeriodBilling (Design View)

| Column | Data Type | Length |
|---|---|---|
| SLA_RFX_Resp_ID | uniqueidentifier | 16 |
| SLA_RFx_Line_ID | int | 4 |
| SLAProvisionPeriodID | int | 4 |
| Billing_Rate | money | 8 |
| BillingRateID | uniqueidentifier | 16 |
| BillingRateBundleID | uniqueidentifier | 16 |
| SLASecondaryProviderUserID | uniqueidentifier | 16 |

TABLE 91

Design
tblBRExpenseBilling (Design View)

| Column | Data Type | Length |
|---|---|---|
| SLA_RFX_Resp_ID | uniqueidentifier | 16 |
| SLA_RFx_Line_ID | int | 4 |
| SLAProvisionExpenseTypeID | int | 4 |
| Reimbursement_Requested | bit | 1 |
| Per_Occurrence_Max | money | 8 |
| ExpenseRateID | uniqueidentifier | 16 |
| ExpenseRateBundleID | uniqueidentifier | 16 |
| SLASecondaryProviderUserID | uniqueidentifier | 16 |

TABLE 53

Design
tblSLALaborer (Design View)

| Column | Data Type | Length |
|---|---|---|
| People_ID | uniqueidentifier | 16 |
| LoginID | varchar | 10 |
| NDASys | bit | 1 |
| NDASysDate | datetime | 8 |
| NDASLAPP | bit | 1 |
| NDASLAPPDate | datetime | 8 |
| IPSLAPP | bit | 1 |
| IPSLAPPDate | datetime | 8 |
| ATWSLAPP | bit | 1 |
| ATWSLAPPDate | datetime | 8 |
| InfoValidation | int | 4 |
| InfoValidationDate | datetime | 8 |
| SLASPEmp | bit | 1 |
| SLASPEmpDate | datetime | 8 |
| CreateDate | datetime | 8 |
| SysAccessDate | datetime | 8 |
| LastAccessDate | datetime | 8 |
| StatusID | int | 4 |
| SLASPID | int | 4 |
| ActiveAssignment | bit | 1 |

TABLE 54

Design
tblSLAPOHRAssignment (Design View)

| Column | Data Type | Length |
|---|---|---|
| SLASecondaryProviderPOLineID | uniqueidentifier | 16 |
| SLAProvisionID | uniqueidentifier | 16 |
| SLA_Submittal_ID | uniqueidentifier | 16 |
| People_ID | uniqueidentifier | 16 |
| StatusID | int | 4 |
| SLAPPApproverID | uniqueidentifier | 16 |
| SLAPPApprovedDate | datetime | 8 |
| AssignmentID | uniqueidentifier | 16 |
| SLASPConfirmDate | datetime | 8 |
| SLASPUserID | uniqueidentifier | 16 |

TABLE 55

Design
tblSLALaborScheduleMain (Design View)

| Column | Data Type | Length |
|---|---|---|
| LaborPeopleID | uniqueidentifier | 16 |
| StdScheduleID | uniqueidentifier | 16 |
| StatusID | int | 4 |
| DateCreated | datetime | 8 |
| SLASPApproverID | uniqueidentifier | 16 |
| AssignmentID | uniqueidentifier | 16 |

TABLE 56

Design
tblSLALaborScheduleDefault (Design View)

| Column | Data Type | Length |
|---|---|---|
| StdScheduleID | uniqueidentifier | 16 |
| DayNameID | int | 4 |
| BeginBlackOut | int | 4 |
| EndBlackOut | int | 4 |
| RecordID | uniqueidentifier | 16 |

TABLE 57

Design
tblSLALaborScheduleNondDefault (Design View)

| Column | Data Type | Length |
|---|---|---|
| StdScheduleID | uniqueidentifier | 16 |
| DateID | int | 4 |
| BOEntryTypeID | int | 4 |
| BeginBlackOut | int | 4 |
| EndBlackOut | int | 4 |
| NonstandardBORecordID | uniqueidentifier | 16 |
| DateCreated | datetime | 8 |
| StatusID | int | 4 |
| SLASPApproverID | uniqueidentifier | 16 |

TABLE 58

Design
tblDate (Design View)

| Column | Data Type | Length |
|---|---|---|
| DateID | int | 4 |
| DayNumberID | int | 4 |
| DayNameID | int | 4 |
| MonthID | int | 4 |
| YearID | int | 4 |

TABLE 59

Design
tblDateDayName (Design View)

| Column | Data Type | Length |
|---|---|---|
| DayNameID | int | 4 |
| DayNameDesc | varchar | 10 |

TABLE 60

Design
tblDateDayNumber (Design View)

| Column | Data Type | Length |
|---|---|---|
| DayNameID | int | 4 |
| DayNameDesc | numeric | 9 |

TABLE 61

Design
tblDateMonth (Design View)

| Column | Data Type | Length |
|---|---|---|
| MonthID | int | 4 |
| MonthDesc | varchar | 10 |

TABLE 62

Design
tblDateYear (Design View)

| Column | Data Type | Length |
|---|---|---|
| YearID | int | 4 |
| YearDesc | numeric | 9 |

TABLE 63

Design
tblDateTime (Design View)

| Column | Data Type | Length |
|---|---|---|
| GMTHalfHourID | int | 4 |
| GMTHourDesc | varchar | 6 |

TABLE 64

Design
tblSLAProvisionRequestMain (Design View)

| Column | Data Type | Length |
|---|---|---|
| SLAProvisonRequestID | uniqueidentifier | 16 |
| SLAClientControlID | varchar | 25 |
| StatusID | int | 4 |
| CreateDate | datetime | 8 |
| SLAClientUserID | uniqueidentifier | 16 |
| SLAPPResponse | datetime | 8 |
| SLAPPUserID | uniqueidentifier | 16 |

TABLE 65

Design
tblSLAProvisionRequestSvc (Design View)

| Column | Data Type | Length |
|---|---|---|
| SLAProvisonRequestID | uniqueidentifier | 16 |
| SLAProvisionID | uniqueidentifier | 16 |
| SLAProfileGUID | uniqueidentifier | 16 |
| SLAProvisionLaborTypeID | int | 4 |
| SLAResponseTimeID | int | 4 |
| SLAProvisionDesc | varchar | 5000 |
| SLAClientNotes | varchar | 1000 |
| ServiceLineID | uniqueidentifier | 16 |
| SLAProvisionLocationID | uniqueidentifier | 16 |
| LocationDetails | varchar | 500 |
| MannedFacility | bit | 1 |
| LocationBadgingRequired | bit | 1 |
| GovtClearanceRequired | bit | 1 |
| LocationParkingDesc | varchar | 500 |
| LocationAccessDesc | varchar | 500 |
| LocationFreightDeliveryDesc | varchar | 500 |
| EmergencyAccessContactDetails | varchar | 500 |

TABLE 66

Design
tblSLAProvisionRequestMat (Design View)

| Column | Data Type | Length |
|---|---|---|
| ServiceLineID | uniqueidentifier | 16 |
| SLAProvisionMaterialID | uniqueidentifier | 16 |
| MaterialDesc | varchar | 50 |
| StockRecordID | uniqueidentifier | 16 |
| QtyRequired | numeric | 9 |
| MaterialLineID | uniqueidentifier | 16 |

TABLE 67

Design
tblSLAProvisionRequestStatus (Design View)

| Column | Data Type | Length |
|---|---|---|
| ServiceRequestStatusID | int | 4 |
| ServiceRequestStatusDesc | varchar | 20 |

Data
tblSLAProvisionRequestStatus (Data View)

| ServiceRequestStatusID | ServiceRequestStatusDesc |
|---|---|
| 1 | Temporary_Save |
| 2 | New_Submission |
| 3 | SLAPP_Acknowledged |
| 4 | SLAPP_Nonprocessed |
| 5 | Svc_Dispatch_Request |
| 6 | Dispatched |
| 7 | Awaiting_Voucher |
| 8 | Voucher_Pending |
| 9 | Voucher_Disposition |

TABLE 68

Design
tblSLAProvisionRequestDispatchMain (Design View)

| Column | Data Type | Length |
|---|---|---|
| SLAProvisonRequestID | uniqueidentifier | 16 |
| ProvisionServiceLineID | uniqueidentifier | 16 |
| SLASecondaryProviderID | int | 4 |
| SLASecondaryProviderPOID | uniqueidentifier | 16 |
| SLASecondaryProviderPOLineID | uniqueidentifier | 16 |
| SLAResourceCapacity | bit | 1 |
| SLAResourceCapacityCount | numeric | 9 |
| QuerydDate | datetime | 8 |
| SLAPPUserID | uniqueidentifier | 16 |
| SLAProvisionCapacityID | uniqueidentifier | 16 |
| Billing_Rate_Labor | sql_variant | |
| Billing_Rate_Expenses | sql_variant | |
| SLA_Penalty | money | 8 |
| ResourceSelectionPreferenceID | int | 4 |
| SLASPDispatchRequestStatusID | int | 4 |

TABLE 69

Design
tblSLAProvisionRequestDispatchLabor (Design View)

| Column | Data Type | Length |
|---|---|---|
| SLAProvisionCapacityID | uniqueidentifier | 16 |
| People_ID | uniqueidentifier | 16 |
| AssignmentID | uniqueidentifier | 16 |
| StdScheduleID | uniqueidentifier | 16 |
| Resource_Available | bit | 1 |
| Provision_Metrics | bit | 1 |
| ProvisionCapacityDetail | uniqueidentifier | 16 |
| SelectionStatusID | int | 4 |

TABLE 70

Design
tblSLAResourceDispatchPreference (Design View)

| Column | Data Type | Length |
|---|---|---|
| ResourceSelectionPreferenceID | int | 4 |
| ResourceSelectionPreferenceDesc | varchar | 50 |

Data
tblSLAResourceDispatchPreference (Data View)

| ResourceSelectionPreferenceID | ResourceSelectionPreferenceDesc |
|---|---|
| 1 | Any_Available_Resource |
| 2 | Specific_Resource_Request |

TABLE 71

Design
tblSLADispatchRequestStatus (Design View)

| Column | Data Type | Length |
|---|---|---|
| SLASPDispatchRequestStatusID | int | 4 |
| SLASPDispatchRequestStatusDesc | varchar | 50 |

Data
tblSLADispatchRequestStatus (Data View)

| ResourceSelectionPreferenceID | ResourceSelectionPreferenceDesc |
|---|---|
| 1 | Temporary_Save |
| 2 | New_Submission |
| 3 | SLASP_Acknowledged |
| 4 | SLA_Client_Notified |
| 5 | SLASP_Declined |
| 5 | Open |

TABLE 72

Design
tblSLAProvisionRequestDispatchDetails (Design View)

| Column | Data Type | Length |
|---|---|---|
| SLASecondaryProviderID | int | 4 |
| SLAProvisionCapacityID | uniqueidentifier | 16 |
| SLAClientID | uniqueidentifier | 16 |
| SLAProvisionLocationID | uniqueidentifier | 16 |
| ResourceSelectionPreferenceID | int | 4 |
| AssignmentID | uniqueidentifier | 16 |
| SLAClientUserID | uniqueidentifier | 16 |
| SLAPPUserID | uniqueidentifier | 16 |
| SLAProvisionLaborTypeID | int | 4 |
| SLAResponseTimeID | int | 4 |
| Response_Deadline | datetime | 8 |
| SLAProvisionDesc | varchar | 5000 |
| SLAClientNotes | varchar | 1000 |
| SLASPUserID | uniqueidentifier | 16 |
| CreateDate | datetime | 8 |
| ServiceLineID | uniqueidentifier | 16 |
| SLAProvisionMaterialID | uniqueidentifier | 16 |
| StockRecordID | uniqueidentifier | 16 |
| SLASecondaryProviderPOID | uniqueidentifier | 16 |
| SLASecondaryProviderPOLineID | uniqueidentifier | 16 |
| SLASPAcknowledgeDate | datetime | 8 |
| ValidateDispatch | int | 4 |
| ResourceETA | datetime | 8 |

TABLE 73

Design
tblSLAVoucherMain (Design View)

| Column | Data Type | Length |
| --- | --- | --- |
| DispatchDetailID | uniqueidentifier | 16 |
| AssignmentID | uniqueidentifier | 16 |
| SLASP_DateCreated | datetime | 8 |
| Service_Date | datetime | 8 |
| LocationID | int | 4 |
| SLASecondaryProviderID | int | 4 |
| SLASecondaryProviderContact | uniqueidentifier | 16 |
| SLAClientControlID | varchar | 25 |
| SLASPVoucherID | uniqueidentifier | 16 |
| SLAClientID | uniqueidentifier | 16 |

TABLE 74

Design
tblSLAVoucherDetailSvc (Design View)

| Column | Data Type | Length |
| --- | --- | --- |
| SLASPVoucherID | uniqueidentifier | 16 |
| SLASecondaryProviderPOID | uniqueidentifier | 16 |
| SLASecondaryProviderPOLineID | uniqueidentifier | 16 |
| SLAProvisionID | uniqueidentifier | 16 |
| SLAProvisionVoucherDesc | varchar | 1000 |
| ProvisionDateID | int | 4 |
| Arrive_Time | datetime | 8 |
| Depart_Time | datetime | 8 |
| ProvisionRequestTime | datetime | 8 |
| Labor_Time | numeric | 9 |
| SLAProvisionLaborTypeID | int | 4 |
| Labor_Qty | numeric | 9 |
| SP_Labor_Charge | money | 8 |
| SLAVoucherSvcLineID | uniqueidentifier | 16 |
| ProvisionOutcomeStatus | int | 4 |
| SLASPResponsePenaltyStatus | int | 4 |
| SLAPPReviewerID | uniqueidentifier | 16 |
| SLAPPReviewerDate | datetime | 8 |
| SLAPPReviewerStatusID | int | 4 |
| SLAPPReviewerNotes | varchar | 1000 |
| ServicesRecordID | uniqueidentifier | 16 |
| Billable_Provision | bit | 1 |
| SLAClientPOIDLine | numeric | 9 |
| SLAProvisionBillingRate | money | 8 |
| SLANonProvisionPenalty | money | 8 |
| SLAClientReviewerID | uniqueidentifier | 16 |
| SLAClientPReviewerDate | datetime | 8 |
| SLAClientReviewerStatusID | int | 4 |
| SLAClientReviewerNotes | varchar | 1000 |
| Provision_Performance_ID | int | 4 |
| Logistical_Administration_ID | int | 4 |

TABLE 75

Design
tblSLAVoucherDetailMat (Design View)

| Column | Data Type | Length |
| --- | --- | --- |
| SLASPVoucherID | uniqueidentifier | 16 |
| SLASecondaryProviderPOID | uniqueidentifier | 16 |
| SLASecondaryProviderPOLineID | uniqueidentifier | 16 |
| SLAProvisionID | uniqueidentifier | 16 |
| SLAProvisionProvisionMaterialID | uniqueidentifier | 16 |
| Provision_Material_Cost | money | 8 |
| Provision_Qty | numeric | 9 |
| SLAVoucherSvcLineID | uniqueidentifier | 16 |
| SLAVoucherMatLineID | uniqueidentifier | 16 |
| SLAPPReviewerID | uniqueidentifier | 16 |
| SLAPPReviewerDate | datetime | 8 |
| SLAPPReviewerStatusID | int | 4 |
| SLAPPReviewerNotes | varchar | 1000 |

TABLE 75-continued

Design
tblSLAVoucherDetailMat (Design View)

| Column | Data Type | Length |
| --- | --- | --- |
| MaterialsPORecordID | uniqueidentifier | 16 |
| Billable_Provision | bit | 1 |
| SLAClientPOIDLine | numeric | 9 |
| MaterialBillRate | money | 8 |
| Total_Charge | money | 8 |
| SLAClientReviewerID | uniqueidentifier | 16 |
| SLAClientPReviewerDate | datetime | 8 |
| SLAClientReviewerStatusID | int | 4 |
| SLAClientReviewerNotes | varchar | 1000 |

TABLE 76

Design
tblSLAVoucherProvisionOutcomeStatus (Design View)

| Column | Data Type | Length |
| --- | --- | --- |
| ProvisionOutcomeStatusID | int | 4 |
| ProvisionOutcomeStatusDesc | varchar | 50 |

Data
tblSLAVoucherProvisionOutcomeStatus (Data View)

| ProvisionOutcomeStatusID | ProvisionOutcomeStatusDesc |
| --- | --- |
| 1 | Provison_Complete |
| 2 | No_Provision_Needed |
| 3 | Provison_Incomplete_Need_Troubleshooting |
| 4 | Provison_Incomplete_Need_Parts |
| 5 | Provison_Incomplete_Out_Of_Scope_Provision |

TABLE 77

Design
tblSLAVoucherStatus (Design View)

| Column | Data Type | Length |
| --- | --- | --- |
| VoucherStatusID | int | 4 |
| VoucherStatusDesc | varchar | 25 |

Data
tblSLAVoucherStatus (Data View)

| VoucherStatusID | VoucherStatusDesc |
| --- | --- |
| 1 | Submitted_To_SLAPP |
| 2 | Submitted_To_SLAClient |
| 3 | Approved |
| 4 | Declined_SLAClient |
| 5 | Declined_SLAPP |
| 6 | On_Hold |
| 7 | Contested_SLAPP |
| 8 | Contested_SLAClient |
| 9 | Contested_Declination_SP |

TABLE 78

Design
tblSLAVoucherProvisionPerformance (Design View)

| Column | Data Type | Length |
|---|---|---|
| Provision_Performance_ID | int | 4 |
| Provision_Performance_Desc | varchar | 50 |

Data
tblSLAVoucherProvisionPerformance (Data View)

| Provision_Performance_ID | Provision_Performance_Desc |
|---|---|
| 1 | Poor |
| 2 | Fair |
| 3 | Good |
| 4 | Excellent |
| 5 | Outstanding |

TABLE 79

Design
tblSLAVoucherLogisticPerformance (Design View)

| Column | Data Type | Length |
|---|---|---|
| Logistical_Admin_ID | int | 4 |
| Logistical_Admin_Desc | varchar | 50 |

Data
tblSLAVoucherLogisticPerformance (Data View)

| Provision_Performance_ID | Provision_Performance_Desc |
|---|---|
| 1 | Poor |
| 2 | Fair |
| 3 | Good |
| 4 | Excellent |
| 5 | Outstanding |

TABLE 80

Design
tblSLAVoucherDecinationCodes (Design View)

| Column | Data Type | Length |
|---|---|---|
| Decline_Code_ID | int | 4 |
| Decline_Code_Desc | varchar | 50 |

Data
tblSLAVoucherDecinationCodes (Data View)

| Provision_Performance_ID | Provision_Performance_Desc |
|---|---|
| 1 | Incorrect_PO_Data |
| 2 | Incorrect_Provision_Data |
| 3 | Service_Provision_Failure |

TABLE 81

Design
tblSLAVoucherDecinationDetails (Design View)

| Column | Data Type | Length |
|---|---|---|
| SLAVoucherSvcLineID | uniqueidentifier | 16 |
| Decline_Code_ID | int | 4 |
| SLAClientReviewerID | uniqueidentifier | 16 |
| Declination_Commentary | varchar | 1000 |

TABLE 82

Design
tblSLAVoucherExtractMain (Design View)

| Column | Data Type | Length |
|---|---|---|
| VoucherExtractBatchID | uniqueidentifier | 16 |
| ExtractDateStart | datetime | 8 |
| ExtractDateStartFinish | datetime | 8 |
| ExtractRecordCount | numeric | 9 |
| FieldExtractID | int | 4 |
| ExtractStatusID | int | 4 |

TABLE 83

Design
tblSLAVoucherExtractRecords (Design View)

| Column | Data Type | Length |
|---|---|---|
| SLASPVoucherID | uniqueidentifier | 16 |
| SLAVoucherSvcLineID | uniqueidentifier | 16 |
| SLAVoucherMatLineID | uniqueidentifier | 16 |
| SLASPResponsePenaltyStatus | int | 4 |
| ApprovalDate | datetime | 8 |
| ExtractRecordID | uniqueidentifier | 16 |
| VoucherExtractBatchID | uniqueidentifier | 16 |

TABLE 84

Design
tblSLAInvoiceClientMain (Design View)

| Column | Data Type | Length |
|---|---|---|
| VoucherExtractBatchID | uniqueidentifier | 16 |
| ClientInvoiceFileID | uniqueidentifier | 16 |
| SLAClientID | uniqueidentifier | 16 |
| InvoiceFileStatusID | int | 4 |

TABLE 85

Design
tblSLAInvoiceClientDetail (Design View)

| Column | Data Type | Length |
|---|---|---|
| ExtractRecordID | uniqueidentifier | 16 |
| WarrantyWork | bit | 1 |
| Debit | bit | 1 |
| Credit | bit | 1 |
| SLAClientName | varchar | 100 |
| SLAContract | varchar | 100 |
| SLAClientPO | varchar | 50 |
| SLAClientPOIDLine | numeric | 9 |
| SLAProvisionID | uniqueidentifier | 16 |
| ProvisionLocationName | varchar | 50 |
| SLAProvisionLaborTypeDesc | varchar | 50 |
| Labor_Qty | numeric | 9 |
| SLAProvisionBillingRate | money | 8 |
| SLAProvisionLaborCharge | money | 8 |
| MaterialMasterShortName | varchar | 50 |
| Provision_Material_Cost | money | 8 |
| Provision_Qty | numeric | 9 |
| SLAProvisionMaterialCharge | money | 8 |
| ProvisionDate | smalldate | 8 |
| SLAClientApprovalDate | smalldate | 8 |
| SLAClientApprover | varchar | 100 |
| SLANonProvisionPenaltyDesc | varchar | 1000 |
| SLANonProvisionPenalty | money | 8 |
| ClientInvoiceLineID | uniqueidentifier | 16 |
| ClientInvoiceFileID | uniqueidentifier | 16 |
| CashReceiptsControl | varchar | 50 |
| CashReceiptsDate | datetime | 8 |

TABLE 85-continued

Design
tblSLAInvoiceClientDetail (Design View)

| Column | Data Type | Length |
|---|---|---|
| CashReceiptsAmount | money | 8 |
| CashPaymentsControl | varchar | 50 |
| CashPaymentsDate | datetime | 8 |
| CashPaymentsAmount | money | 8 |

TABLE 86

Design
tblSLAInvoiceSPMain (Design View)

| Column | Data Type | Length |
|---|---|---|
| VoucherExtractBatchID | uniqueidentifier | 16 |
| SPInvoiceFileID | uniqueidentifier | 16 |
| SLASecondaryProviderID | int | 4 |
| InvoiceFileStatusID | int | 4 |

TABLE 87

Design
tblSLAInvoiceSPDetail (Design View)

| Column | Data Type | Length |
|---|---|---|
| ExtractRecordID | uniqueidentifier | 16 |
| Debit | bit | 1 |
| Credit | bit | 1 |
| vSPCompanyName | varchar | 100 |
| SLASecondaryProviderPOID | uniqueidentifier | 16 |
| PurchaseOrderIdentifier | varchar | 50 |
| SLASecondaryProviderPOLine | numeric | 9 |
| SLAProvisionID | uniqueidentifier | 16 |
| ProvisionLocationName | varchar | 50 |
| SLAProvisionLaborTypeDesc | varchar | 50 |
| Labor_Qty | numeric | 9 |
| Billing_Rate_Labor | money | 8 |
| SLASPProvisionLaborCharge | money | 8 |
| MaterialMasterShortName | varchar | 50 |
| SLAMaterialPrice | money | 8 |
| Provision_Qty | numeric | 9 |
| SLASPProvisionMaterialCharge | money | 8 |
| ProvisionDate | smalldate | 8 |
| SLAClientApprovalDate | smalldate | 8 |
| SLAClientApprover | varchar | 100 |
| SLASPNonProvisionPenaltyDesc | varchar | 1000 |
| SLASPNonProvisionPenalty | money | 8 |
| SLASPInvoiceLineID | uniqueidentifier | 16 |
| SPInvoiceLineID | uniqueidentifier | 16 |
| CashPaymentsControl | varchar | 50 |
| CashPaymentssDate | datetime | 8 |
| CashPaymentsAmount | money | 8 |
| CashReceiptsControl | varchar | 50 |
| CashReceiptsDate | datetime | 8 |
| CashReceiptsAmount | money | 8 |

The previous Detailed Description is of embodiment(s) of the invention. The scope of the invention should not necessarily be limited by this Description. The scope of the invention is instead defined by the following claims and the equivalents thereof.

What is claimed is:

1. A computer-implemented outsourced service-level-agreement (SLA) deliverable management method comprising:
configuring, via a computer system comprising one or more computers comprising a processor and memory, SLA client and secondary SLA provider master data;
procuring, via the computer system, a secondary SLA provider provision services network;
administering, via the computer system, a secondary SLA provider human resource network;
processing, via the computer system, an SLA client provisioning requirement;
processing, via the computer system, an SLA provisioning service voucher; and
processing, via the computer system, payment of an SLA provisioning work order.

2. The method of claim 1, wherein configuring SLA client and secondary SLA provider master data comprises:
configuring an SLA provision logistics control library;
configuring SLA client master data records;
configuring SLA client purchase order records; and
onboarding a secondary SLA provider network.

3. The method of claim 1, wherein procuring a secondary SLA provider provision services network comprises:
generating an RFx bid from at least one SLA client provisioning detail record;
posting the RFx bid to a pre-established list of secondary SLA providers;
enabling secondary SLA providers to generate an RFx bid response responsive to receiving the RFx bid;
processing at least one secondary SLA providers RFx bid response;
processing at least one secondary SLA provider purchase requisition responsive to RFx bid response acceptance; and
processing at least one secondary SLA provider purchase order responsive to receiving a completed purchase requisition.

4. The method of claim 1, wherein administering a secondary SLA provider human resource network comprises:
selecting at least one human resource submittal affiliated with a secondary SLA provider purchase order;
onboarding the at least one human resource provisioning personnel;
processing default work availability calendar information settings for the at least one human resource provisioning personnel;
enabling non-default human resource provisioning availability calendar administration; and
processing non-default work availability calendar information settings.

5. The method of claim 1, wherein processing an SLA client provisioning requirement comprises:
processing an SLA client service provision request;
processing a service provision dispatch request;
receiving a provisioning human resource dispatch notification record; and
processing the received provisioning human resource dispatch notification record.

6. The method of claim 1, wherein processing an SLA provisioning service voucher comprises:
creating and storing an SLA provisioning service voucher responsive to input by a provisioning human resource;
processing the stored SLA provisioning service voucher responsive to input by an applicable secondary SLA provider user;
processing an approved secondary SLA provider provisioning service voucher responsive to input by an applicable primary SLA provider user; and
processing an approved primary SLA provider provisioning service voucher responsive to input by an applicable SLA client user.

7. The method of claim 1, wherein processing payment of an SLA provisioning work order comprises:
- extracting SLA client approved provisioning work vouchers;
- generating billing invoice files;
- processing SLA client billing invoice files;
- processing payment from a SLA client; and
- issuing payment to a secondary SLA provider.

8. A computer-implemented method of configuring service level agreement (SLA) client and secondary SLA provider master data, the method comprising:
- configuring, via a computer system comprising one or more computers comprising a processor and memory, an SLA provision logistics control library;
- configuring, via the computer system, SLA client master data records;
- configuring, via the computer system, SLA client purchase order records; and
- onboarding, via the computer system, a secondary SLA provider network.

9. The method of claim 8, wherein configuring an SLA provision logistics control library comprises at least one of:
- receiving at least one specified SLA provision skill profile applicable to provisioning services provided by a primary SLA provider;
- receiving at least one specified SLA provision type applicable to the provisioning services provided by the primary SLA provider;
- receiving at least one specified SLA provision labor type applicable to the provisioning services provided by the primary SLA provider;
- receiving at least one specified SLA provision labor response time increment applicable to the provisioning services provided by the primary SLA provider; and
- receiving as needed specified SLA provision material records applicable to the provisioning services provided by the primary SLA provider.

10. The method of claim 9, wherein configuring the SLA client master data records comprises:
- receiving specified general business information settings applicable to at least one SLA client;
- receiving settings applicable to at least one SLA client user;
- receiving settings applicable to at least one SLA client location;
- receiving settings applicable to at least one SLA client provisioning contract;
- wherein the primary SLA provider is a party to the contract;
- receiving settings applicable to at least one SLA client provisioning detail record; and
- receiving settings applicable to at least one SLA client provisioning purchase order.

11. The method of claim 10, wherein receiving settings applicable to at least one SLA client user comprises at least one of:
- receiving settings specifying user location and contact details;
- receiving settings specifying user transactional authorization details; and
- receiving settings specifying user system access credentials.

12. The method of claim 10, wherein receiving settings applicable to at least one SLA client location comprises at least one of:
- receiving settings specifying non-employee worker access and authorization details;
- receiving settings specifying freight delivery details;
- receiving settings specifying location description in terms of a structured relational database; and
- wherein the at least one SLA client location is logically mapped to a geographical management schema employed by a primary SLA provider.

13. The method of claim 10, wherein receiving settings applicable to at least one SLA client provisioning contract comprises at least one of:
- receiving settings specifying contract activation and duration details;
- receiving settings specifying contract payment, incentive and penalty details; and
- receiving settings specifying a contract provisioning services count.

14. The method of claim 10, wherein receiving settings applicable to at least one SLA client provisioning detail record comprises at least one of:
- receiving settings specifying affiliation with at least one primary SLA provider user;
- receiving settings specifying affiliation with the at least one SLA client user;
- receiving settings specifying affiliation with the at least one SLA client provisioning contract;
- receiving settings specifying affiliation with the at least one SLA provision skill profile;
- receiving settings specifying affiliation with the at least one SLA provision type;
- receiving settings specifying affiliation with the at least one SLA provision labor type;
- receiving settings specifying affiliation with the at least one SLA provision labor response time increment;
- receiving settings specifying affiliation with the at least one SLA client location;
- receiving settings specifying details relative to required provision coverage time periods; and
- receiving settings specifying details relative to affiliated provision materials.

15. The method of claim 8, wherein configuring SLA client purchase order records comprises:
- receiving settings specifying SLA client purchase order header details;
- receiving settings specifying affiliation with at least one SLA client provisioning detail record;
- receiving settings specifying affiliation with SLA client provisioning material records responsive to receiving settings of the SLA client provisioning material records; and
- storing SLA client purchase order and SLA client provisioning detail record affiliations.

16. The method of claim 15, further comprising:
- configuring settings for at least one SLA client purchase order responsive to storing SLA client purchase order and SLA client provisioning detail record affiliations; and
- wherein configuring settings for at least one SLA client purchase order responsive to storing SLA client purchase order and SLA client provisioning detail record affiliations comprises:
  - receiving settings specifying SLA client purchase order pricing details;
  - receiving settings specifying applicable SLA client purchase order non-provisioning penalty costing details;
  - receiving settings specifying applicable SLA client purchase order dating details;
  - storing received SLA client purchase order specifications as a purchase order line item;

approving a completed SLA client purchase order;
notifying applicable SLA client users of a completed purchase order transaction; and
providing user access to an SLA client purchase order and affiliated master data records as configured.

17. The method of claim 8, wherein onboarding a secondary SLA provider network comprises:
providing secondary SLA provider managed temporary system access;
receiving settings specifying secondary SLA provider business qualification information;
determining secondary SLA provider qualification status responsive to received specified business qualification information;
responsive to a satisfactory qualification review:
providing secondary SLA provider managed non-temporary system access responsive to a satisfactory qualification review; and
receiving settings specifying secondary SLA provider service provision capabilities and affiliated service provision geographical territories.

18. The method of claim 17, wherein receiving settings specifying secondary SLA provider service provision capabilities comprises:
receiving selected SLA service provision capabilities;
wherein user skill profile selections are presented via a relational database resulting in a non-prose-based SLA provision skill family profile; and
receiving settings specifying skill family profile location coverage territory in terms of a structured relational database; and
wherein the territory is logically mapped to a geographical management schema employed by a primary SLA provider.

19. A computer-implemented method of procuring a secondary service-level-agreement (SLA) provider provision services network, the method comprising:
generating, via a computer system comprising one or more computers comprising a processor and memory, an RFx bid from at least one SLA client provisioning detail record;
posting, via the computer system, the RFx bid to a pre-established list of secondary SLA providers;
enabling, via the computer system, secondary SLA providers to generate an RFx bid response responsive to receiving the RFx bid;
processing, via the computer system, at least one secondary SLA providers RFx bid response;
processing, via the computer system, at least one secondary SLA provider purchase requisition responsive to RFx bid response acceptance; and
processing, via the computer system, at least one secondary SLA provider purchase order responsive to receiving a completed purchase requisition.

20. The method of claim 19, wherein generating an RFx bid comprises:
selecting at least one SLA client provisioning detail record unaffiliated with an active RFx bid or secondary SLA provider purchase order to be included on the RFx bid;
creating the RFx bid responsive to selection of the at least one unaffiliated SLA client provisioning detail record;
receiving default RFx bid information settings from at least one selected SLA client provisioning detail record set;
configuring non-default user desired information settings; and
storing RFx bid information settings.

21. The method of claim 20, wherein receiving default RFx bid information settings comprises retrieving information pertinent to at least one of:
SLA client details;
SLA client provision service location details;
a SLA provision skill profile;
SLA provision requirements;
anticipated SLA provision service frequency; and
applicable SLA provision material details.

22. The method of claim 20, wherein configuring non-default user desired information settings comprises:
specifying at least one of:
maximum secondary SLA provider labor and applicable expense rates;
secondary SLA provider non-provision penalty terms; and
maximum and minimum human resource submittals and a SLA provision labor type; and
specifying a pre-configured RFx bid template to store default and non-default information settings for subsequent RFx bid response data processing.

23. The method of claim 19, wherein posting the RFx bid comprises:
receiving a listing of secondary SLA providers logically mapped to the RFx bid premised upon a match of business family and geographic provision capabilities;
specifying at least one secondary SLA provider for RFx bid receipt responsive to generation of a secondary SLA providers RFx bid list; and
broadcasting the RFx bid to specified secondary SLA providers.

24. The method of claim 19, wherein enabling secondary SLA providers to generate a RFx bid quotation responsive to receiving the RFx bid comprises:
receiving notification that the RFx bid has been posted for processing;
generating an RFx bid response record;
permitting access details of an RFx bid response;
specifying information settings responsive to RFx bid interrogatories; and
storing information settings applicable to the RFx bid response.

25. The method of claim 24, wherein specifying information settings responsive to RFx bid interrogatories comprises:
acquiring information pertinent to multiple provisioning billing rates applicable to variable time attributes comprising at least one of weekdays, weekends, holidays, business hours, and non-business hours;
acquiring information pertinent to multiple provisioning expense rates applicable to variable expense type scenarios;
acquiring information pertinent to acceptance of SLA provisioning terms comprising at least one of provisioning response time and non-provisioning penalty; and
acquiring information pertinent to at least one secondary SLA provider provisioning human resource submittal.

26. The method of claim 24, further comprising, responsive to storing information settings applicable to a RFx bid response, submitting an RFx bid response to a primary SLA provider for evaluation.

27. The method of claim 19, wherein processing at least one secondary SLA provider RFx bid response comprises:
receiving a submitted secondary SLA provider RFx bid response;
determining if the secondary SLA provider RFx bid response is accepted or rejected; and
storing an RFx bid response disposition.

28. The method of claim 27, further comprising, responsive to storing the RFx bid response disposition:
- notifying a secondary SLA provider regarding RFx bid response disposition; and
- creating a secondary SLA provider purchase requisition responsive to RFx bid response being acceptance.

29. The method of claim 19, wherein processing at least one secondary SLA provider purchase requisition comprises:
- integrating purchase requisition information settings from an accepted secondary SLA provider RFx bid response; and
- creating a secondary SLA provider purchase order.

30. The method of claim 29, wherein processing a secondary SLA provider purchase requisition comprises:
- approving purchase requisition information by a primary SLA provider;
- submitting an approved purchase requisition to an applicable secondary SLA provider;
- notifying a secondary SLA provider of a purchase requisition receipt;
- acknowledging secondary SLA provider purchase requisition approval;
- receiving the approved purchase requisition from the secondary SLA provider; and
- notifying the primary SLA provider of completed purchase requisition receipt.

31. The method of claim 19, further comprising, responsive to processing at least one secondary SLA provider purchase order:
- populating a secondary SLA provider purchase order with default information functions contained within a completed purchase requisition record;
- specifying non-default purchase order information; and
- approving the secondary SLA provider purchase order.

32. The method of claim 31, wherein approving a secondary SLA provider purchase order comprises:
- notifying the secondary SLA provider of a purchase order approval transaction; and
- enabling user access to the secondary SLA provider purchase order.

33. A computer-implemented method of administering a secondary service-level-agreement (SLA) provider human resource network, the method comprising:
- selecting, via a computer system comprising one or more computers comprising a processor and memory, at least one human resource submittal affiliated with a secondary SLA provider purchase order;
- onboarding, via the computer system, the at least one human resource provisioning personnel;
- processing, via the computer system, default work availability calendar information settings for the at least one human resource provisioning personnel;
- enabling, via the computer system, non-default human resource provisioning availability calendar administration; and
- processing, via the computer system, non-default work availability calendar information settings.

34. The method of claim 33, wherein selecting at least one human resource submittal affiliated with a secondary SLA provider purchase order comprises:
- accessing secondary SLA provider RFx bid response human resource provisioning submittals;
- specifying assignment approval for at least one human resource provisioning submittal;
- storing the assignment approval for the at least one specified human resource provisioning submittal;
- notifying a secondary SLA provider of the assignment approval for the at least one specified human resource provisioning submittal; and
- enabling a secondary SLA provider to confirm the assignment approval for the at least one specified human resource provisioning submittal.

35. The method of claim 33, wherein onboarding the at least one human resource provisioning personnel comprises:
- receiving execution of human resource temporary worker agreements;
- receiving human resource temporary worker agreement information responsive to the step of receiving execution;
- approving human resource temporary worker agreement information;
- storing an approval disposition of a human resource temporary worker; and
- notifying a secondary SLA provider of approved human resource onboarding.

36. The method of claim 33, wherein processing default work availability calendar information settings for the at least one human resource provisioning personnel comprises:
- receiving specification of standard schedule blackout and availability time settings of the at least one human resource provisioning personnel;
- storing the specified standard schedule blackout and availability time settings; and
- submitting the stored standard schedule blackout and availability time settings for primary SLA provider review.

37. The method of claim 33, wherein processing default work availability calendar information settings for the at least one human resource provisioning personnel comprises:
- receiving submitted stored standard schedule blackout and availability time settings;
- receiving approval of human resource provisioning personnel default calendar availability settings;
- storing provisioning personnel default calendar availability approval;
- activating an availability calendar of the at least one human resource provisioning personnel;
- notifying a secondary SLA provider of provisioning personnel default calendar availability approval and activation; and
- accessing an active provisioning personnel availability calendar.

38. The method of claim 33, wherein enabling non-default human resource provisioning availability calendar administration comprises:
- permitting access to human resource provisioning personnel calendar availability records;
- receiving specification of non-default information settings applicable to human resource provisioning personnel calendar availability;
- storing specified human resource provisioning personnel non-default calendar availability information settings; and
- notifying applicable users of human resource provisioning personnel non-default calendar availability information settings modification.

39. The method of claim 38, wherein processing non-default work availability calendar information settings comprises:
- determining if any required SLA client provision coverage time period is without human resource provisioning personnel coverage availability;

warning applicable primary SLA provider users of required provision coverage period complete blackout resource availability;

broadcasting a provision coverage modification request to applicable secondary SLA providers;

storing information settings associated with a received provision coverage modification request; and notifying applicable primary SLA provider users that a provision resource unavailability scenario has been remedied responsive to stored secondary SLA provider information settings.

40. A computer-implemented method of processing a service-level-agreement (SLA) client provisioning requirement, the method comprising:

processing, via a computer system comprising one or more computers comprising a processor and memory, an SLA client service provision request;

processing, via the computer system, a service provision dispatch request;

receiving, via the computer system, a provisioning human resource dispatch notification record; and processing, via the computer system, the received provisioning human resource dispatch notification record.

41. The method of claim 40, wherein processing an SLA client service provision request further comprises:

permitting access to an SLA client purchase order and affiliated provisioning master data records;

creating an SLA client provisioning request record;

receiving default SLA client provisioning request information;

specifying non-default SLA client provisioning request information; and storing SLA client provisioning request information settings.

42. The method of claim 41, wherein receiving default SLA client provisioning request information comprises retrieving SLA provisioning record details responsive to user record selection.

43. The method of claim 41, wherein specifying non-default SLA client provisioning request information comprises inputting desired information applicable to provided SLA client provisioning request data fields.

44. The method of claim 41, further comprising, responsive to storing SLA client provisioning request information settings:

notifying a user that an SLA client provisioning request has been completed and stored; and submitting an SLA client provisioning request to a primary SLA provider for downstream processing.

45. The method of claim 40, wherein processing a service provision dispatch request comprises:

enabling record access to the SLA client service provision request;

receiving a listing of affiliated secondary SLA providers configured to provide services to an SLA client;

receiving a listing of affiliated secondary SLA provider available provisioning human resources configured to provide services to the SLA client;

specifying an available provisioning human resource to provide services to the SLA client; and storing information settings.

46. The method of claim 45, wherein storing information settings comprises generating the service provision dispatch request.

47. The method of claim 40, further comprising:

wherein processing a service provision dispatch request comprises broadcasting the service provision dispatch request;

wherein broadcasting the service provision dispatch request comprises:

transmitting the service provision dispatch request to an affiliated secondary SLA provider;

notifying the affiliated secondary SLA provider of an incoming service provision dispatch request; and providing access to the transmitted service provision dispatch request.

48. The method of claim 40, wherein processing a provisioning human resource dispatch notification record comprises:

validating provisioning human resource availability;

storing information settings relative to human resource availability.

49. The method of claim 48, wherein storing information settings comprises:

generating a provisioning human resource dispatch notification; and transmitting to a primary SLA provider a provisioning human resource dispatch notification record.

50. The method of claim 40, wherein processing the provisioning human resource dispatch notification record comprises:

permitting access to the provisioning human resource dispatch notification record;

creating an SLA client provisioning dispatch notification;

storing the SLA client provisioning dispatch notification; and transmitting the SLA client provisioning dispatch notification to applicable SLA client users affiliated with an originating SLA client service provision request.

51. The method of claim 50, wherein transmitting the SLA client provisioning dispatch notification comprises:

notifying applicable SLA client users; and permitting access to the transmitted SLA client provisioning dispatch notification.

52. A computer-implemented method of processing a service-level agreement (SLA) provisioning work voucher, the method comprising:

creating and storing, via a computer system comprising one or more computers comprising a processor and memory, an SLA provisioning service voucher responsive to input by a provisioning human resource;

processing, via the computer system, the stored SLA provisioning service voucher responsive to input by an applicable secondary SLA provider user;

processing, via the computer system, an approved secondary SLA provider provisioning service voucher responsive to input by an applicable primary SLA provider user; and processing, via the computer system, an approved primary SLA provider provisioning service voucher responsive to input by an applicable SLA client user.

53. The method of claim 52, wherein creating an SLA provisioning service voucher comprises:

specifying an applicable human resource provision dispatch record;

receiving default information applicable to SLA provisioning information affiliated with the specified human resource provision dispatch record;

specifying non-default information relative to performed physical provisioning service details; and storing SLA provisioning work voucher information settings.

54. The method of claim 53, further comprising, responsive to storing SLA provisioning work voucher information settings:
- notifying an applicable secondary SLA provider user that a stored SLA provisioning work voucher is available for review; and
- permitting access to the stored SLA provisioning work voucher.

55. The method of claim 52, wherein processing the stored SLA provisioning service voucher responsive to input by an applicable secondary SLA provider user comprises:
- receiving default SLA provisioning service voucher purchase order information inherited from an applicable secondary SLA provider purchase order;
- specifying SLA provisioning service voucher purchase order information non-default data values;
- approving information settings; and
- storing secondary SLA provider SLA provisioning work voucher information settings.

56. The method of claim 55, further comprising, responsive to storing secondary SLA provider SLA provisioning work voucher information settings:
- notifying an applicable primary SLA provider user that an approved secondary SLA provider provisioning work voucher has been submitted for review; and
- permitting access to the approved secondary SLA provider provisioning work voucher.

57. The method of claim 52, wherein processing an approved secondary SLA provider provisioning service voucher comprises:
- receiving default SLA provisioning service voucher purchase order information inherited from an applicable SLA client purchase order;
- specifying SLA provisioning service voucher purchase order information non-default data values; and
- storing primary SLA provider provisioning work voucher information settings.

58. The method of claim 57, further comprising, responsive to storing primary SLA provider SLA provisioning work voucher information settings:
- notifying an applicable SLA client user that an approved primary SLA provider provisioning work voucher is available for review; and
- permitting access to the approved primary SLA provider provisioning work voucher.

59. The method of claim 52, wherein processing an approved primary SLA provider provisioning service voucher comprises:
- receiving provisioning work voucher information settings by an SLA client user;
- specifying an approval or rejection disposition responsive to receiving the provisioning work voucher information settings; and
- storing the specified approval or rejection disposition.

60. The method of claim 59, wherein storing the approval or rejection disposition comprises:
- receiving default SLA provisioning service quality assurance assessment information;
- specifying information applicable to the received quality assurance assessment information;
- storing quality assessment information specifications within the system.

61. The method of claim 59, further comprising, responsive to storing the approval or rejection disposition:
- notifying applicable primary SLA provider and secondary SLA provider users of a SLA client provisioning work voucher disposition; and
- permitting applicable primary SLA provider and secondary SLA provider users to access the SLA client provisioning work voucher disposition.

62. A computer-implemented method of processing payment of a service-level agreement (SLA) provisioning work order, the method comprising:
- extracting, via a computer system comprising one or more computers comprising a processor and memory, SLA client approved provisioning work vouchers;
- generating, via the computer system, billing invoice files;
- processing, via the computer system, SLA client billing invoice files;
- processing, via the computer system, payment from a SLA client; and
- issuing, via the computer system, payment to a secondary SLA provider.

63. The method of claim 62, wherein extracting SLA client approved provisioning work vouchers comprises:
- identifying a stored unprocessed SLA client approved provisioning work voucher record;
- receiving default information inherited from the unprocessed SLA client approved provisioning work voucher record; and
- storing approved provisioning work voucher record set information settings.

64. The method of claim 62, wherein generating billing invoice files comprises:
- generating a primary SLA provider to SLA client billing file; and
- generating a secondary SLA provider to primary SLA provider billing file.

65. The method of claim 64, wherein generating primary SLA provider to SLA client billing file comprises:
- utilizing an SLA client specified billing file information template;
- populating the SLA client specified billing file information template with stored approved provisioning work voucher record set information settings; and
- storing an SLA client billing invoice file responsive to data population.

66. The method of claim 64, wherein generating a secondary SLA provider to primary SLA provider billing file comprises:
- utilizing a primary SLA provider specified billing file information template;
- populating a primary SLA provider specified billing file information template with stored approved provisioning work voucher record set information settings; and
- storing a primary SLA provider billing invoice file responsive to data population.

67. The method of claim 65, further comprising, responsive to storing an SLA client billing invoice file responsive to data population:
- notifying applicable SLA client users that a billing invoice file is available for data processing; and
- providing a user interface to applicable SLA client users adapted with access to the billing invoice file.

68. The method of claim 62, wherein processing SLA client billing invoice files comprises:
- approving SLA client billing invoice data;
- notifying applicable primary SLA provider users of billing file approval;

issuing payment to the primary SLA provider by the SLA client; and generating and storing a cash payment file responsive to primary SLA provider payment.

69. The method of claim 62, wherein processing payment from an SLA client comprises:

receiving a cash payment;

permitting access to a stored cash payment file;

applying cash payment file data against an applicable SLA client billing invoice file; and storing a record of billing invoice payments.

70. The method of claim 69, further comprising, responsive to storing a record of billing invoice payments:

generating a secondary SLA provider invoice payment file; and storing the secondary SLA provider invoice payment file.

71. The method of claim 70, further comprising, responsive to storing the secondary SLA provider invoice payment file:

notifying applicable primary SLA provider users that a secondary SLA provider billing invoice file is available for data processing; and providing a user interface to applicable primary SLA provider users adapted to access a secondary SLA provider billing invoice file responsive to notification.

72. The method of claim 62, wherein issuing payment to a secondary SLA provider comprises:

approving secondary SLA provider billing invoice data;

paying to the secondary SLA provider; and generating and storing a cash payment file responsive to secondary SLA provider payment.

73. The method of claim 72, further comprising, responsive to generating and storing a cash payment file responsive to secondary SLA provider payment:

providing access to the stored secondary SLA provider cash payment file; and applying cash payment file data against an applicable secondary SLA provider.

\* \* \* \* \*